(12) United States Patent
Kishida et al.

(10) Patent No.: US 11,493,128 B2
(45) Date of Patent: Nov. 8, 2022

(54) MOTIVE POWER TRANSMISSION ROUTE SWITCHING DEVICE AND TWO-SPEED TRANSMISSION

(71) Applicant: NSK LTD., Tokyo (JP)

(72) Inventors: Hirotaka Kishida, Kanagawa (JP); Ricardo Rodriguez Lopez, Kanagawa (JP); Seigou Urakami, Kanagawa (JP); Shohei Kaneko, Kanagawa (JP); Akihiro Yamamoto, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/632,698

(22) PCT Filed: Dec. 11, 2020

(86) PCT No.: PCT/JP2020/046275
§ 371 (c)(1),
(2) Date: Feb. 3, 2022

(87) PCT Pub. No.: WO2021/117867
PCT Pub. Date: Jun. 17, 2021

(65) Prior Publication Data
US 2022/0268358 A1    Aug. 25, 2022

(30) Foreign Application Priority Data

Dec. 13, 2019 (JP) .............................. JP2019-225115
Dec. 7, 2020 (JP) .............................. JP2020-202934

(51) Int. Cl.
*F16H 63/04* (2006.01)
*F16H 63/30* (2006.01)
*F16H 61/32* (2006.01)

(52) U.S. Cl.
CPC ............. *F16H 63/04* (2013.01); *F16H 61/32* (2013.01); *F16H 63/3043* (2013.01);
(Continued)

(58) Field of Classification Search
CPC ...... F16H 63/04; F16H 61/32; F16H 63/3043; F16H 2063/3056; F16H 2063/3066;
(Continued)

(56) References Cited

U.S. PATENT DOCUMENTS

| | | | |
|---|---|---|---|
| 2007/0227835 A1* | 10/2007 | Elliott | B60T 1/062 188/30 |
| 2018/0238398 A1 | 8/2018 | Rippelmeyer et al. | |
| 2020/0224733 A1 | 7/2020 | Kato et al. | |

FOREIGN PATENT DOCUMENTS

| | | | | |
|---|---|---|---|---|
| CN | 108374846 A | * | 8/2018 | ............... B60K 1/00 |
| CN | 108457998 A | | 8/2018 | |

(Continued)

OTHER PUBLICATIONS

International Search Report for PCT/JP2020/046275 dated Mar. 9, 2021 [PCT/ISA/210].

(Continued)

*Primary Examiner* — Justin Holmes
(74) *Attorney, Agent, or Firm* — Sughrue Mion, PLLC

(57) ABSTRACT

A cam device having a drive cam and a driven cam; and a friction engagement device having at least one friction plate and at least one separation plate are provided. The friction engagement device is configured so as to be put into a connected state by pressing the friction plate and the separation plate against each other by the driven cam, and a disconnected state. Also provided are a rotation transmission state switching device having a first member and a second member coaxially arranged, and a mode selecting part configured to rotate or displace in the axial direction according to rotation of the drive cam. The rotation transmission state switching device has at least one mode of a free mode and a lock mode of the first member and the second member, and a one-way clutch mode.

17 Claims, 39 Drawing Sheets

(52) U.S. Cl.
CPC ............... *F16H 2063/3056* (2013.01); *F16H 2063/3066* (2013.01); *F16H 2200/0034* (2013.01); *F16H 2200/2005* (2013.01); *F16H 2200/2033* (2013.01)

(58) Field of Classification Search
CPC ..... F16H 2200/0034; F16H 2200/2005; F16H 2200/2033
See application file for complete search history.

(56) References Cited

FOREIGN PATENT DOCUMENTS

| | | | |
|---|---|---|---|
| CN | 110945260 A | 3/2020 | |
| DE | 102019104126 A1 * | 10/2019 | .............. F02B 67/06 |
| EP | 3 633 221 A1 | 4/2020 | |
| JP | 05-116549 A | 5/1993 | |
| JP | 2009-236188 A | 10/2009 | |
| JP | 2014-228061 A | 12/2014 | |
| JP | 2018-169043 A | 11/2018 | |
| WO | 2005/106272 A1 | 11/2005 | |
| WO | 2019/049231 A1 | 3/2019 | |

OTHER PUBLICATIONS

Written Opinion for PCT/JP2020/046275 dated Mar. 9, 2021 [PCT/ISA/237].

* cited by examiner

OTHER SIDE
IN THE AXIAL DIRECTION

ONE SIDE
IN THE AXIAL DIRECTION

← OTHER SIDE IN THE AXIAL DIRECTION

ONE SIDE IN THE AXIAL DIRECTION →

OTHER SIDE IN THE AXIAL DIRECTION ← → ONE SIDE IN THE AXIAL DIRECTION

← OTHER SIDE IN THE AXIAL DIRECTION
ONE SIDE IN THE AXIAL DIRECTION →

MOTIVE POWER TRANSMISSION ROUTE SWITCHING DEVICE AND TWO-SPEED TRANSMISSION

CROSS REFERENCE TO RELATED APPLICATIONS

This application is a National Stage of International Application No. PCT/JP2020/046275 filed Dec. 11, 2020, claiming priority based on Japanese Patent Application No. 2019-225115 filed Dec. 13, 2019 and 2020-202934 filed Dec. 7, 2020.

TECHNICAL FIELD

The present invention relates to a power transmission path switching device for switching a transmission path of power between an input member and an output member, and a two-speed transmission including the power transmission path switching device.

BACKGROUND ART

In response to the trend of consumption reduction of fossil fuel in recent years, research on electric automobiles and hybrid automobiles has been progressing, and some of them has been implemented. Because an electric motor which is a power source for electric automobiles and hybrid automobiles is different from an internal combustion engine (engine), which is driven by directly combusting a fossil fuel, in that characteristics of torque and rotation speed of an output shaft are suitable for automobiles (generally, the maximum torque is generated at startup), electric automobiles and hybrid automobiles are not necessarily required to be equipped with a transmission, unlike general automobiles having the internal combustion engine as a drive source. However, even when the electric motor is used as a drive source, acceleration performance and high-speed performance can be improved by providing the transmission. Specifically, by providing the transmission, a relation between the travelling speed and the acceleration of the vehicles can be made smooth to the degree close to that of automobiles equipped with a gasoline engine and including the transmission in a power transmission system. This point will be described with reference to FIG. 39.

When a power transmission device having a large reduction ratio is arranged, for example, at a portion between the output shaft of the electric motor and an input part of a differential gear connected to a drive wheel, a relation between the acceleration (G) and the travelling speed (km/h) of the electric automobile is as indicated by a solid line a in FIG. 39. That is, although acceleration performance at a low speed is excellent, traveling at a high speed is not possible. To the contrary, when a power transmission device having a small reduction ratio is arranged at the portion therebetween, the relation is as indicated by a chain line b in FIG. 39. That is, although traveling at a high speed is possible, acceleration performance at a low speed is deteriorated. On the other hand, when a transmission is provided between the output shaft and the input part so that the reduction ratio of this transmission is changed according to a vehicle speed, characteristics such that a section of the solid line a on the left side of a point P and a section of the chain line b on the right side of the point P are continuously connected to each other is obtained. This characteristic is almost similar to that of gasoline engine automobiles having almost the same output as indicated by a broken line c in FIG. 39, which has revealed that in regard to the acceleration performance and the high-speed performance, performance equivalent to that of gasoline engine automobiles including the transmission in the power transmission system can be obtained.

JP05-116549A discloses the structure of a drive unit for electric automobiles for transmitting torque of the output shaft of the electric motor to the differential gear through a two-speed transmission (with the speed reduced by the two-speed transmission) which is formed by combining a pair of planetary gear mechanisms and a pair of brakes. In this drive unit for electric automobiles, by switching between a state where rotation of the components of the pair of planetary gear mechanisms is possible and a state where the rotation is not possible on the basis of switching a connected/disconnected state of the pair of brakes, the reduction ratio between the output shaft of the electric motor and the differential gear is able to be switched in high and low two speeds.

CITATION LIST

Patent Literature

[Patent Literature 1] JP05-116549A

SUMMARY OF INVENTION

Technical Problem

The device described in JP05-116549A is configured so that connection (engagement) of the brake is performed by pressing a friction engaging element supported by the component of the planetary gear mechanism and a friction engaging element supported by a housing against each other by servo pistons PL, PH which are operated with hydraulic pressure. However, in regard to electric automobiles and hybrid automobiles, in order to reduce the cost and enhance electricity cost performance due to simplification of the system, it is desirable that switching of the reduction ratio of the two-speed transmission is performed by an electric actuator so as to make a hydraulic pressure system unnecessary.

In view of the circumstances described above, an object of the present invention is to achieve structures of a power transmission path switching device capable of switching a transmission path of power by an electric actuator, and a two-speed transmission incorporating this power transmission path switching device.

Solution to Problem

A power transmission path switching device of the present invention includes:

a cam device having a drive cam supported so that rotation is possible and displacement in an axial direction is not possible, and a driven cam that is supported so that relative rotation with respect to the drive cam and displacement in the axial direction are possible, and is configured to displace in the axial direction according to rotation of the drive cam; and a friction engagement device having at least one friction plate and at least one separation plate that are supported so that relative displacement in the axial direction with respect to each other is possible.

The friction engagement device is configured so as to be put into a connected state by pressing the friction plate and the separation plate against each other on the basis of displacement of the driven cam in a direction so that an interval in the axial direction between the driven cam and the drive cam increases, and be put into a disconnected state by releasing a force that presses the friction plate and the separation plate against each other on the basis of displacement of the driven cam in a direction so that the interval in the axial direction between the driven cam and the drive cam decreases.

The power transmission path switching device of the present invention further includes a rotation transmission state switching device having a first member and a second member that are arranged coaxially with each other, and a mode selecting part configured to rotate or displace in the axial direction according to rotation of the drive cam.

The rotation transmission state switching device has at least one mode of a free mode in which rotation of the first member with respect to the second member is allowed regardless of a direction of relative rotation between the first member and the second member, and a lock mode in which rotation of the first member with respect to the second member is prevented regardless of a direction of relative rotation between the first member and the second member; and a one-way clutch mode in which only rotation of the first member with respect to the second member in a specified direction is allowed, and rotation of the first member with respect to the second member in a direction opposite to the specified direction is prevented.

The rotation transmission state switching device is configured so as to be able to switch between at least one mode of the free mode and the lock mode and the one-way clutch mode on the basis of rotation or displacement in the axial direction of the mode selecting part.

In the power transmission path switching device of one aspect of the present invention, the rotation transmission state switching device may be put into the one-way clutch mode during switching of the friction engagement device from the connected state to the disconnected state and/or during switching of the friction engagement device from the disconnected state to the connected state.

The power transmission path switching device of one aspect of the present invention may have a first mode in which the friction engagement device is in the connected state, and the rotation transmission state switching device is in the free mode.

The power transmission path switching device of one aspect of the present invention may have a second mode in which the friction engagement device is in the disconnected state, and the rotation transmission state switching device is in the lock mode.

The power transmission path switching device of one aspect of the present invention may have a neutral mode in which the friction engagement device is in the disconnected state, and the rotation transmission state switching device is in the free mode.

In the power transmission path switching device of one aspect of the present invention, one member of the first member and the second member may have engaging recess portions at a plurality of positions in a circumferential direction, and the mode selecting part may have protruding portions at a plurality of positions in the circumferential direction, the protruding portions protruding in a radial direction or in the axial direction, and the rotation transmission state switching device may further include:

a first claw member having a first base portion that is pivotally supported by the other member of the first member and the second member, and a first engaging claw that extends from the first base portion toward one side in the circumferential direction;

a second claw member having a second base portion that is pivotally supported by the other member of the first member and the second member, and a second engaging claw that extends from the second base portion toward the other side in the circumferential direction;

a first claw biasing member configured to elastically bias the first engaging claw in a direction so that the first engaging claw engages with the engaging recess portion; and a second claw biasing member configured to elastically bias the second engaging claw in a direction so that the second engaging claw engages with the engaging recess portion.

In the one-way clutch mode, one engaging claw of the first engaging claw and the second engaging claw is not pressed by the protruding portion so that the one engaging claw engages with the engaging recess portion, and the other engaging claw of the first engaging claw and the second engaging claw is pressed by the protruding portion so that the other engaging claw does not engage with the engaging recess portion, thereby allowing only rotation of the first member with respect to the second member in the specified direction, and preventing rotation of the first member with respect to the second member in the direction opposite to the specified direction.

When the power transmission path switching device of the present invention has the free mode, in the free mode, the first engaging claw is pressed by the protruding portion so that the first engaging claw does not engage with the engaging recess portion, and the second engaging claw is pressed by the protruding portion so that the second engaging claw does not engage with the engaging recess portion, thereby allowing rotation of the first member with respect to the second member regardless of a direction of relative rotation between the first member and the second member.

When the power transmission path switching device of the present invention has the lock mode, in the lock mode, the first engaging claw is not pressed by the protruding portion so that the first engaging claw engages with the engaging recess portion, and the second engaging claw is not pressed by the protruding portion so that the second engaging claw engages with the engaging recess portion, thereby preventing rotation of the first member with respect to the second member regardless of a direction of relative rotation between the first member and the second member.

The power transmission path switching device of one aspect of the present invention may further include a select plate that has the mode selecting part, and is configured to rotate or displace in the axial direction according to rotation of the drive cam.

The power transmission path switching device of one aspect of the present invention may further include a speed reducer between the drive cam and the select plate, the speed reducer being configured to transmit rotation of the drive cam to the select plate with reducing a speed of the rotation.

In the power transmission path switching device of one aspect of the present invention, the speed reducer may include:

a cam-side gear portion provided in the drive cam;

a plate-side gear portion provided in the select plate; and a two-stage gear having a first gear portion that meshes with the cam-side gear portion, and a second gear portion that meshes with the plate-side gear portion.

Alternatively, in the power transmission path switching device of one aspect of the present invention, the speed reducer may include:

a cam-side groove that is provided in the drive cam, and extends in a direction further outward in the radial direction as going toward one side with respect to a direction of rotation;

a plate-side groove that is provided in the select plate, and extends in a direction further inward in the radial direction as going toward one side with respect to a direction of rotation; and an engaging pin having a first engagement portion that engages with the cam-side groove so that displacement along the cam-side groove is possible, and a second engagement portion that engages with the plate-side groove so that displacement along the plate-side groove is possible, and a length in the circumferential direction of the cam-side groove may be longer than a length in the circumferential direction of the plate-side groove.

In this case, the speed reducer further may include a guide plate having a guide groove extending in the radial direction, and being supported so that rotation is not possible, and the engaging pin further may have a third engagement portion engaging with the guide groove so that displacement along the guide groove is possible.

Alternatively, in the power transmission path switching device of one aspect of the present invention, the protruding portion may protrude in the axial direction, the select plate may have an engaging groove that has an inclined portion inclined with respect to the circumferential direction, and extends in the circumferential direction, and the drive cam may have an engaging pin that protrudes in the radial direction, and engages with the engaging groove so that displacement along the engaging groove is possible.

In the power transmission path switching device of one aspect of the present invention, the drive cam may have the mode selecting part.

The power transmission path switching device of one aspect of the present invention may further include an elastic member that is arranged between the driven cam and the friction engagement device, and is configured to elastically bias the driven cam and the friction engagement device in directions away from each other.

In the power transmission path switching device of one aspect of the present invention, the friction engagement device may further have a return spring that is configured to elastically bias the friction plate and the separation plate in directions separating from each other.

In the power transmission path switching device of one aspect of the present invention, the cam device may include a plurality of rollers that have rotation axes directed in a radiation direction, and are sandwiched and held between the drive cam and the driven cam, and the rollers may be supported by the driven cam so as to be able to freely rotate about the rotation axes.

A two-speed transmission of the present invention includes:

an input member;

an output member arranged coaxially with the input member;

a planetary gear mechanism arranged between the input member and the output member with respect to a direction of transmission of power; and a power transmission path switching device configured to switch a power transmission path between the input member and the output member.

Particularly in the two-speed transmission of the present invention, the power transmission path switching device is the power transmission path switching device of the present invention, and the power transmission path switching device further includes an electric actuator configured to rotate and drive the drive cam.

The planetary gear mechanism includes:

a sun gear connected to the input member so as to rotate integrally with the input member;

a ring gear arranged coaxially with the sun gear and around the sun gear;

a carrier arranged coaxially with the sun gear, and connected to the output member so as to rotate integrally with the output member; and a plurality of pinion gears that mesh with the sun gear and the ring gear, and are supported by the carrier so as to be able to freely rotate about their own center axes.

one of the friction plate and the separation plate is supported to the sun gear or the input member so that relative displacement in the axial direction is possible and relative rotation is not possible, the other of the friction plate and the separation plate is supported to the carrier or the output member so that relative displacement in the axial direction is possible and relative rotation is not possible, one of the first member and the second member is supported to a portion that does not rotate even in use so that relative rotation is not possible, and the other of the first member and the second member is supported to the ring gear so that relative rotation is not possible.

In the two-speed transmission of one aspect of the present invention, the drive cam may have a wheel gear portion on an outer circumferential surface thereof, and the electric actuator may include a worm meshing with the wheel gear portion, and a transmission motor configured to rotate and drive the worm.

Effect of Invention

In the power transmission path switching device of one aspect of the present invention, a connected/disconnected state of the friction engagement device and a mode of the rotation transmission state switching device are switched on the basis of rotation of one drive cam. In short, with the power transmission path switching device of one aspect of the present invention, the transmission path of power is able to be switched on the basis that the drive cam is rotated and driven by one electric actuator including an electric motor or the like. In addition, with the two-speed transmission of one aspect of the present invention including the power transmission path switching device of one aspect of the present invention, a reduction ratio between the input member and the output member is able to be switched by the electric actuator in high and low two speeds.

is a schematic view illustrating a transmission path of power in a high reduction ratio mode.

Figure 5:
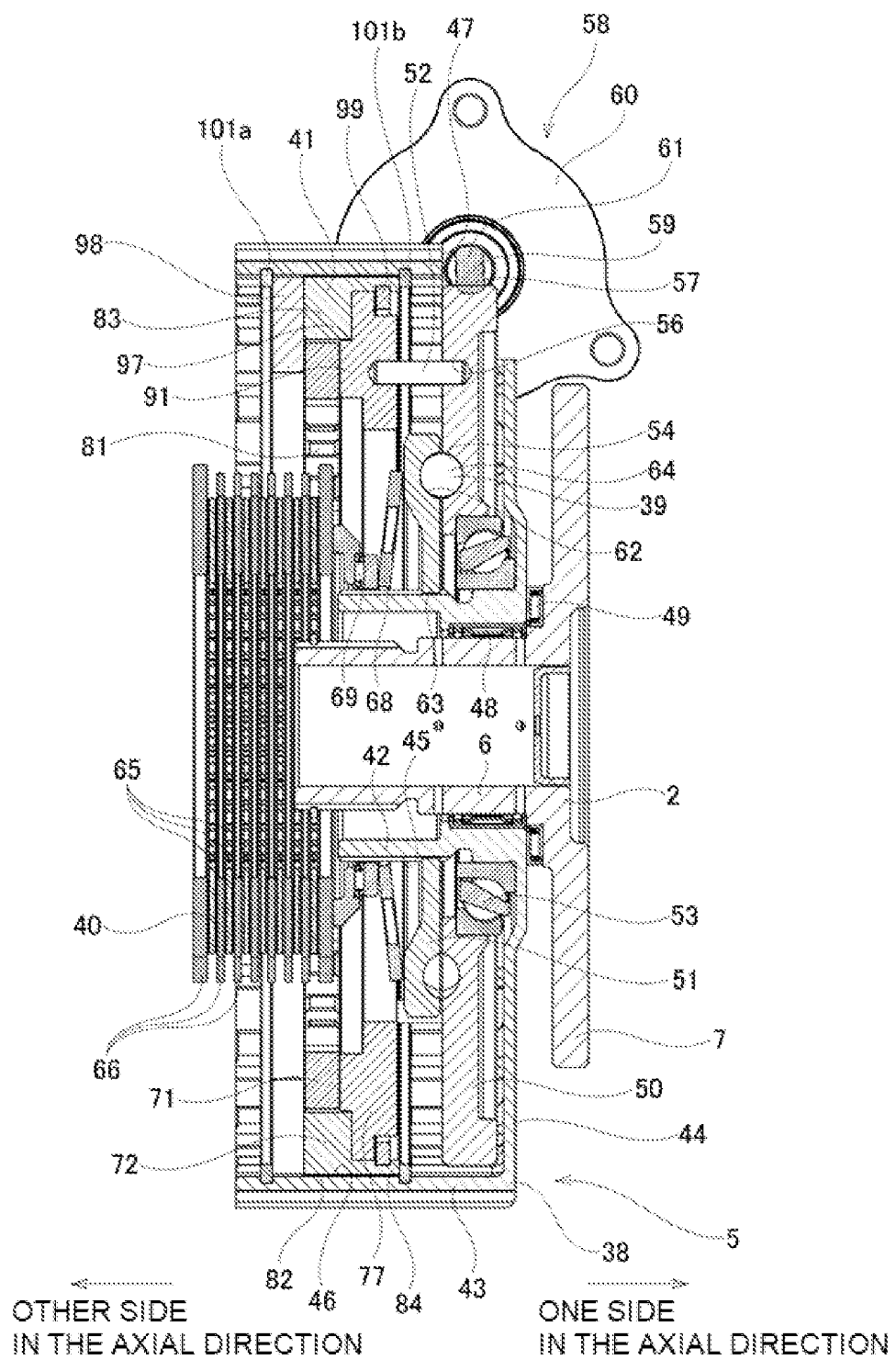

FIG. 5 is a cross-sectional view illustrating a power transmission path switching device, which has been extracted, in regard to the first example.

Figure 6:
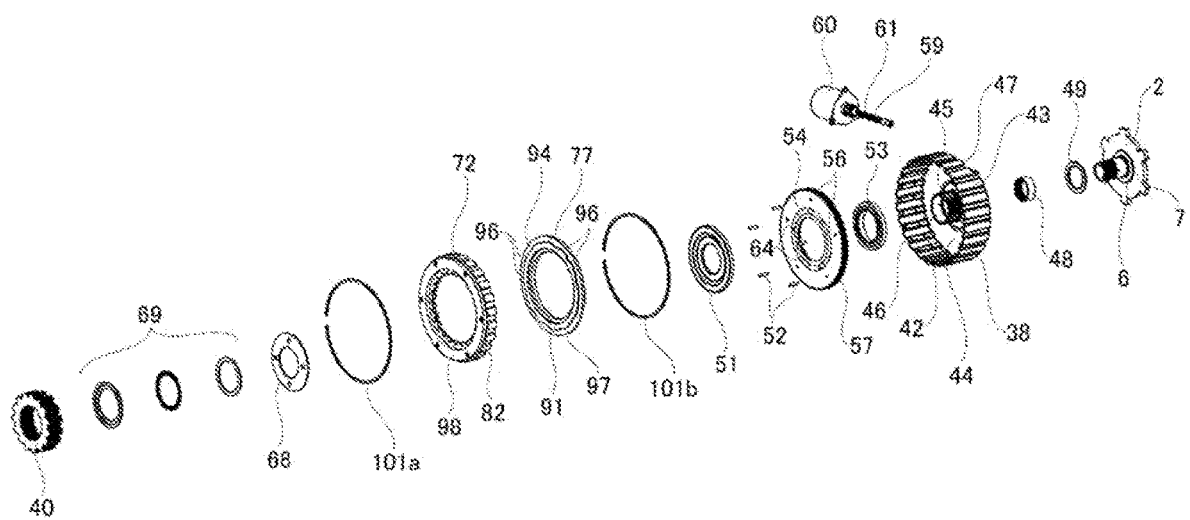

FIG. 6 is an exploded perspective view illustrating the power transmission path switching device, which has been extracted, in regard to the first example.

Figure 7:
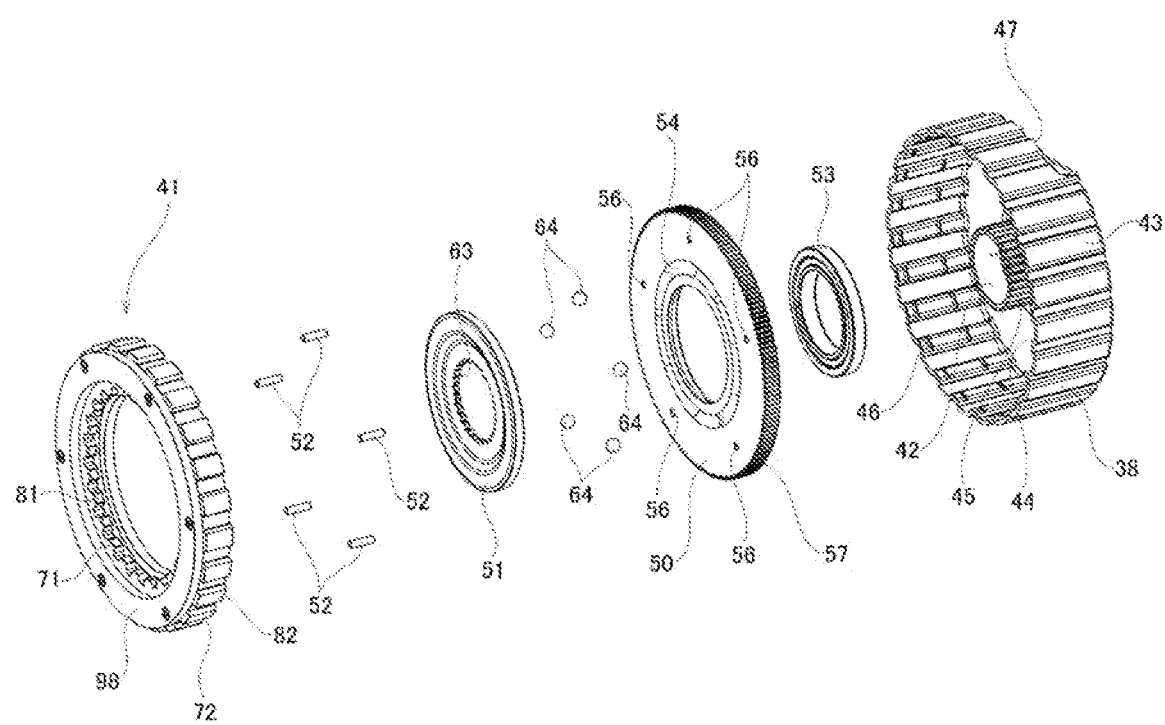

FIG. 7 is an exploded perspective view illustrating a cam device and a rotation transmission state switching device, which have been extracted.

Figure 8:
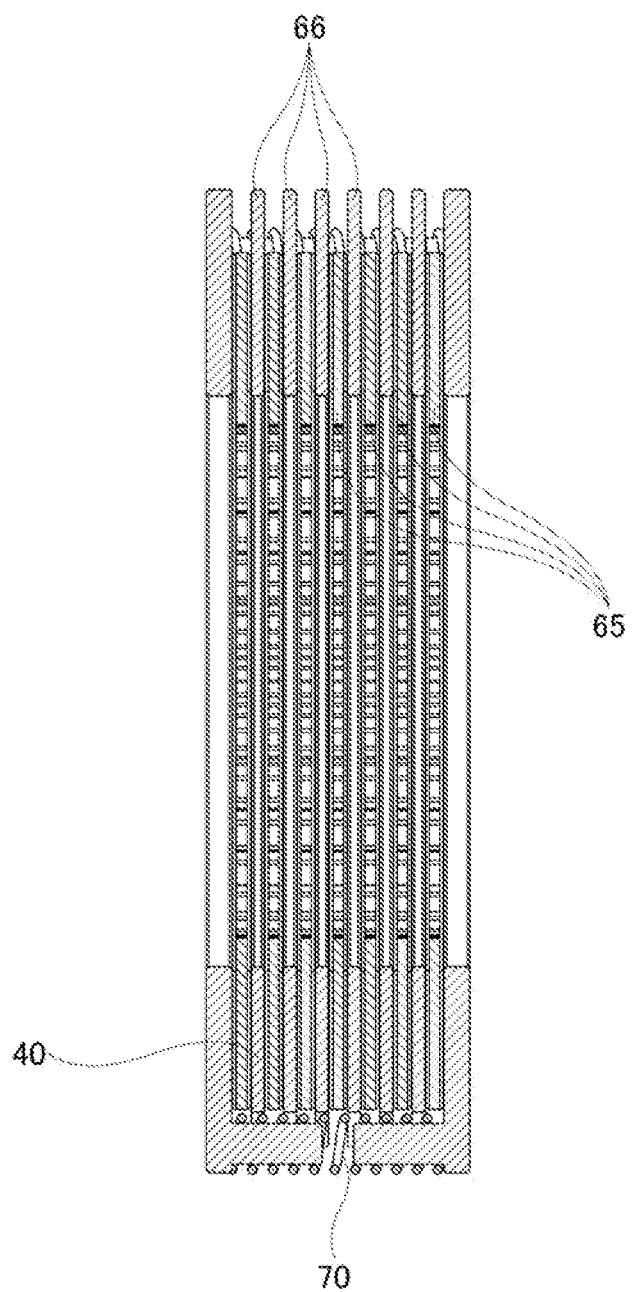

FIG. 8 is a cross-sectional view illustrating a friction engagement device, which has been extracted.

Figure 9:
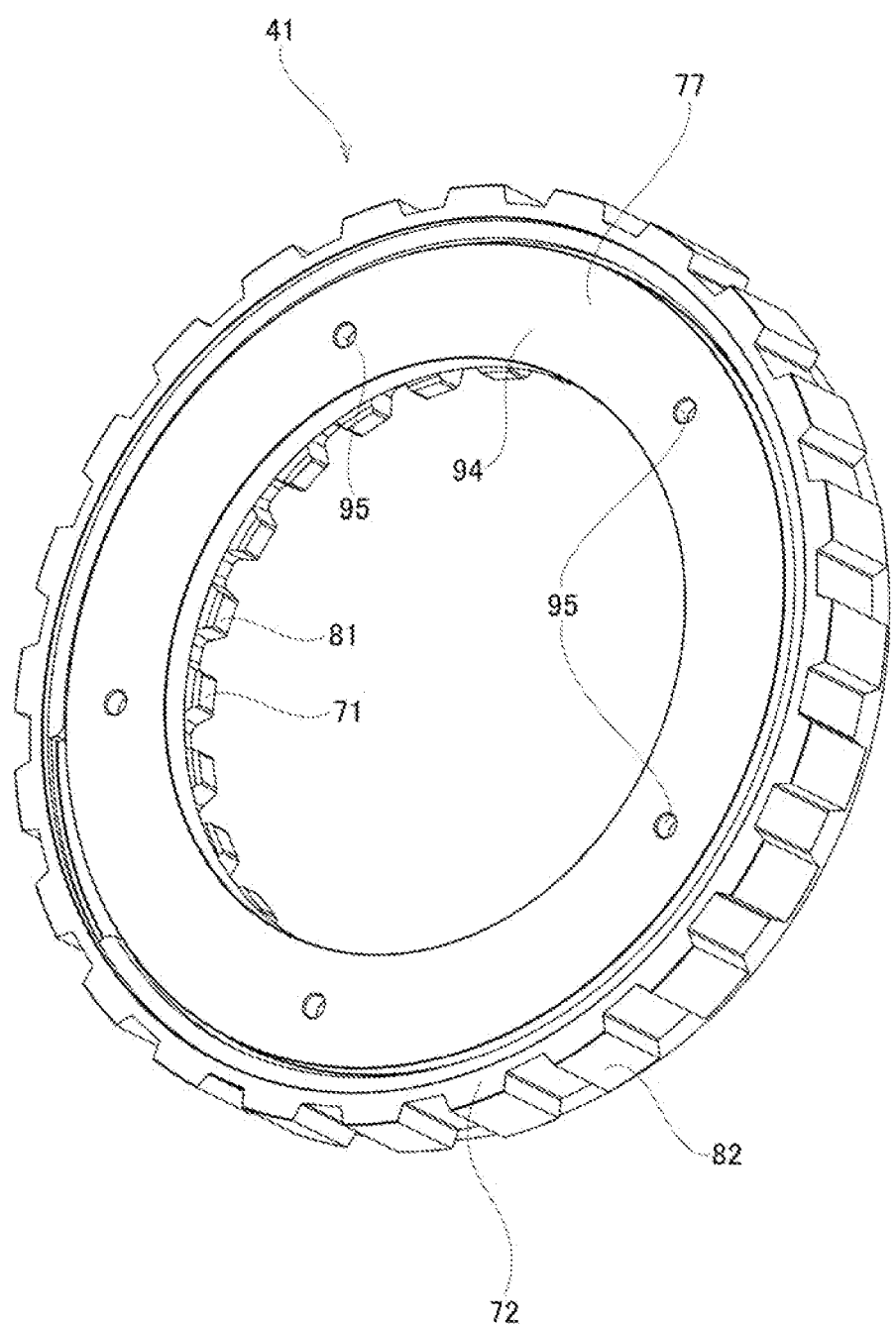

FIG. 9 is a perspective view illustrating the rotation transmission state switching device, which has been extracted, as viewed from one side in the axial direction.

Figure 10:
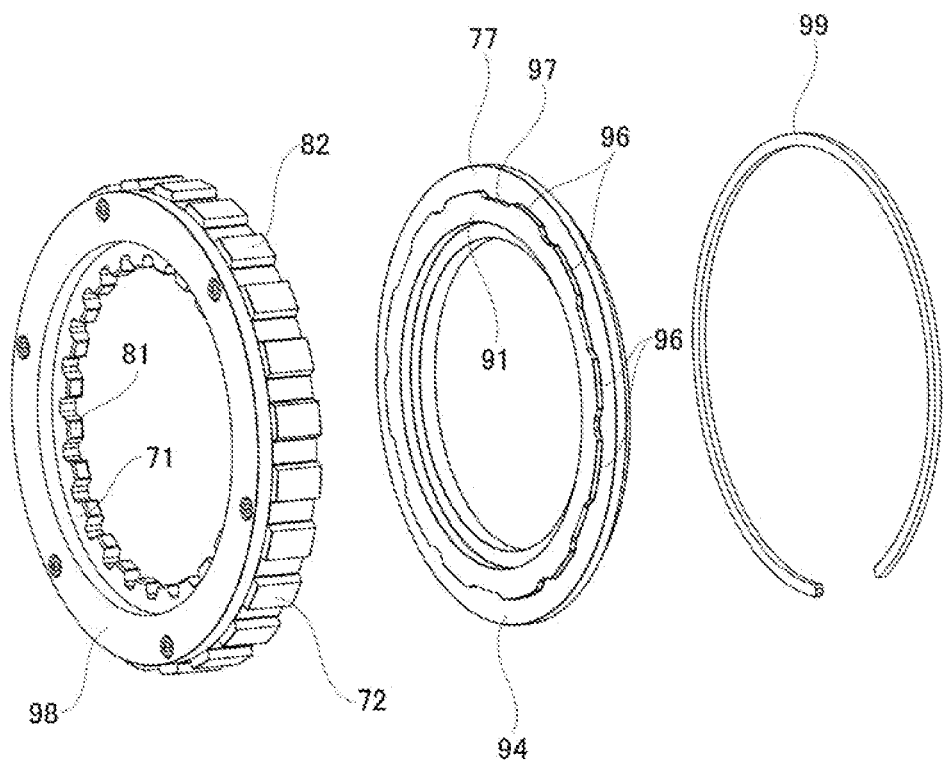

FIG. 10 is an exploded perspective view illustrating the rotation transmission state switching device, which has been extracted.

Figure 11:
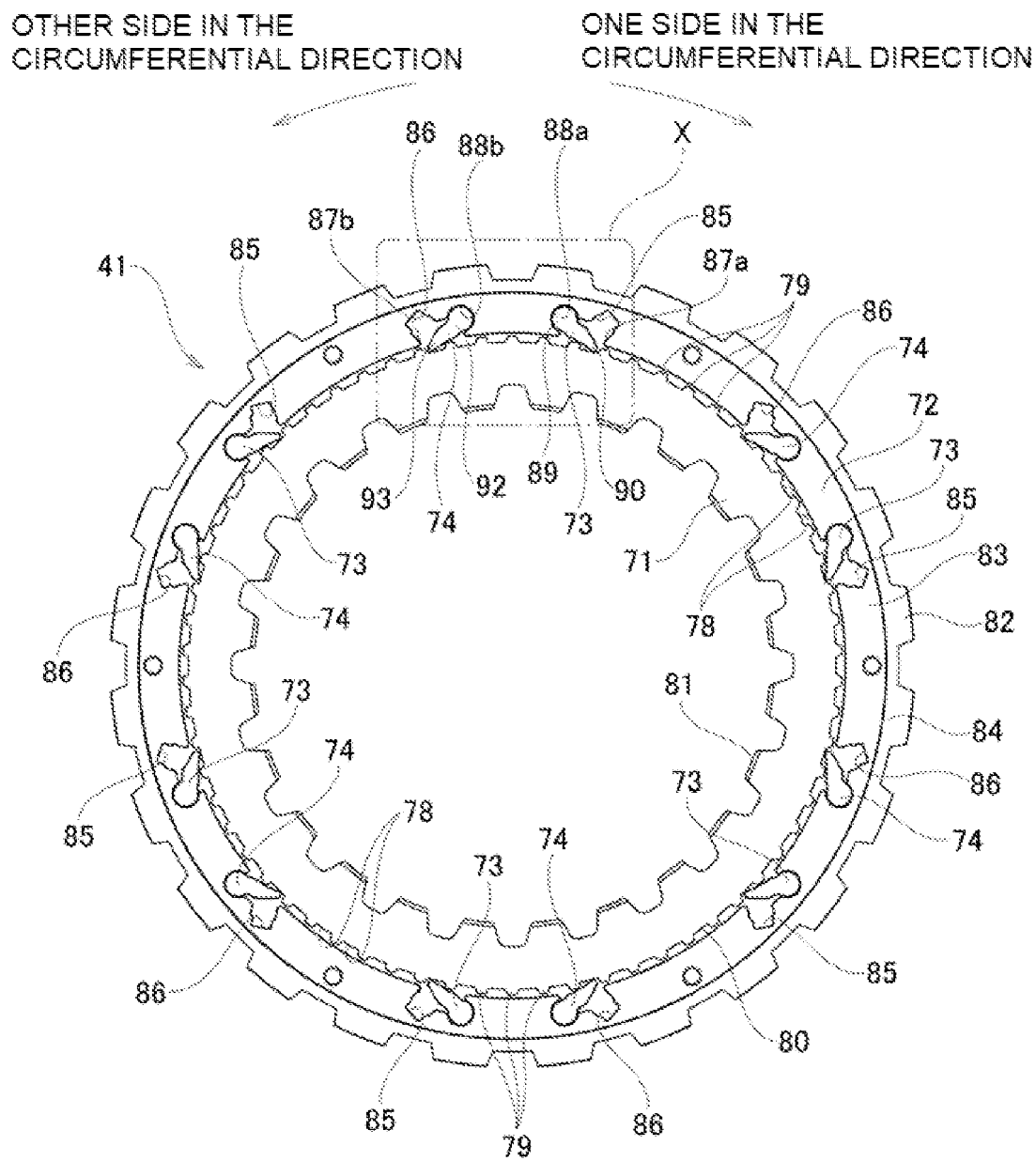

FIG. 11 is an end view illustrating a select plate, which has been removed from the removing from the rotation transmission state switching device, as viewed from one side in the axial direction.

Figure 12:
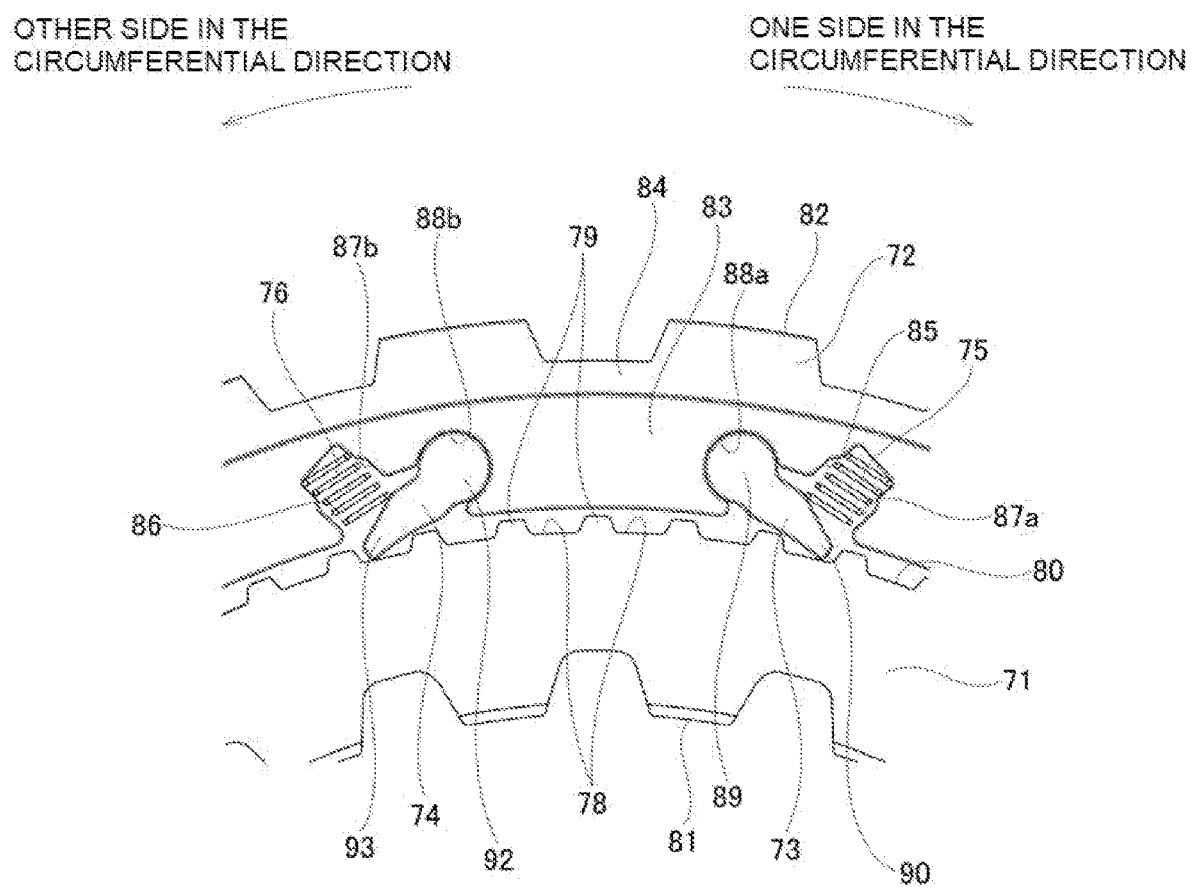

FIG. 12 is an enlarged view of a section X of FIG. 11.

Figure 13:
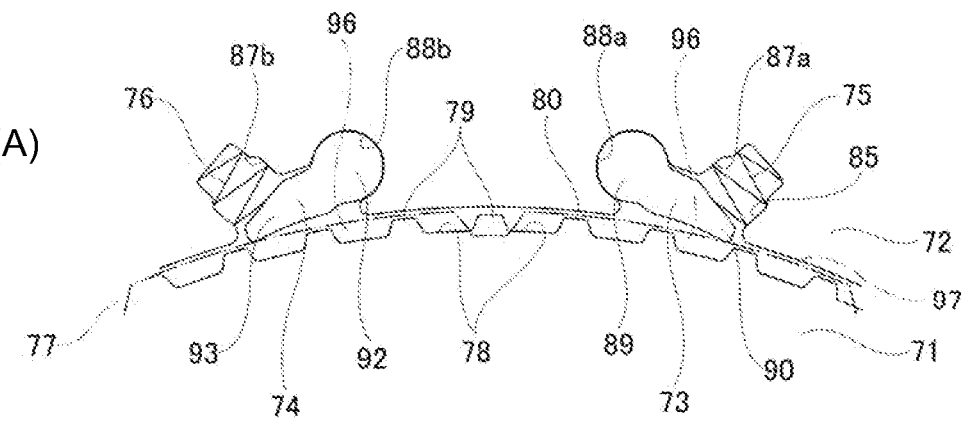
Figure 13:
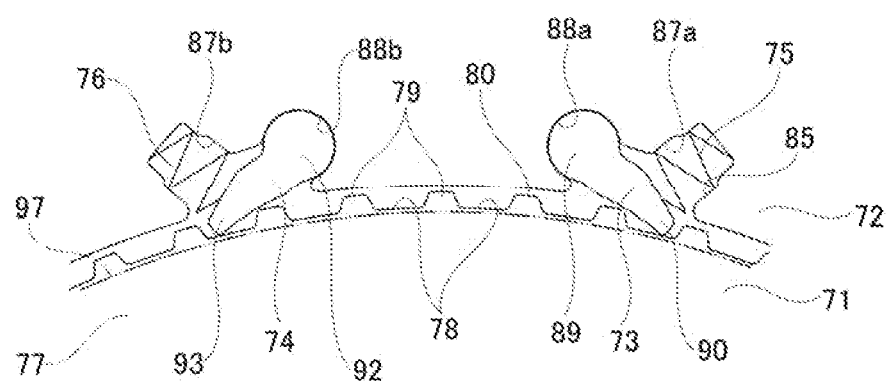
Figure 13:
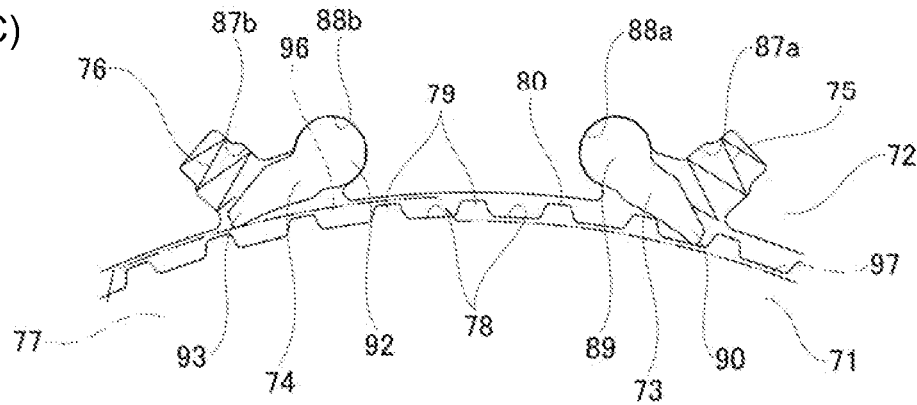

FIGS. 13(A) to 13(C) are schematic views illustrating engagement relations between a first engaging claw and a second engaging claw, engaging recess portions, and protruding portions. FIG. 13(A) is a schematic view illustrating the engagement relation in a free mode, FIG. 13(B) is a schematic view illustrating the engagement relation in a lock mode, and FIG. 13(C) is a schematic view illustrating the engagement relation in a one-way clutch mode.

Figure 14:
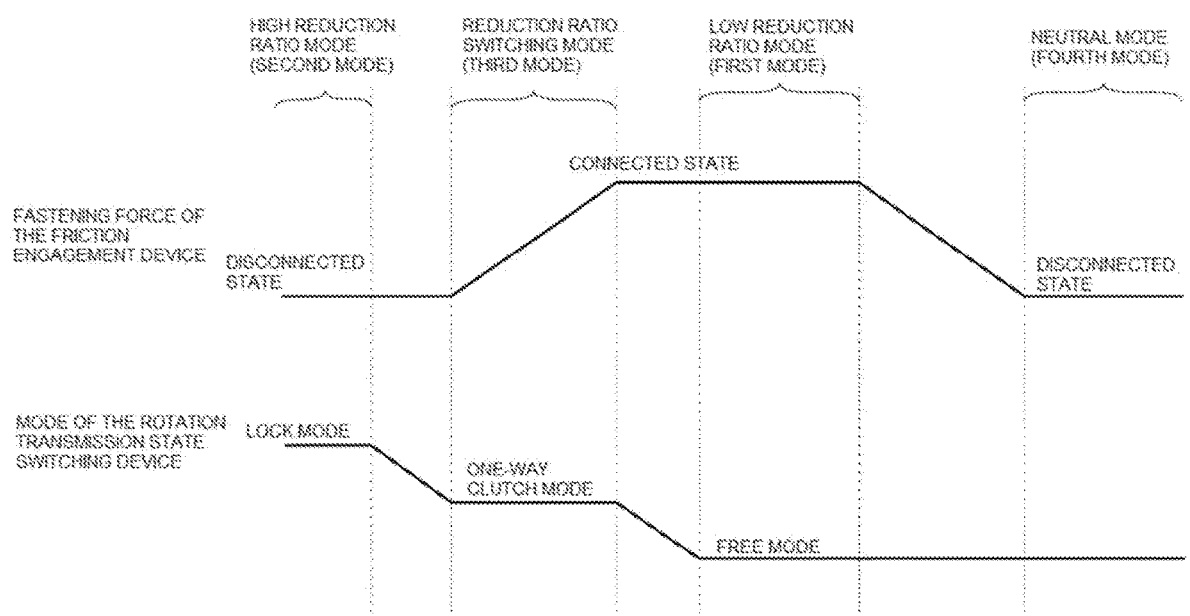

FIG. 14 is a diagram schematically illustrating a connected/disconnected state of the friction engagement device and a mode of the rotation transmission state switching device.

Figure 15:
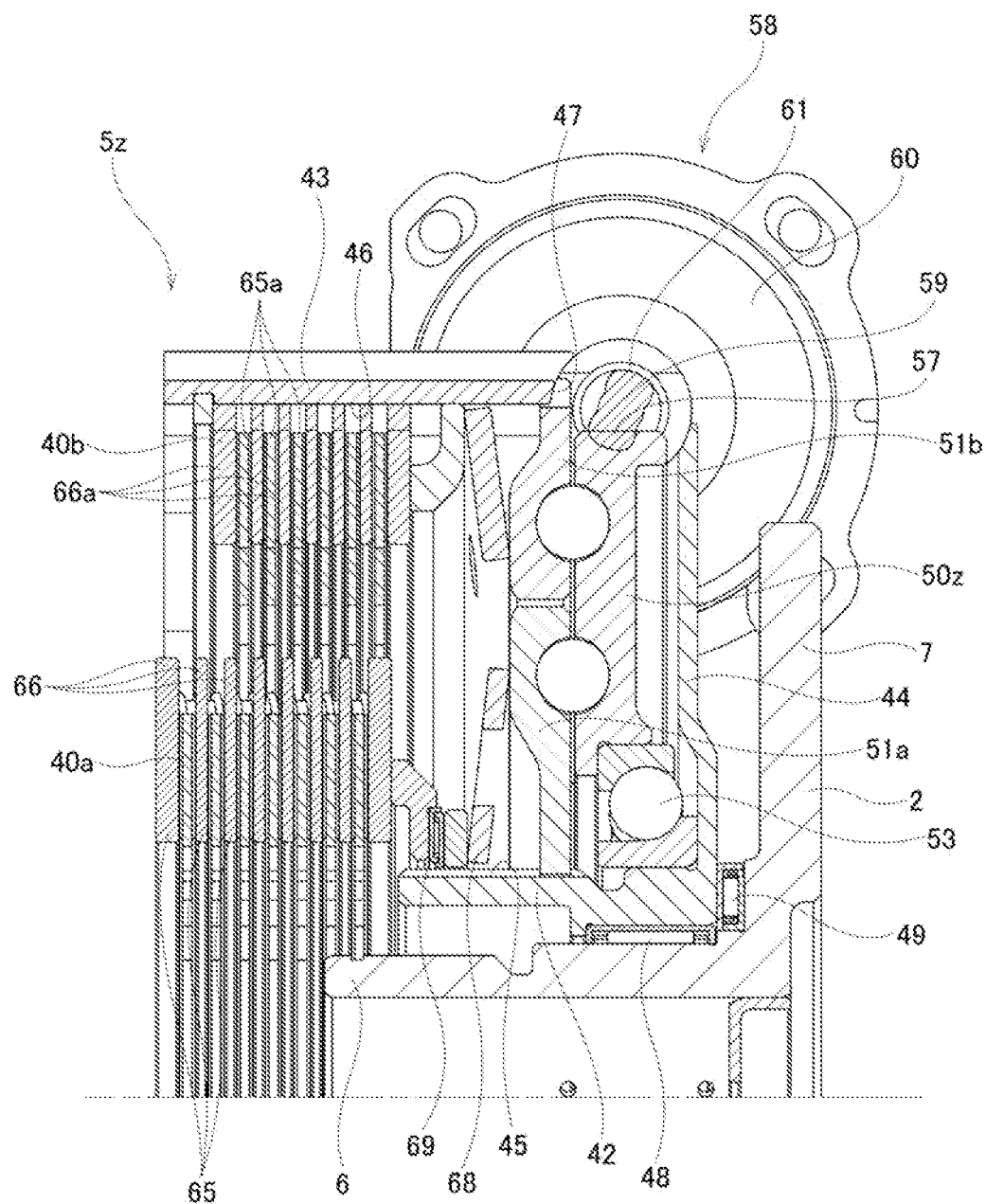

FIG. 15 is a cross-sectional view illustrating a power transmission path switching device of a comparative example.

Figure 16:
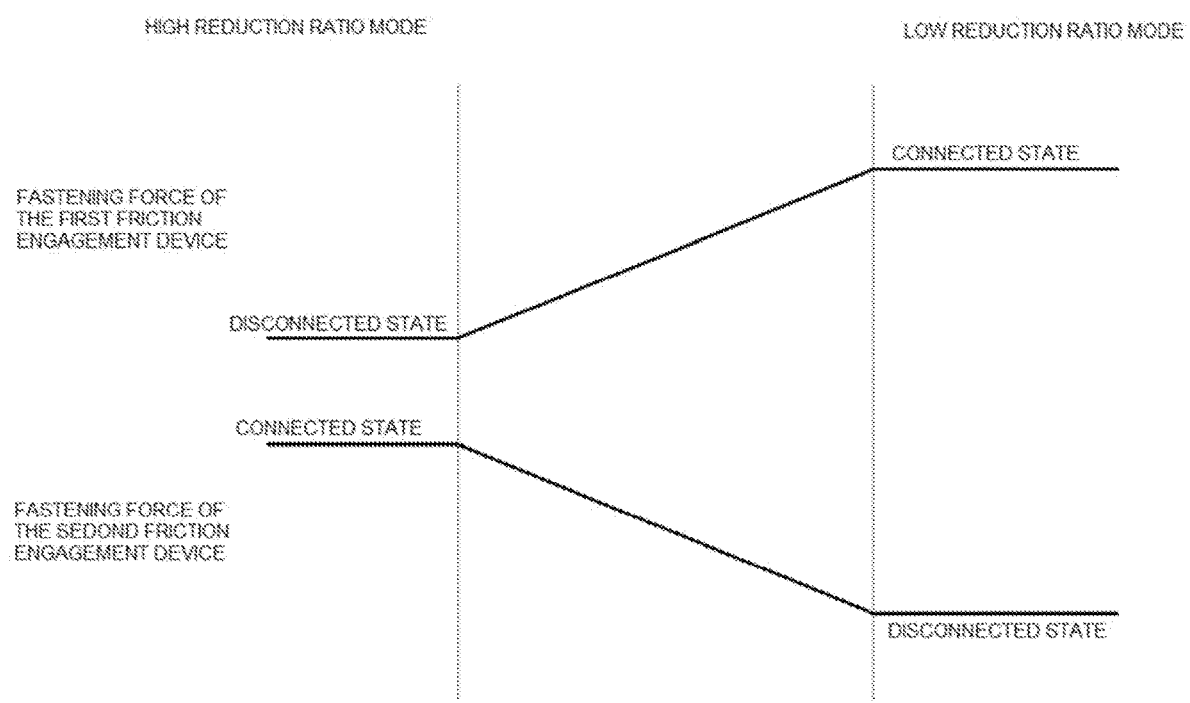

FIG. 16 is a diagram schematically illustrating a connected/disconnected state between a first friction engagement device and a second friction engagement device in the power transmission path switching device of the comparative example.

Figure 17:
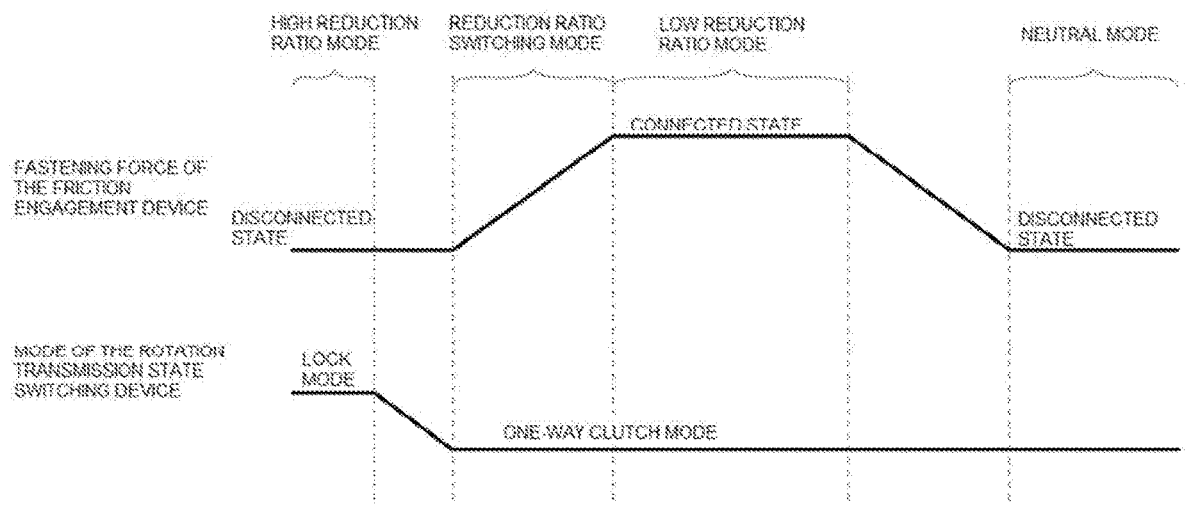
Figure 17:
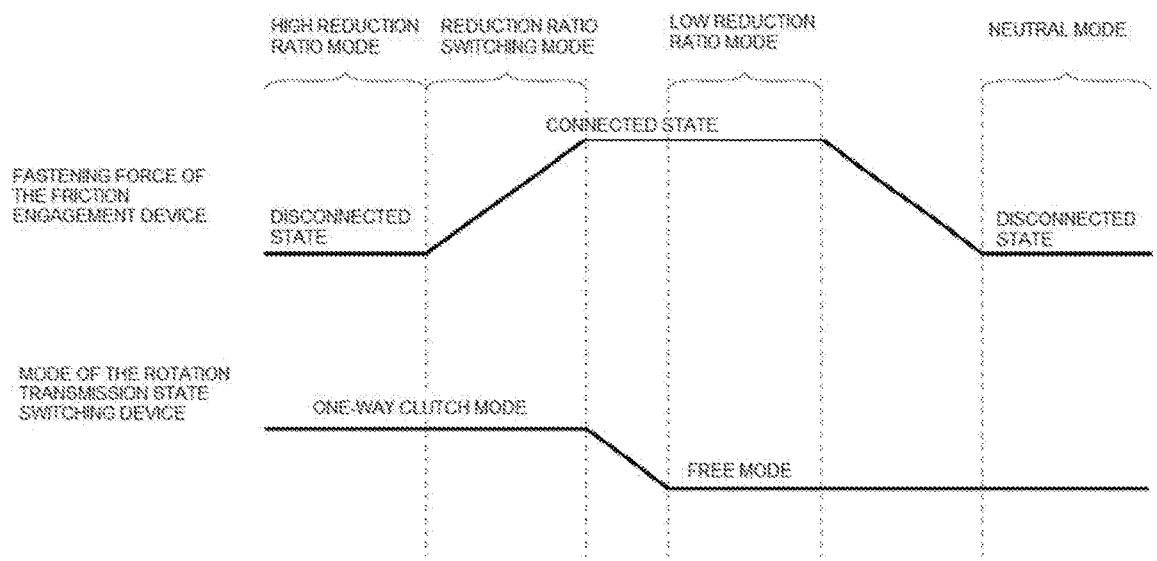

FIG. 17(A) is a view of a first example of a variation of the first example of an embodiment of the present invention, which corresponds to FIG. 14, and FIG. 17(B) is a view of a second example of a variation of the first example of an embodiment of the present invention, which corresponds to FIG. 14.

Figure 18:
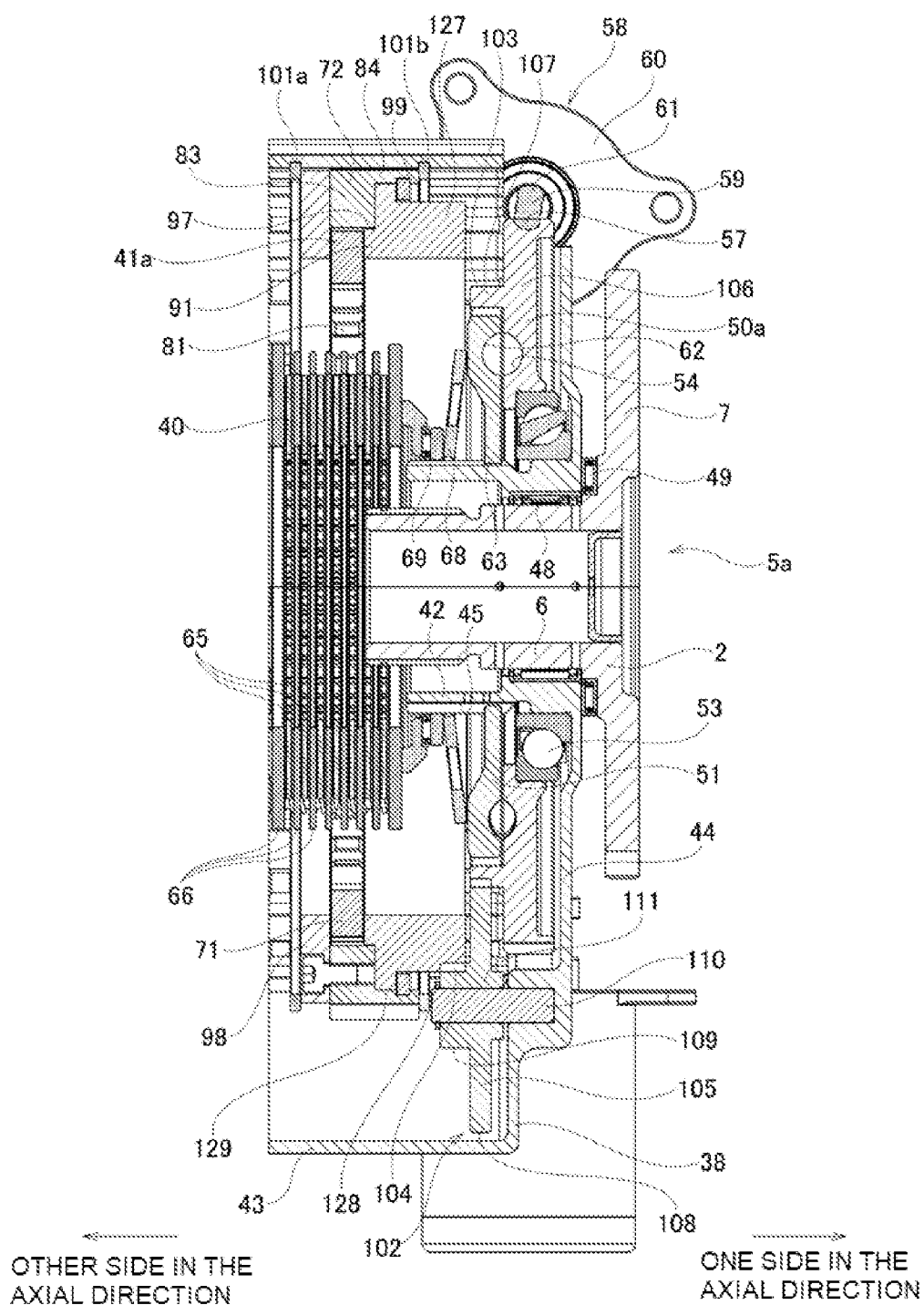

FIG. 18 is a cross-sectional view illustrating the power transmission path switching device, which has been extracted, in regard to a second example of an embodiment of the present invention.

Figure 19:
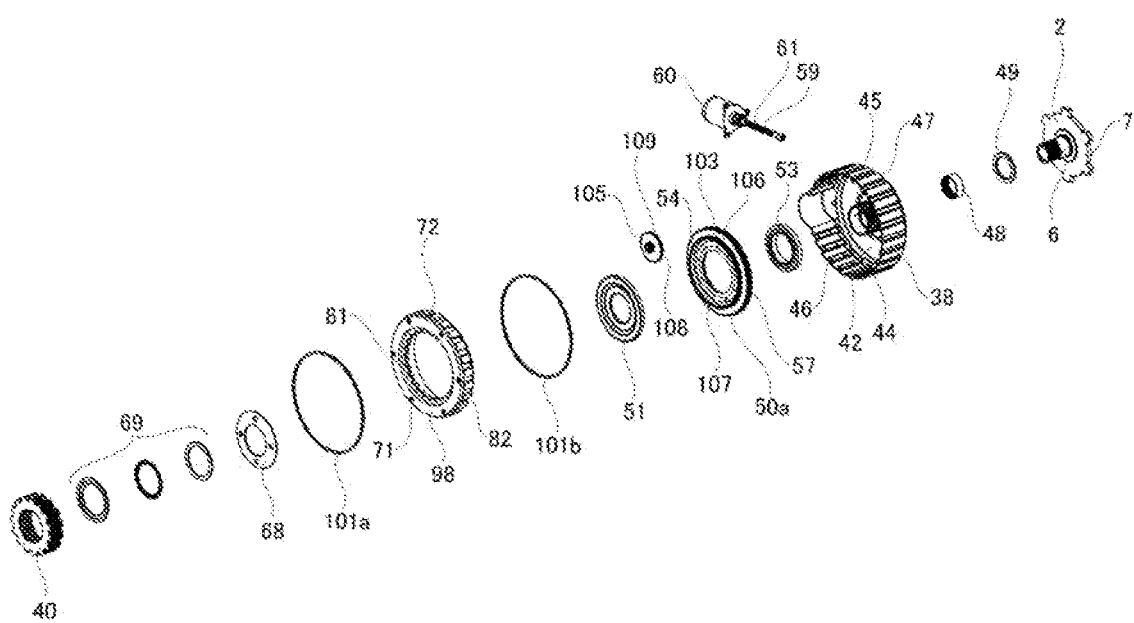

FIG. 19 is an exploded perspective view illustrating the power transmission path switching device, which has been extracted, in regard to the second example.

Figure 20:
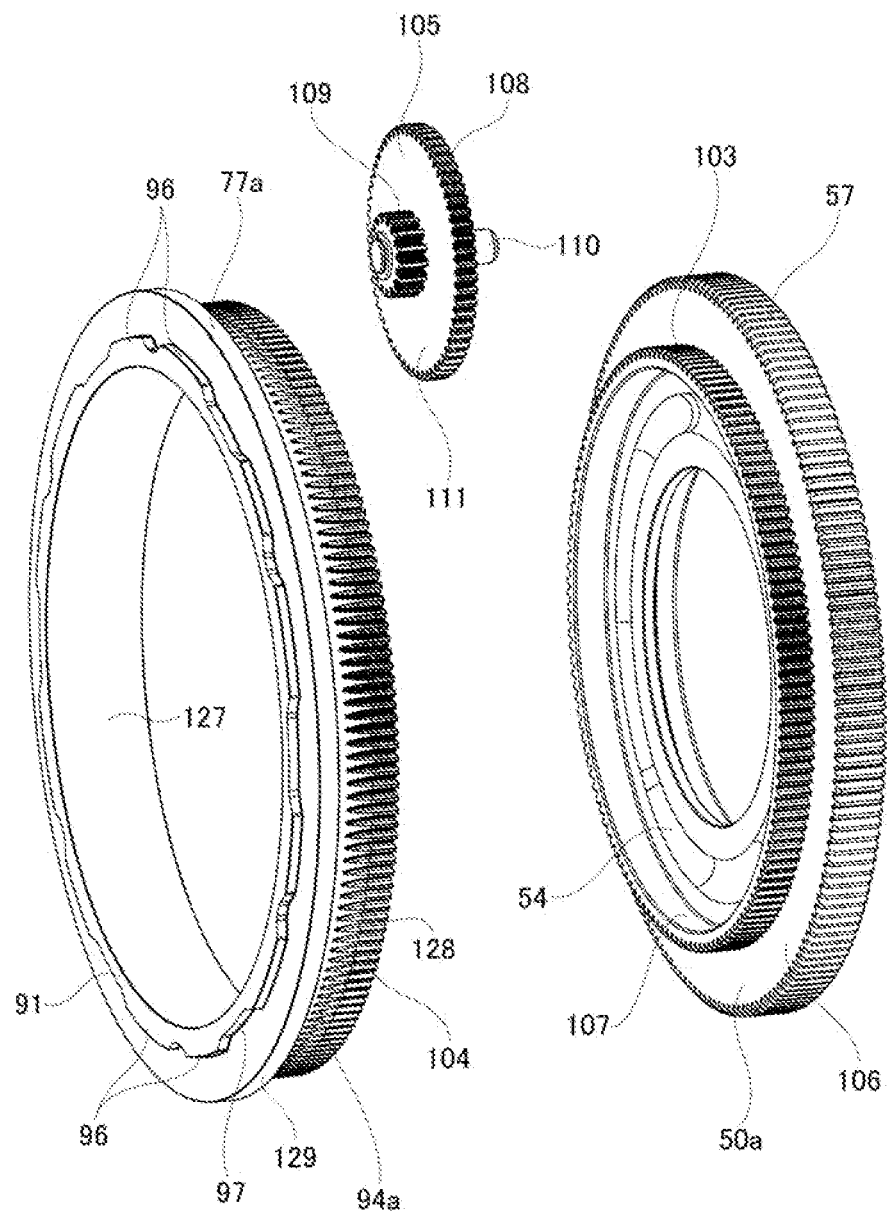

FIG. 20 is an exploded perspective view illustrating a drive cam, a two-stage gear, and a select plate, which have been extracted.

Figure 21:
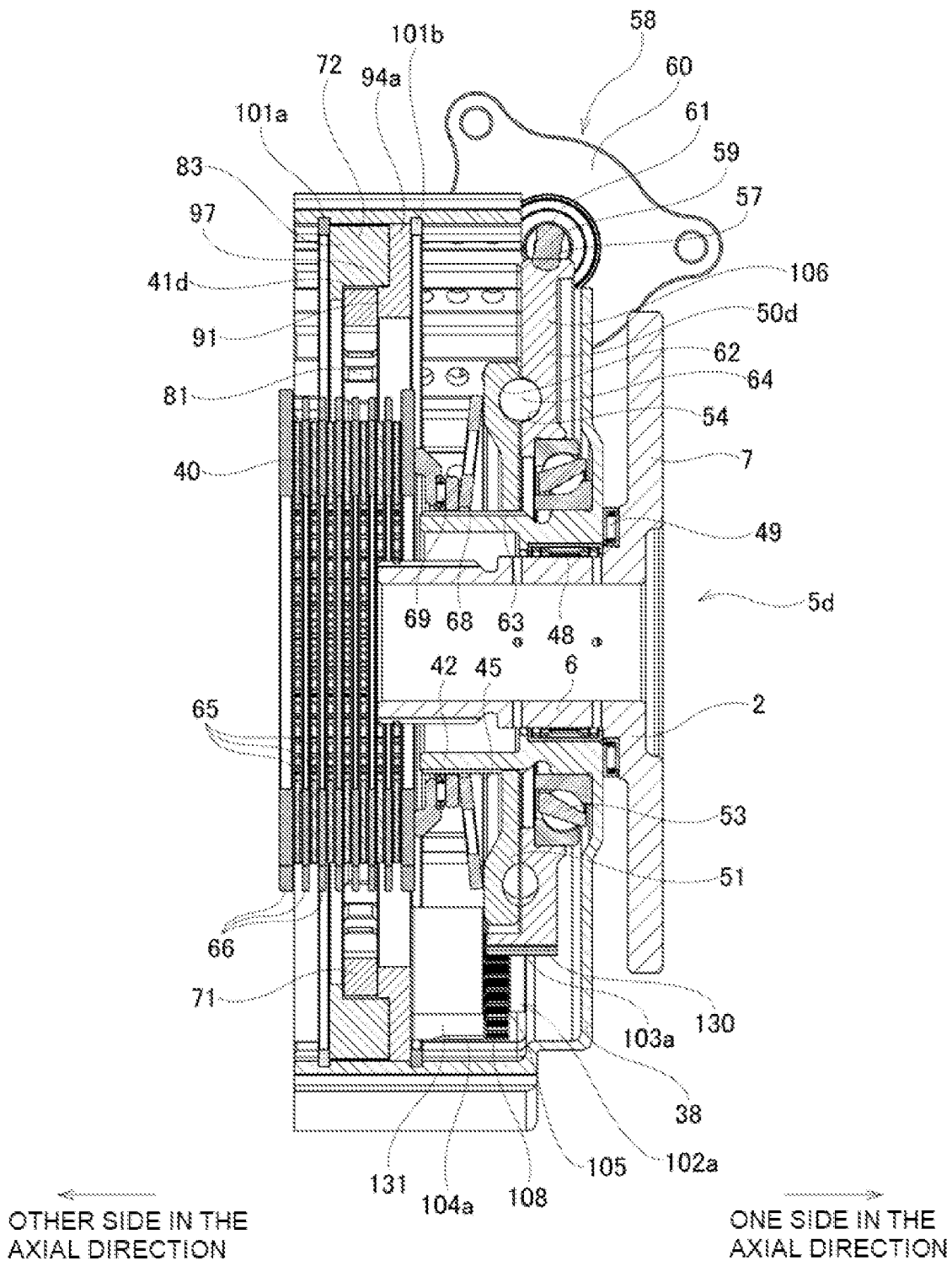

FIG. 21 is a cross-sectional view illustrating the power transmission path switching device, which has been extracted, in regard to a third example of an embodiment of the present invention.

Figure 22:
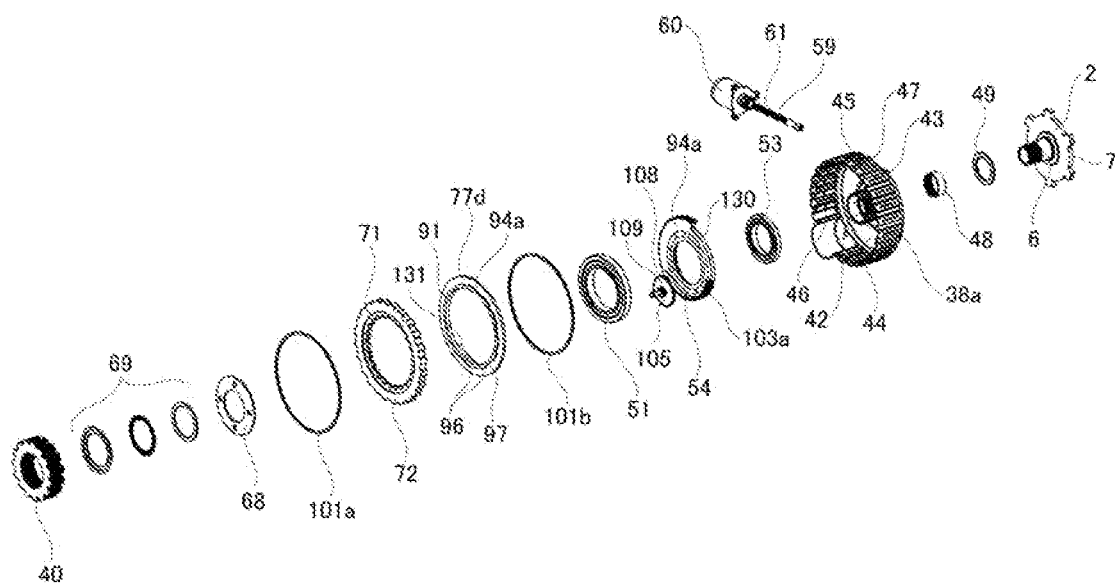

FIG. 22 is an exploded perspective view illustrating the power transmission path switching device, which has been extracted, in regard to the third example.

Figure 23:
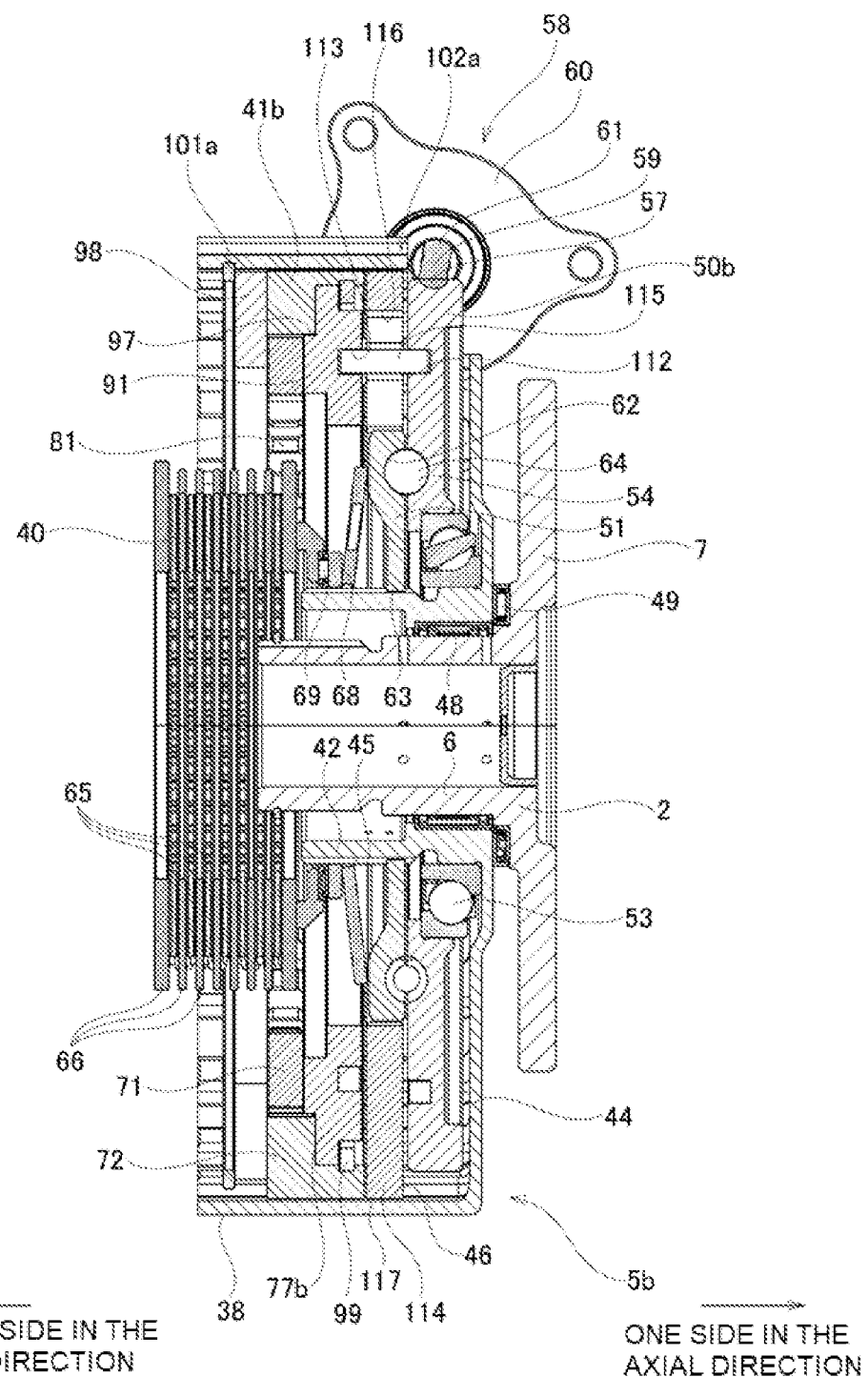

FIG. 23 is a cross-sectional view illustrating the power transmission path switching device, which has been extracted, in regard to a fourth example of an embodiment of the present invention.

Figure 24:
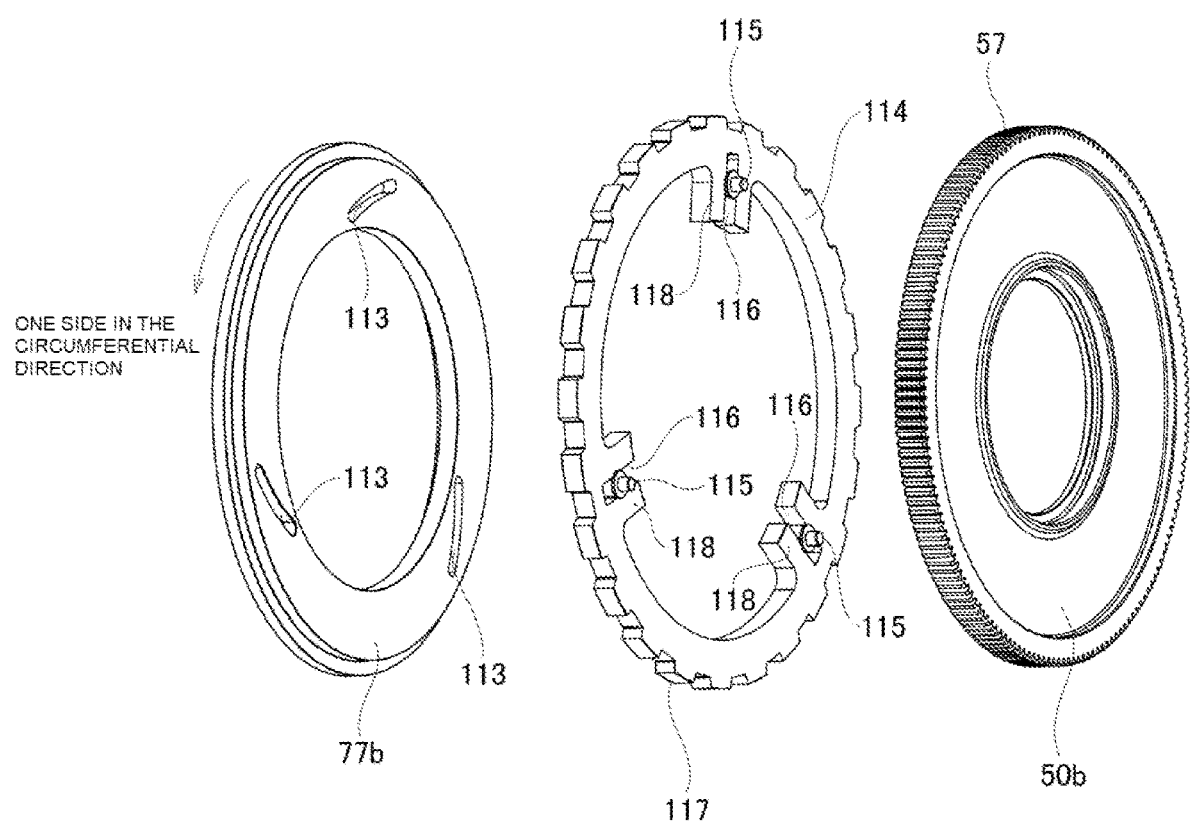

FIG. 24 is a perspective view of the drive cam, the guide plate, and the select plate, which have been extracted, as viewed from one side in the axial direction.

Figure 25:
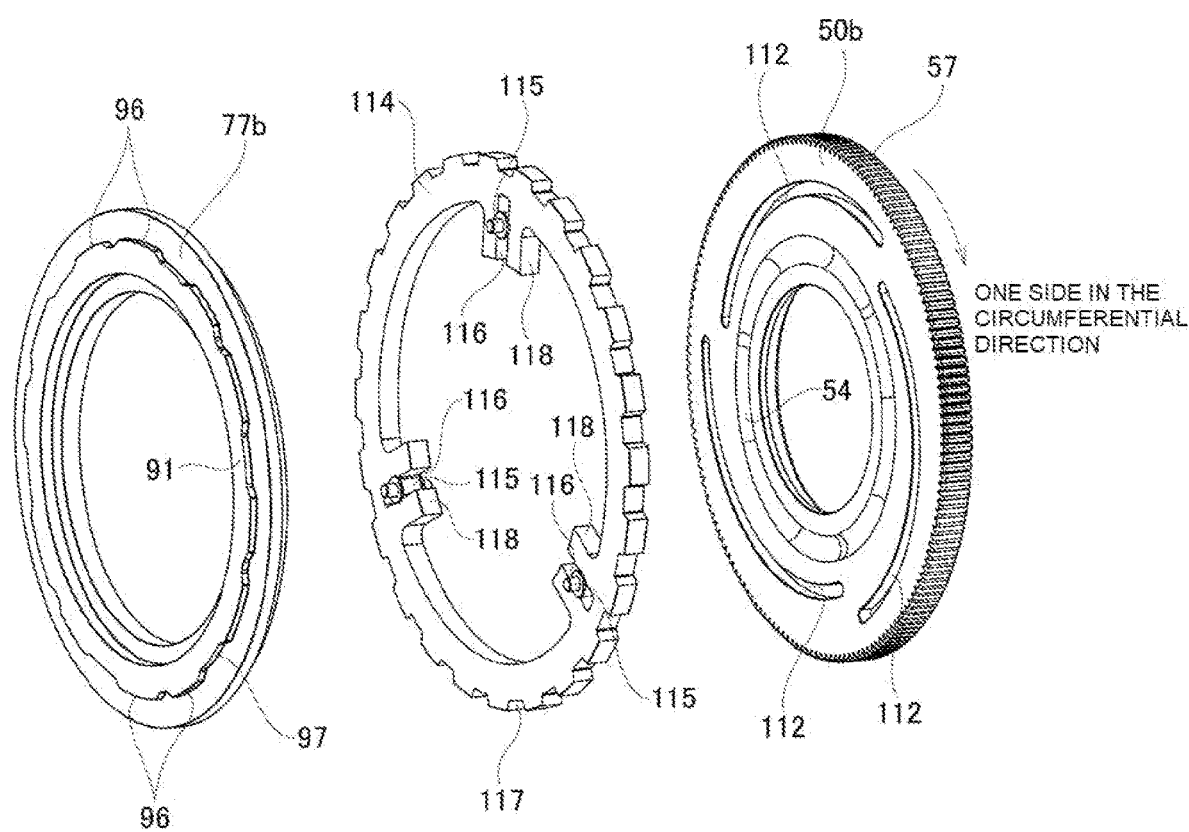

FIG. 25 is a perspective view of the drive cam, the guide plate, and the select plate, which have been extracted, as viewed from the other side in the axial direction.

Figure 26:
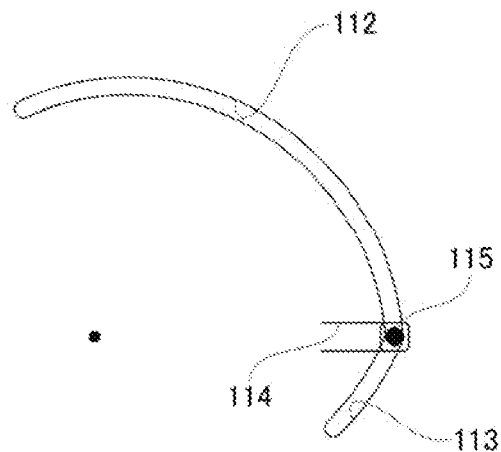
Figure 26:
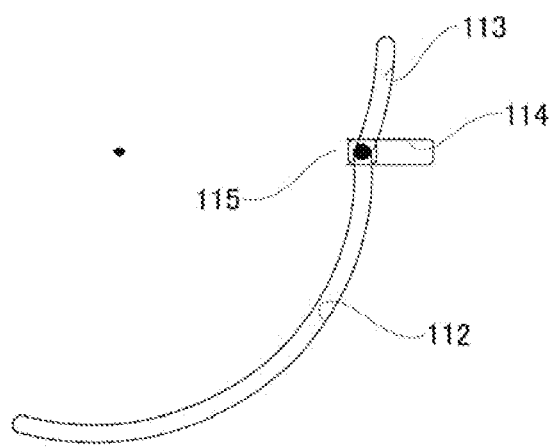
Figure 26:
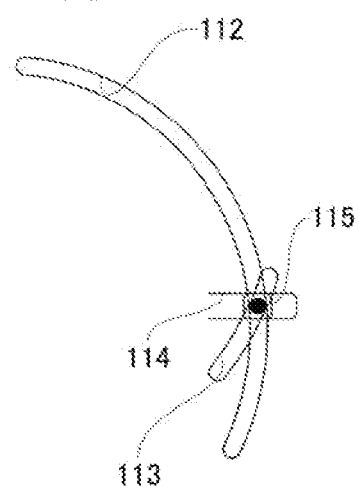

FIGS. 26(A) to 26(C) are schematic views illustrating engaged states between a cam-side groove, a guide groove and a plate-side groove, and an engaging pin, FIG. 26(A) is a schematic view illustrating the engaged state in the free mode, FIG. 26(B) is a schematic view illustrating the engaged state in the lock mode, and FIG. 26(C) a schematic view illustrating the engaged state in the one-way clutch mode.

Figure 27:
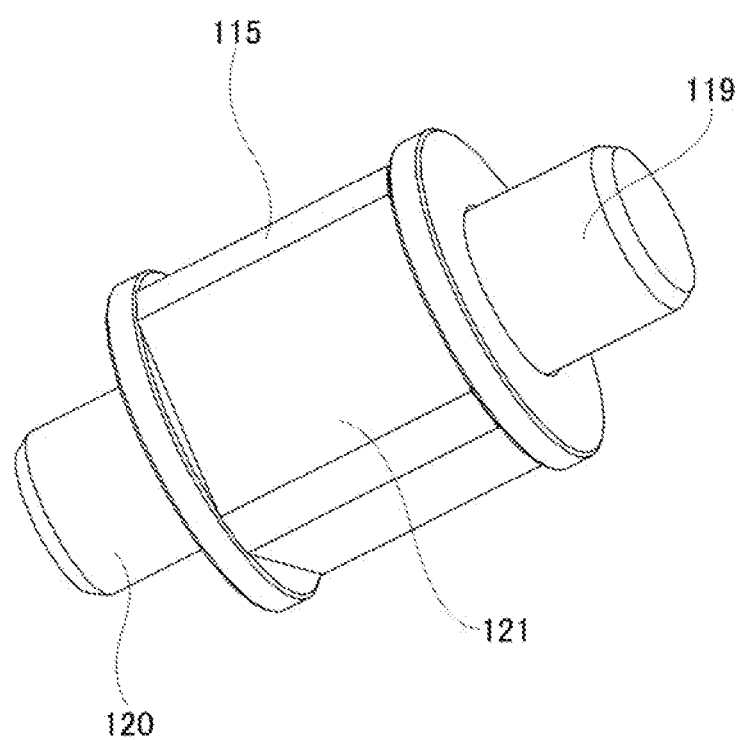

FIG. 27 is a perspective view illustrating the engaging pin, which has been extracted.

Figure 28:
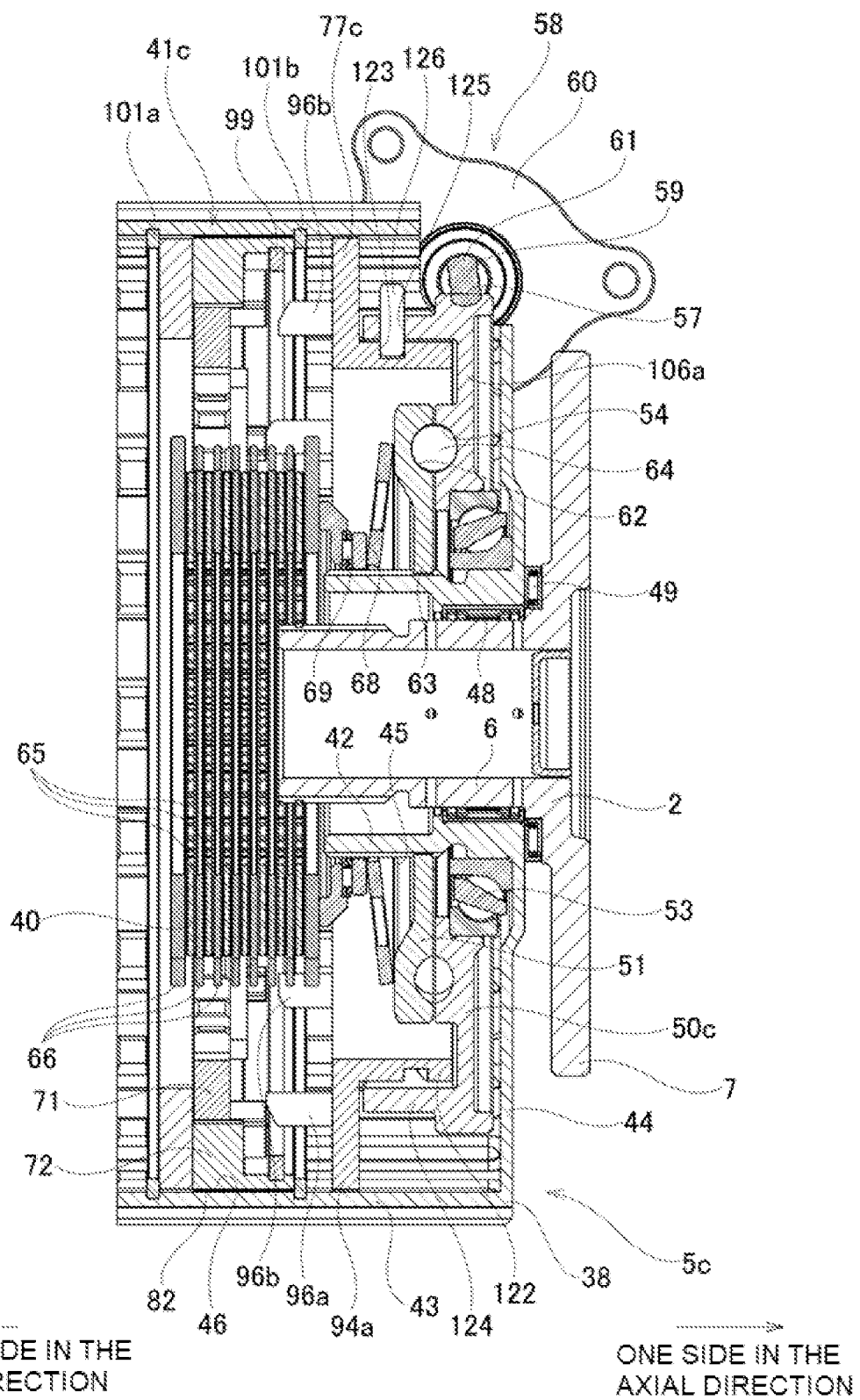

FIG. 28 is a cross-sectional view illustrating the power transmission path switching device, which has been extracted, in regard to a fifth example of an embodiment of the present invention.

Figure 29:
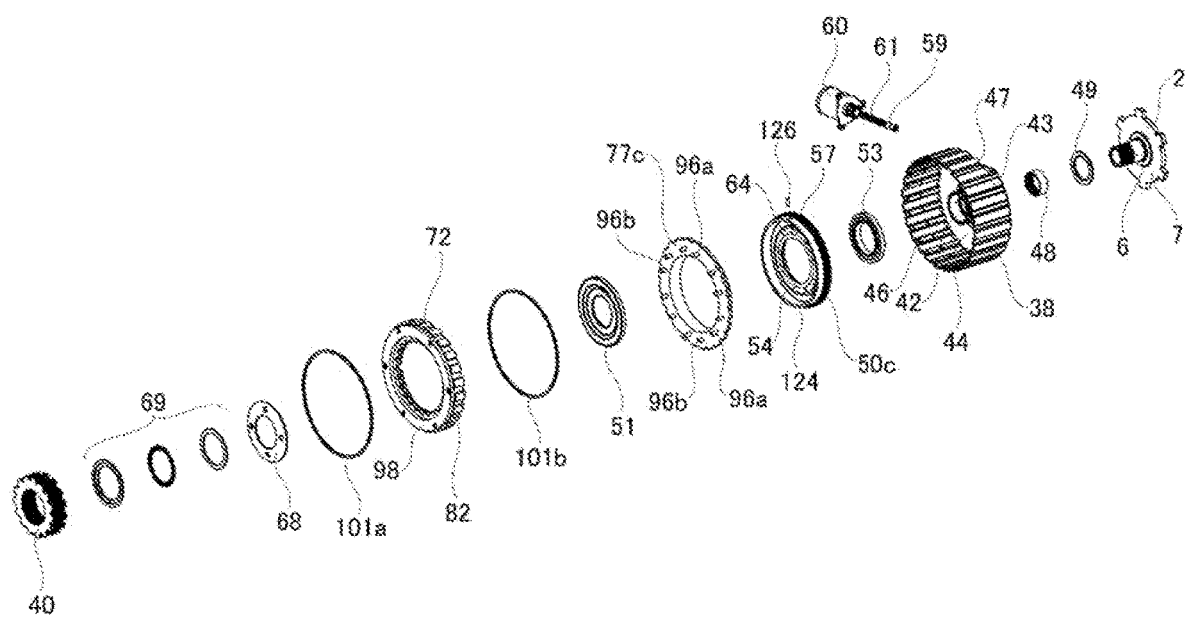

FIG. 29 is an exploded perspective view illustrating the power transmission path switching device, which has been extracted, in regard to the fifth example.

Figure 30:
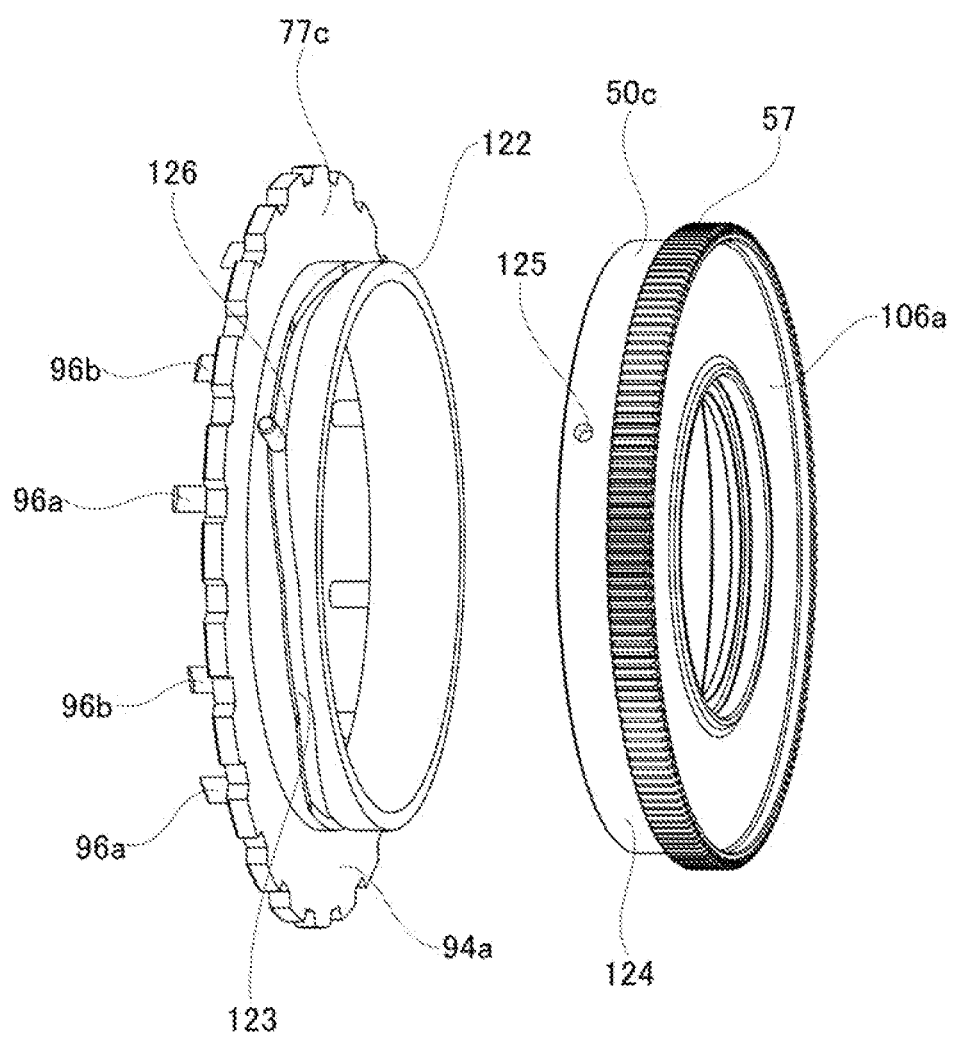

FIG. 30 is an exploded perspective view illustrating the drive cam and the select plate, which have been extracted.

Figure 31:
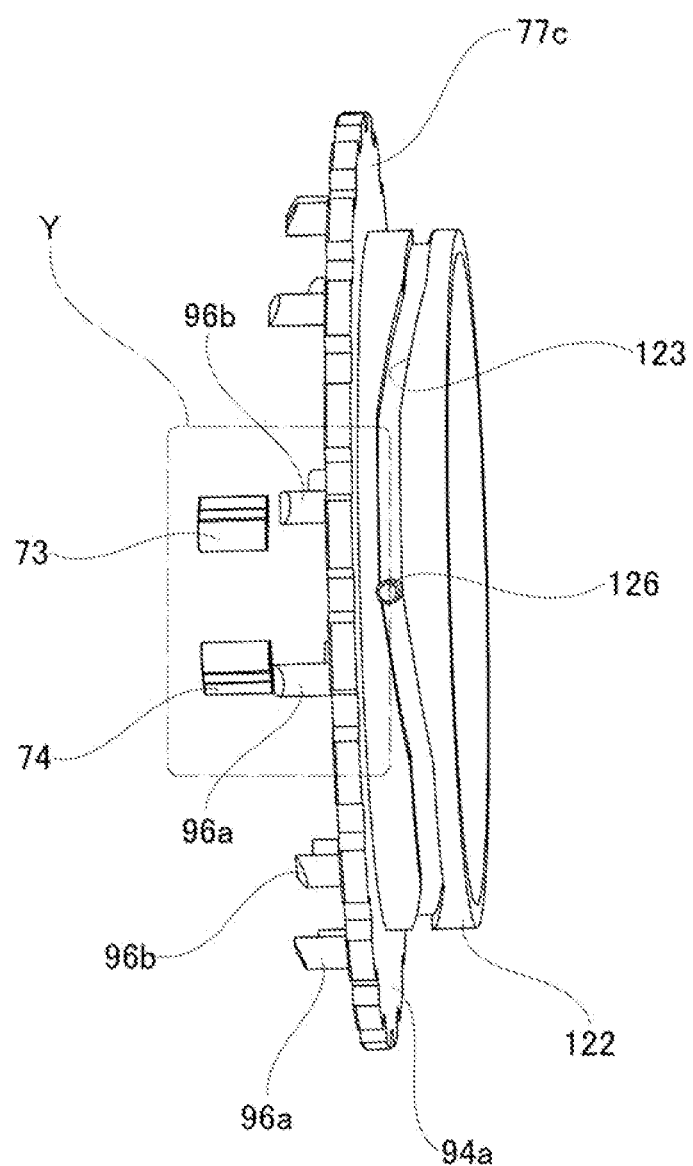

FIG. 31 is a perspective view illustrating the select plate, a first claw member and a second claw member, and the engaging pin, which have been extracted.

Figure 32:
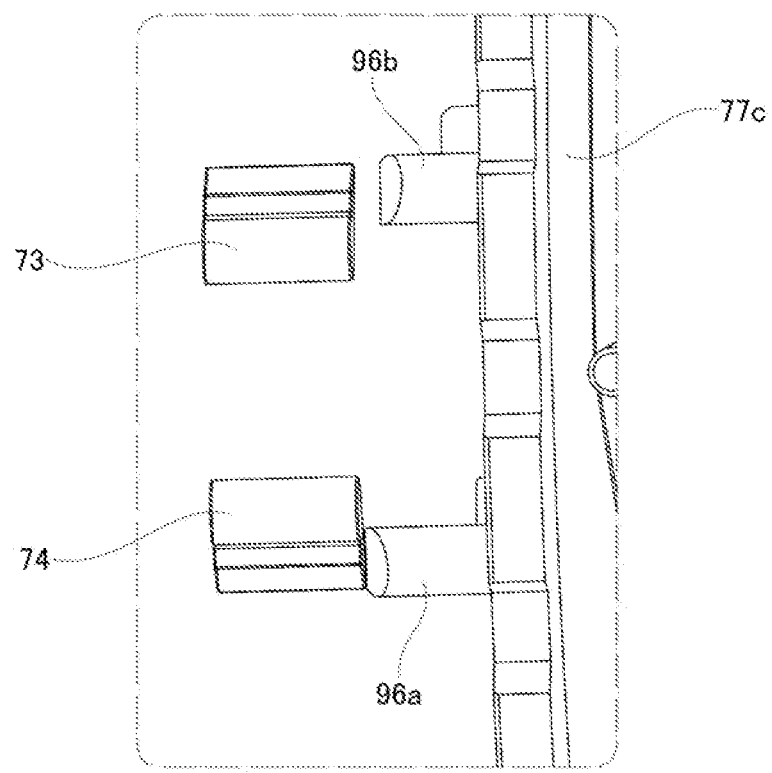

FIG. 32 is an enlarged view of a section Y of FIG. 31.

Figure 33:
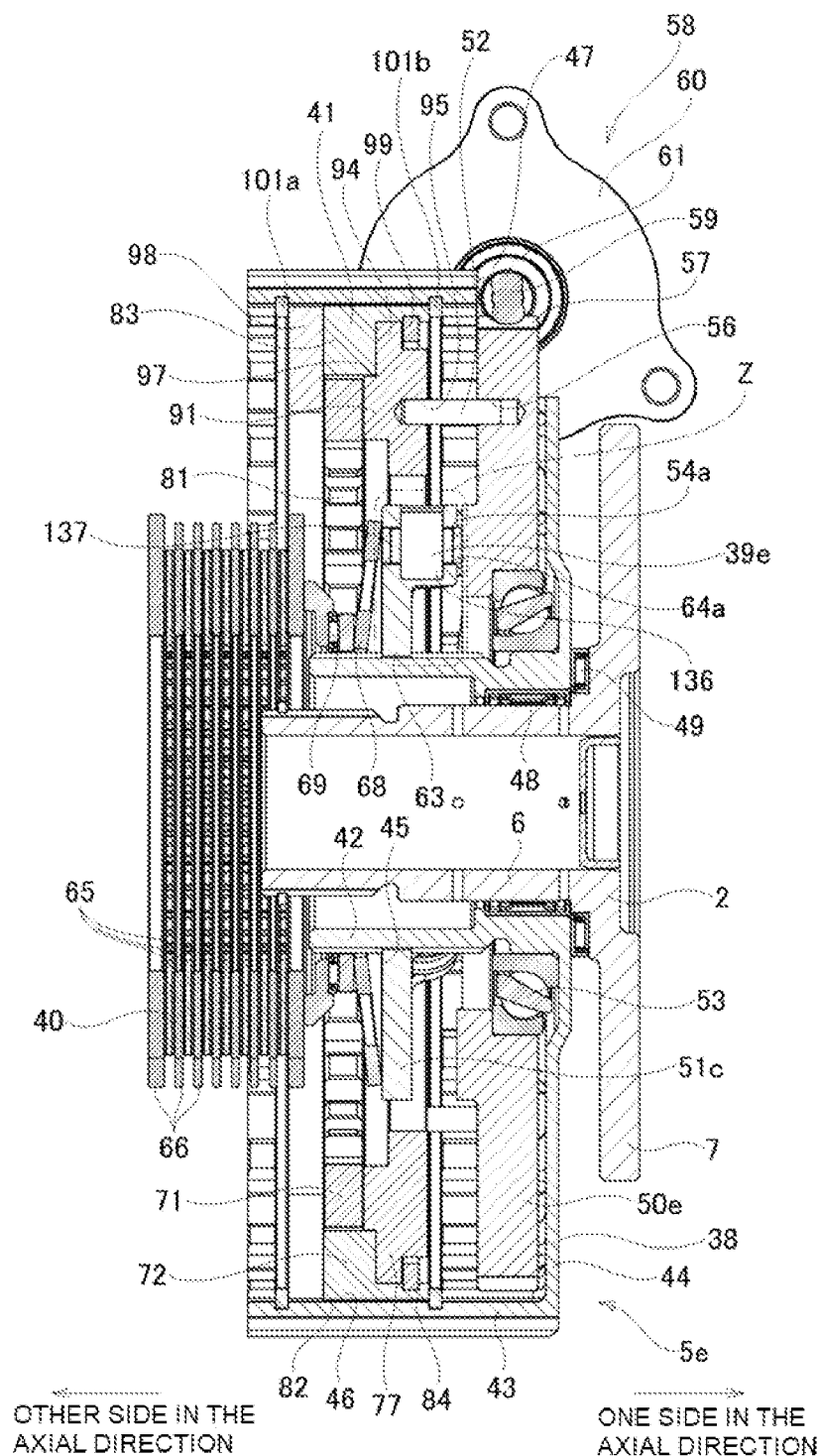

FIG. 33 is a cross-sectional view illustrating the two-speed transmission of a sixth example of an embodiment of the present invention.

Figure 34:
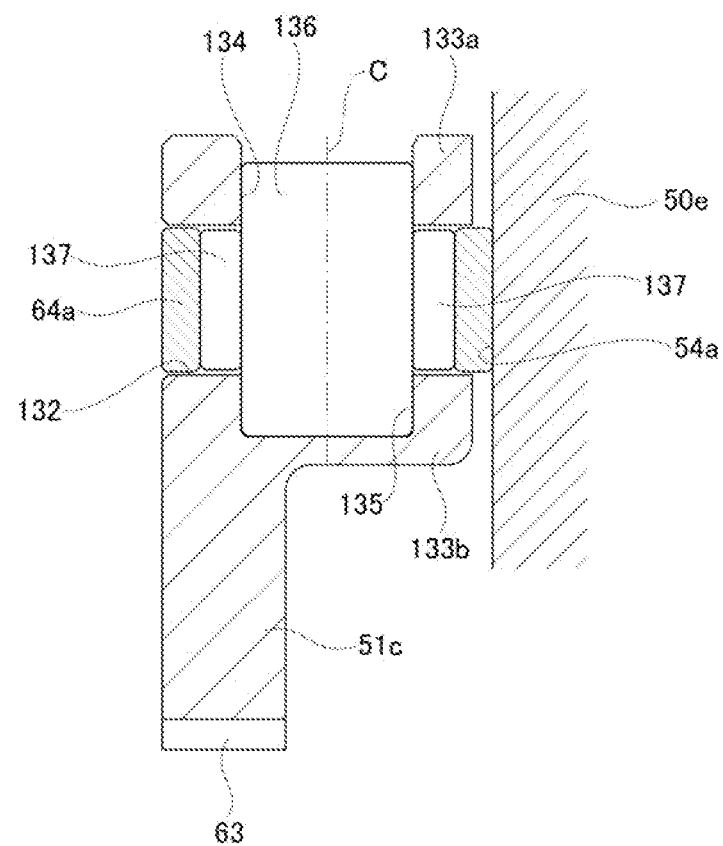

FIG. 34 is an enlarged view of a section Z of FIG. 33.

Figure 35:
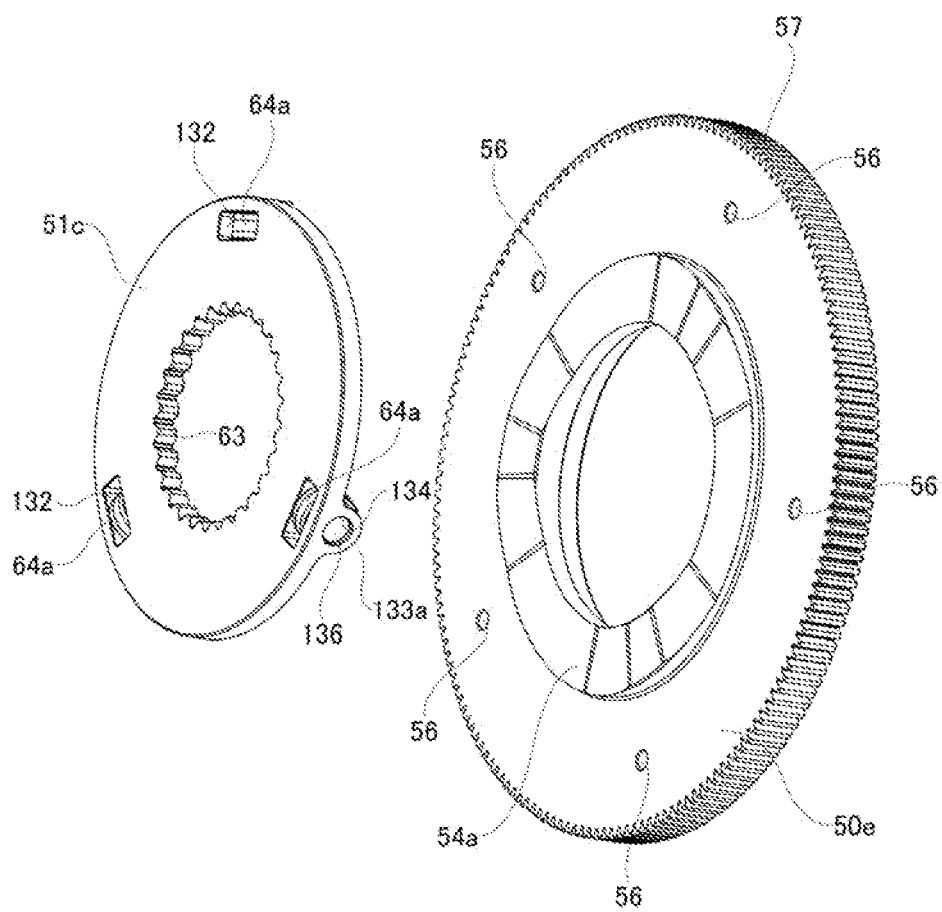

FIG. 35 is an exploded perspective view illustrating the cam device, which has been extracted, in regard to the sixth example.

Figure 36:
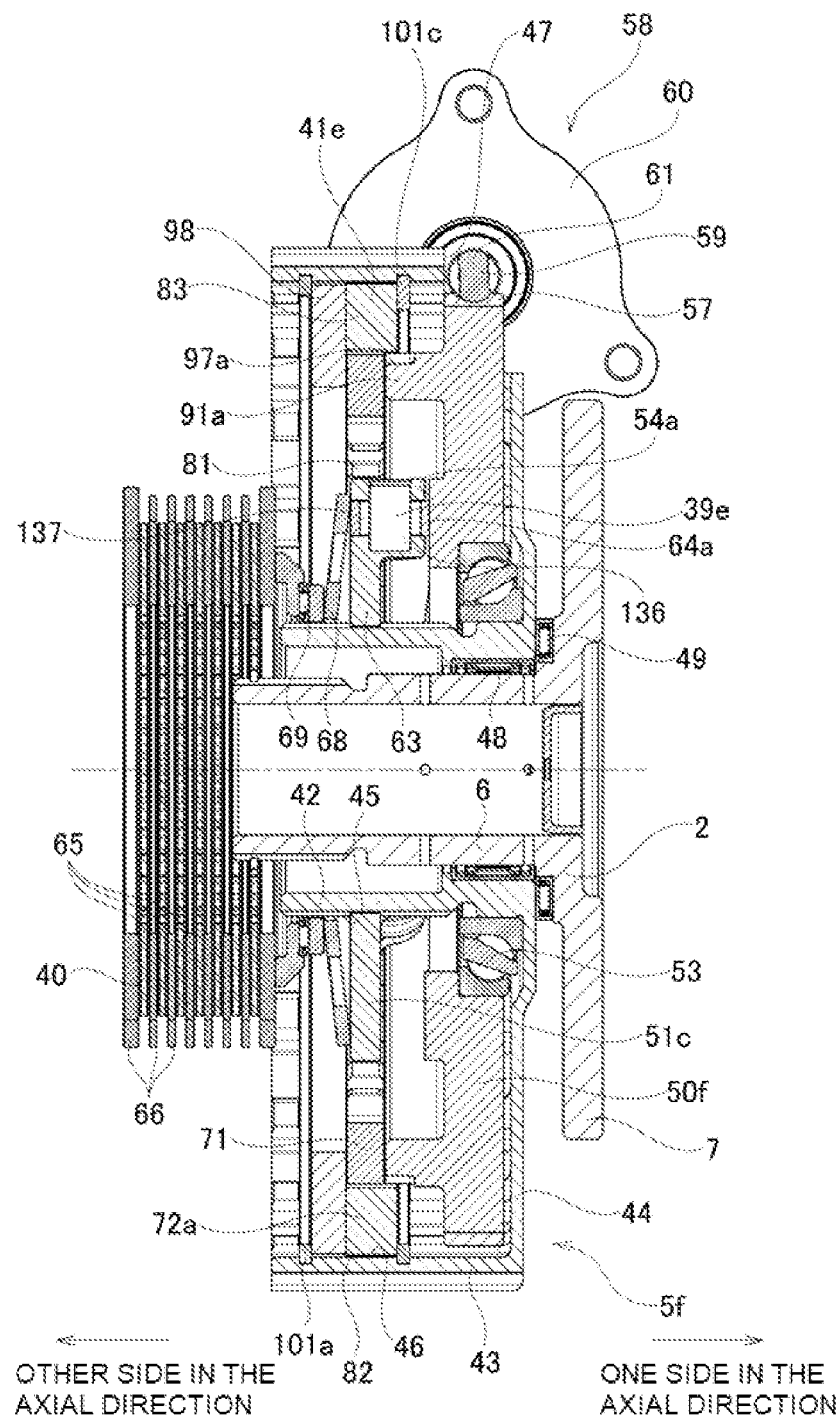

FIG. 36 is a cross-sectional view illustrating the two-speed transmission of a seventh example of an embodiment of the present invention.

Figure 37:
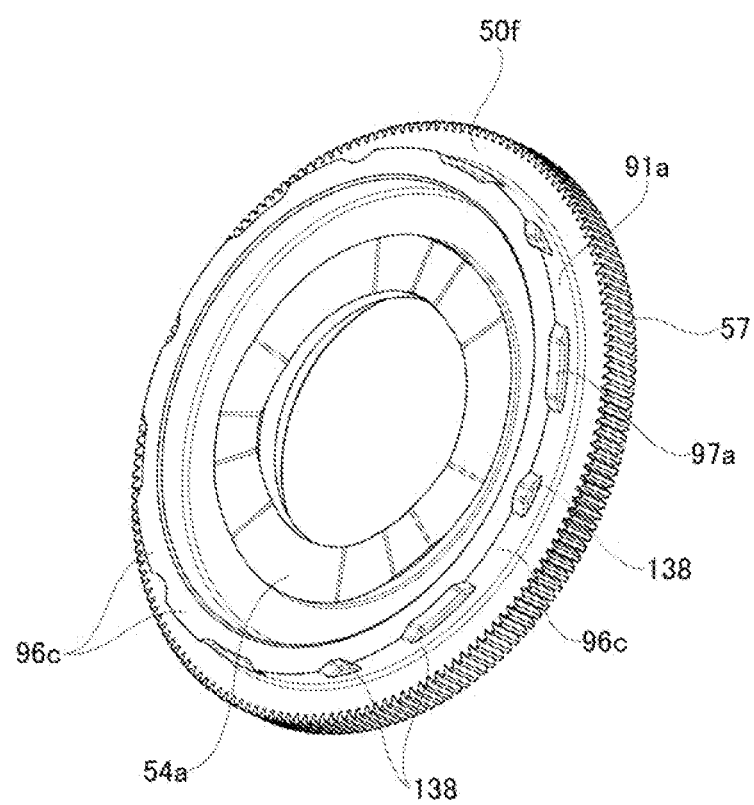

FIG. 37 is a perspective view illustrating the drive cam, which has been extracted, in regard to the seventh example.

Figure 38:
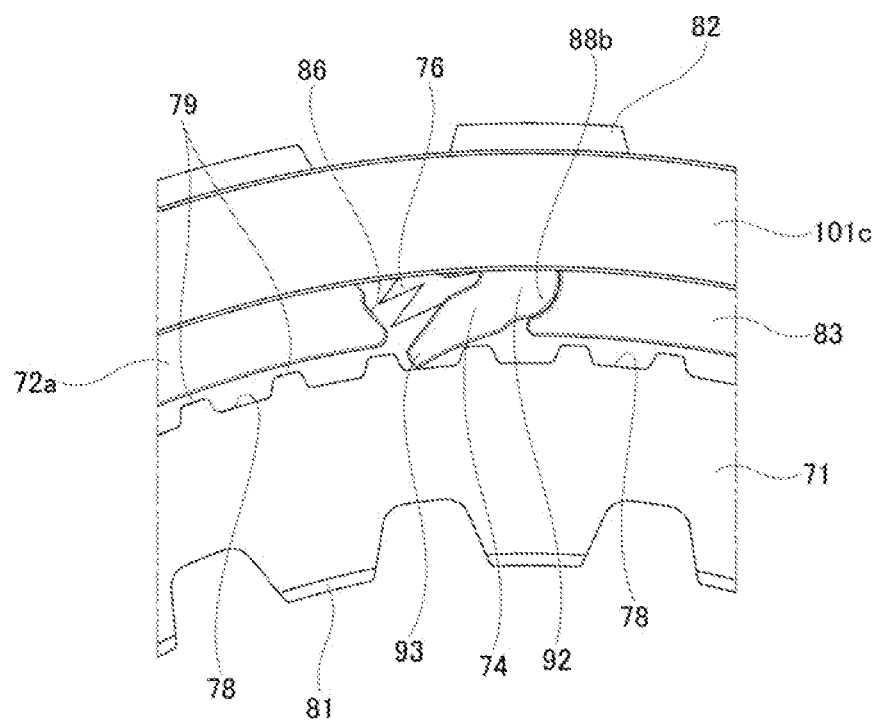

FIG. 38 is a partial enlarged view illustrating a main part in a rotation transmission state, in regard to the seventh example.

Figure 39:
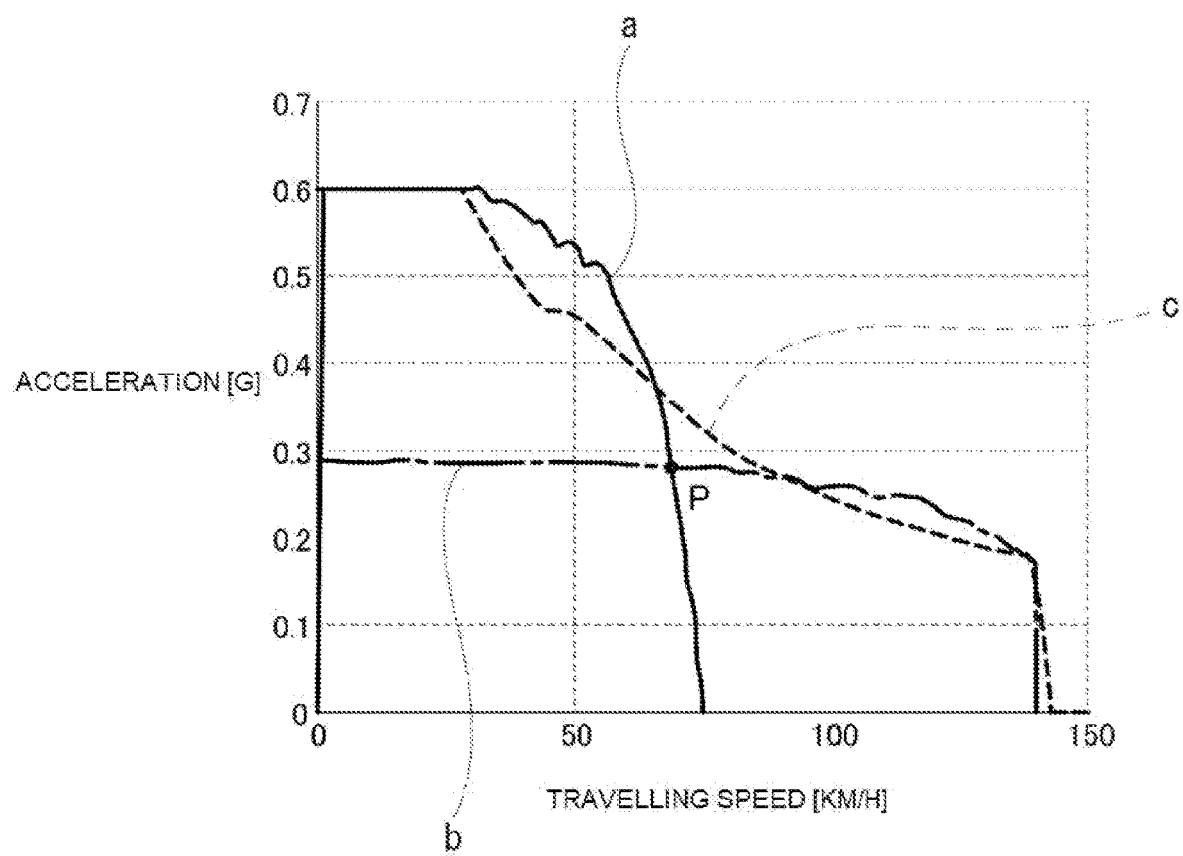

FIG. 39 is a diagram for describing an effect obtained by incorporating a transmission in a drive unit employing an electric motor as a drive source.

DESCRIPTION OF EMBODIMENTS

First Example

The first example of an embodiment of the present invention will be described with reference to FIGS. 1 to 14. A two-speed transmission 1 of this example is, for example, arranged between an output shaft of an electric motor, which is a power source for electric automobiles or hybrid automobiles, and a differential gear, so as to transmit torque of the output shaft of the electric motor to the differential gear with increasing the torque (reducing the speed), or as it is without increasing the torque (reducing the speed). The two-speed transmission of this example includes an input member 2, an output member 3, a planetary gear mechanism 4, and a power transmission path switching device 5, and is configured so as to be able to switch a reduction ratio between the input member 2 and the output member 3 in high and low two speeds.

The input member 2 is connected to a drive shaft (not illustrated) such as the output shaft of the electric motor, so that torque (power) is inputted thereto. In this example, the input member 2 includes an input cylindrical portion 6, and an input flange portion 7 bent outward in the radial direction from the end portion on one side in the axial direction (right side in FIGS. 2 to 8) of the input cylindrical portion 6. The drive shaft is, for example, internally fitted in the inner circumferential surface of the input cylindrical portion 6 so that torque transmission is possible, or coupled with the input flange portion 7 by bolt fastening or the like so that torque transmission is possible.

The output member 3 is arranged coaxially with the input member 2, and is connected to a driven shaft (not illustrated) such as the differential gear and a propeller shaft, so as to output torque to the driven shaft. In this example, the output member 3 includes an output cylindrical portion 9 having a female spline portion 8 in the inner circumferential surface, and an output flange portion 10 bent outward in the radial direction from the end portion on the other side in the axial direction (left side in FIGS. 2 to 8) of the output cylindrical portion 9. The driven shaft is connected to the output member 3 so that torque transmission is possible by spline engagement of a male spline portion provided on the outer circumferential surface of the tip-end portion thereof with the female spline portion 8 of the output cylindrical portion 9.

As illustrated in FIGS. 2 to 4(B), the planetary gear mechanism 4 is arranged between the input member 2 and the output member 3 with respect to a transmission direction of power, and includes a sun gear 11, a ring gear 12, a carrier 13, and a plurality of pinion gears 14.

The sun gear 11 is connected to the input member 2 so as to rotate integrally with the input member 2. In this example, the sun gear 11 includes a small-diameter cylindrical portion 15 formed on the one side in the axial direction, a large-diameter cylindrical portion 16 formed on the other side in the axial direction, and a flange portion 17 bent outward in the radial direction from the end portion on the other side in the axial direction of the large-diameter cylindrical portion 16. The sun gear 11 includes a sun-side male spline portion 18 on the outer circumferential surface of the large-diameter cylindrical portion 16, and includes a gear portion 19, which is a spur gear or a helical gear, on the outer circumferential surface of the flange portion 17. The small-diameter cylindrical portion 15 of the sun gear 11 is externally fitted onto the input cylindrical portion 6 of the input member 2 by a structure capable of transmitting torque such as spline engagement.

The ring gear 12 is supported around the sun gear 11 so as to be coaxial with the sun gear 11, and be able to relatively rotate with respect to the sun gear 11. In this example, the ring gear 12 includes a small-diameter cylindrical portion 20 formed on the one side in the axial direction, a large-diameter cylindrical portion 21 formed on the other side in the axial direction, and a circular ring portion 22 connecting the end portion on the other side in the axial direction of the small-diameter cylindrical portion 20 and the end portion on the one side in the axial direction of the large-diameter cylindrical portion 21. The ring gear 12 includes a ring-side male spline portion 23 on the outer circumferential surface of the small-diameter cylindrical portion 20, and includes a gear portion 24, which is a spur gear or a helical gear, on the inner circumferential surface of the large-diameter cylindrical portion 21.

The carrier 13 is supported coaxially to the sun gear 11 and the ring gear 12, and is connected to the output member 3 so as to be able to rotate integrally with the output member 3. In this example, the carrier 13 includes a pair of rim portions 25a, 25b that have a circular ring shape respectively, and are arranged at an interval in the axial direction, columnar portions 26 spanning between a plurality of positions in the circumferential direction of the pair of rim portions 25a, 25b which match each other, and a cylindrical portion 27 protruding from the intermediate portion in the radial direction of the one side surface in the axial direction of the rim portion 25a, which is arranged on the one side in the axial direction, of the pair of rim portions 25a, 25b, toward the one side in the axial direction over the entire circumference.

The carrier 13 includes circular holes 28a penetrating in the axial direction at a plurality of positions in the circumferential direction of a portion of the rim portion 25a located on the one side in the axial direction which exists further on the outer side in the radial direction than the cylindrical portion 27, and includes a carrier-side female spline portion 29 on the inner circumferential surface of the cylindrical portion 27. In addition, the carrier 13 includes circular holes 28b penetrating in the axial direction at positions of the rim portion 25b, which is arranged on the other side in the axial direction, of the pair of rim portions 25a, 25b, which match the circular holes 28a of the rim portion 25a arranged on the one side in the axial direction. The carrier 13 is configured so as to rotate integrally with the output member 3 by connecting the rim portion 25b, which is arranged on the other side in the axial direction, to the output flange portion 10 of the output member 3 by a structure capable of transmitting torque such as spline engagement.

Each of the pinion gears 14 meshes with the sun gear 11 and the ring gear 12, and is supported by the carrier 13 so as to be able to freely rotate about its own center axis. In this example, each of the pinion gears 14 is constituted by supporting a cylindrical main body portion 31 around the intermediate portion in the axial direction of a columnar supporting shaft 30 through a radial needle bearing 32 so as to be able to rotate freely. The main body portion 31 includes a gear portion 33 on the outer circumferential surface, which is a spur gear or a helical gear, and meshes with the gear portion 19 of the sun gear 11 and the gear portion 24 of the ring gear 12. End portions on both sides in the axial direction of the supporting shaft 30 are internally fitted and fixed in the circular holes 28a, 28b of the carrier 13, respectively.

Note that, in this example, the other side surface in the axial direction of a spacer 35, which is arranged so that displacement toward the one side in the axial direction is prevented by a retaining ring 34a which is locked on the outer circumferential surface of the intermediate portion in the axial direction of the large-diameter cylindrical portion 16 of the sun gear 11, abuts against one side surface in the axial direction of the inner side portion in the radial direction of the rim portion 25a, which is arranged on the one side in the axial direction, through a thrust bearing 36a. Furthermore, one side surface in the axial direction of the inner side portion in the radial direction of a pressing plate 37, which is arranged so that displacement toward the other side in the axial direction is prevented by a retaining ring 34b which is locked on the inner circumferential surface of the end portion on the other side in the axial direction of the large-diameter cylindrical portion 21 of the ring gear 12, abuts against the other side surface in the axial direction of the inner side portion in the radial direction of the rim portion 25b (the output flange portion 10 of the output member 3), which is arranged on the other side in the axial direction, through a thrust bearing 36b. Due to this, in the assembled state of the planetary gear mechanism 4, it is possible to prevent the sun gear 11, the ring gear 12, the carrier 13, and the pinion gear 14 from being separated from each other. In short, the planetary gear mechanism 4 can be integrally handled as a sub-assembly.

The power transmission path switching device 5 switches a power transmission path between the input member 2 and the output member 3. The power transmission path switching device 5 of this example includes a housing 38 that does not rotate even in use, a cam device 39, a friction engagement device 40, and a rotation transmission state switching device 41.

The housing 38 includes an inner-diameter-side cylinder portion 42, an outer-diameter-side cylinder portion 43, and a side plate portion 44 having a circular ring shape and connecting the end portion on one side in the axial direction of the inner-diameter-side cylinder portion 42 and the end portion on one side in the axial direction of the outer-diameter-side cylinder portion 43. The housing 38 includes a fixed-side male spline portion 45 on the outer circumferential surface of the inner-diameter-side cylinder portion 42, and includes a fixed-side female spline portion 46 on the inner circumferential surface of the outer-diameter-side cylinder portion 43. In addition, the housing 38 further includes a through hole 47 in one side portion in the axial direction of the outer-diameter-side cylinder portion 43, which penetrates in the radial direction and extends in the circumferential direction.

In this example, a radial needle bearing 48 is arranged between the inner circumferential surface of the inner-diameter-side cylinder portion 42 of the housing 38 and the outer circumferential surface of the input cylindrical portion 6 of the input member 2, and a thrust needle bearing 49 is arranged between one side surface in the axial direction of the side plate portion 44 and the other side surface in the axial direction of the input flange portion 7, so that the input member 2 is supported by the housing 38 so as to be able to rotate freely.

As illustrated in FIGS. 5 and 7, the cam device 39 includes a drive cam 50 supported so that rotation is possible and displacement in the axial direction is not possible, a driven cam 51 that is supported so that relative rotation with respect to the drive cam 50 and displacement in the axial direction are possible, and that is configured to displace in the axial direction according to rotation of the drive cam 50, and a plurality of (five in the illustrated example) engaging pins 52.

The drive cam 50 has a circular ring shape, and is supported on the outer circumferential surface of the end portion on one side in the axial direction of the inner-diameter-side cylinder portion 42 of the housing 38 through an angular ball bearing 53, which is able to support both a radial load and a thrust load, so that free rotation is possible and displacement in the axial direction is not possible.

The drive cam 50 has a drive cam surface 54 constituted by alternately arranging recess portions and convex portions of the same number as each other with respect to the circumferential direction on the inner side portion on the radial direction of the other side surface in the axial direction. The drive cam surface 54 has a flat surface portion orthogonal to the center axis of the drive cam 50 in the tip-end portion of each convex portion.

The drive cam 50 has cam-side engaging holes 56 in a plurality of positions (five positions in the illustrated example) at equal intervals in the circumferential direction of the outer side portion in the radial direction, the cam-side engaging holes 56 being open to the other side surface in the axial direction, and has a wheel gear portion 57 on the outer circumferential surface, the tooth trace of the wheel gear portion 57 being a helical gear having a helix shape.

Figure 1:
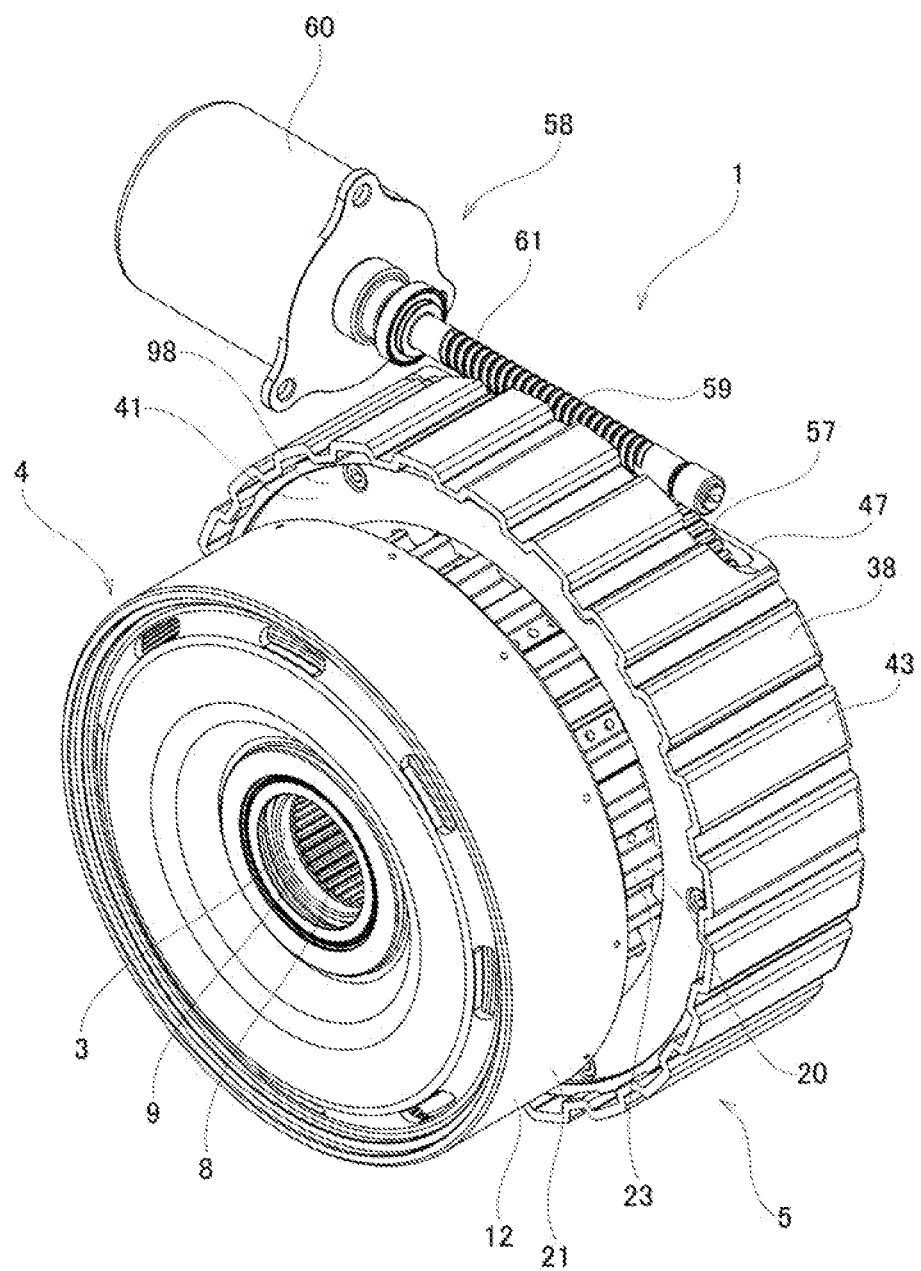
FIG. 1 is a perspective view illustrating a two-speed transmission of a first example of an embodiment of the present invention.
Figure 2:
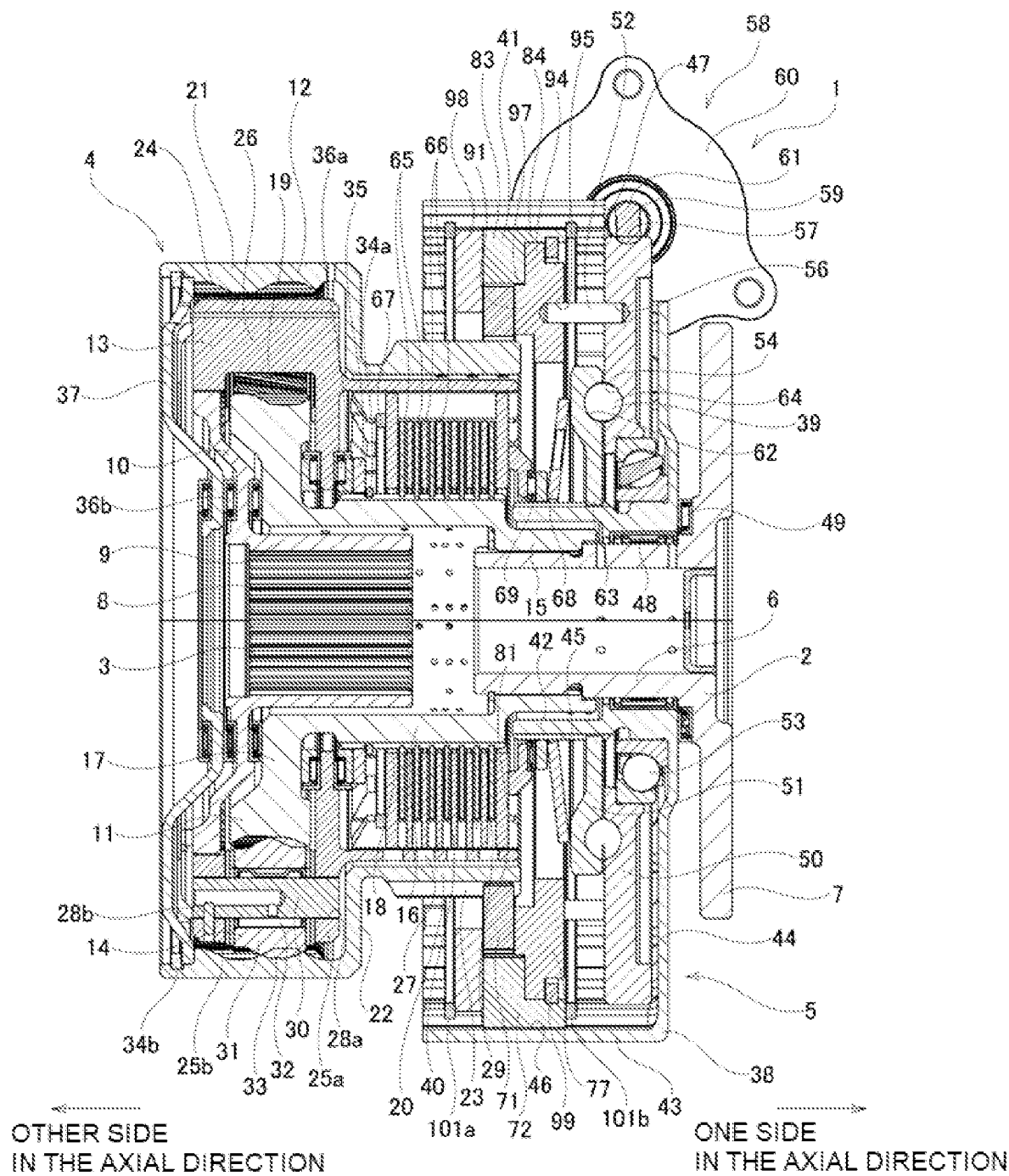
FIG. 2 is a cross-sectional view illustrating the two-speed transmission of the first example.
Figure 3:
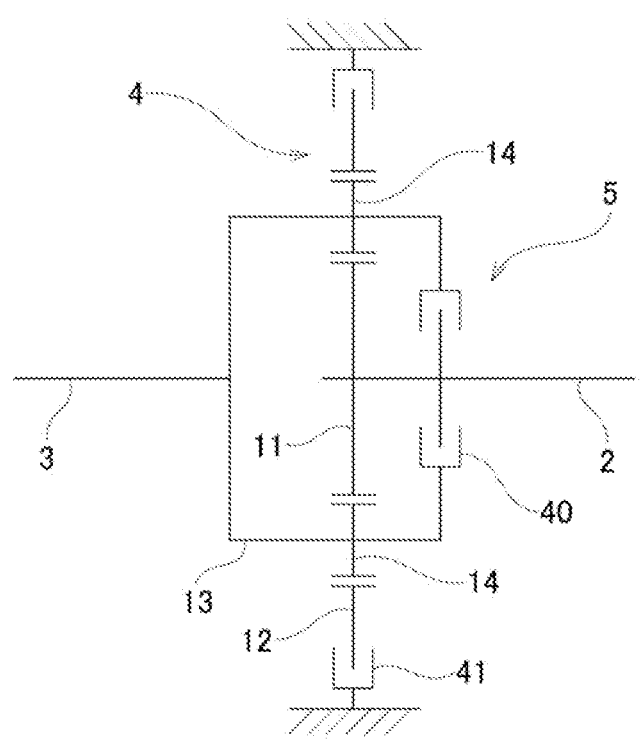
FIG. 3 is a schematic view illustrating the two-speed transmission of the first example.
Figure 4:
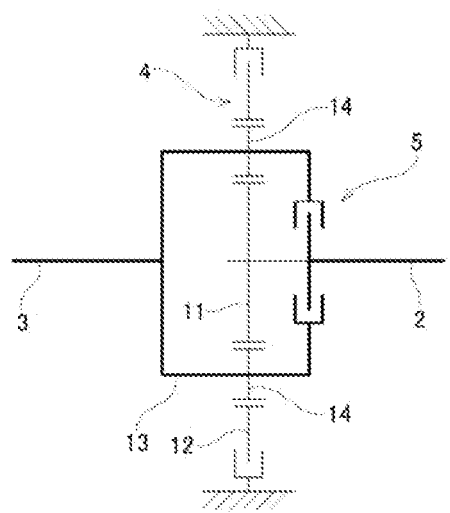
FIG. 4(A) is a schematic view illustrating a transmission path of power in a low reduction ratio mode, and FIG. 4(B)
Figure 4:
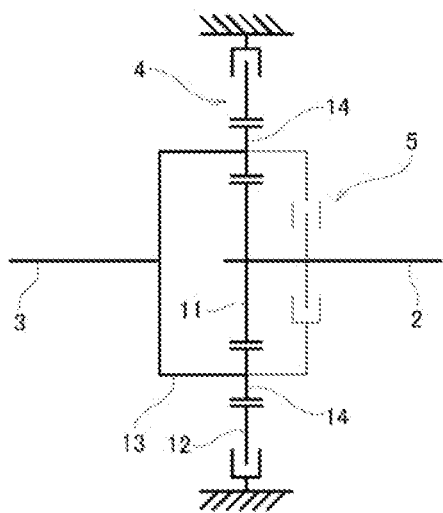

The drive cam 50 is rotated and driven by an electric actuator 58. As illustrated in FIGS. 1 and 6, the electric actuator 58 includes a worm 59 and a transmission motor 60. The worm 59 has a worm gear portion 61 on the outer circumferential surface of the intermediate portion in the axial direction, the worm gear portion 61 meshing with a portion of the wheel gear portion 57 of the drive cam 50 that is exposed from the through hole 47 of the housing 38. The transmission motor 60 rotates and drives the worm 59. That is, the drive cam 50 is rotated and driven by the transmission motor 60 through a worm speed reducer constituted by making the wheel gear portion 57 and the worm gear portion 61 mesh with each other.

As illustrated in FIGS. 5 and 7, the driven cam 51 is arranged in the inner side region in the radial direction of the drive cam 50 so as to face the drive cam 50 in the axial direction. The driven cam 51 has a driven cam surface 62 on one side surface in the axial direction facing the drive cam surface 54 of the drive cam 50, the driven cam surface 62 being constituted by alternately arranging recess portions and convex portions of the same numbers as those of the recess portions and the convex portions of the drive cam surface 54 (five each in this example) with respect to the circumferential direction. However, the driven cam surface 62, which faces the drive cam surface 54, may be configured by a flat surface orthogonal to the center axis.

The driven cam 51 has a driven-side female spline portion 63 on the inner circumferential surface, and the driven-side female spline portion 63 is supported to the housing 38 so that only displacement in the axial direction is possible by spline engagement with the fixed-side male spline portion 45 of the housing 38.

The cam device 39 further includes a plurality of (five in the illustrated example) rolling bodies 64 arranged between the drive cam surface 54 and the driven cam surface 62 so as to be able to roll freely. That is, in this example, according to rotation of the drive cam 50, the amount by which the rolling bodies 64 ride up from the bottom portions of the recess portions of the drive cam surface 54 and the amount by which the rolling bodies 64 ride up from the bottom portions of the recess portions of the driven cam surface 62 increase or decrease, so that the driven cam 51 displaces in the axial direction. Note that although balls are used as the rolling bodies 64 in this example, rollers or tapered rollers may be used as the rolling bodies.

The end portion on one side in the axial direction of each of the engaging pins 52 is internally fitted in (engages with) a cam-side engaging hole 56 of the drive cam 50 without looseness, and thus the other side portion in the axial direction thereof protrudes from the other side surface in the axial direction of the drive cam 50 toward the other side in the axial direction.

As illustrated in FIGS. 5 and 8, the friction engagement device 40 has a plurality of friction plates 65 and a plurality of separation plates 66. The friction plates 65 and the separation plates 66 have a substantially circular ring shape respectively, and are alternately arranged in the axial direction.

The friction engagement device 40 is configured so as to be put into a connected state by pressing the friction plates 65 and the separation plates 66 against each other on the basis of displacement of the driven cam 51 of the cam device 39 in a direction so that the interval in the axial direction between the driven cam 51 and the drive cam 50 increases, and be put into a disconnected state by releasing a force that presses the friction plates 65 and the separation plates 66 against each other on the basis of displacement of the driven cam 51 in a direction so that the interval in the axial direction between the driven cam 51 and the drive cam 50 decreases.

In this example, the friction engagement device 40 is arranged between the sun gear 11 and the carrier 13. That is, the sun gear 11 and the carrier 13, which are rotating bodies respectively, integrally rotate when the friction engagement device 40 is in the connected state, and the sun gear 11 and the carrier 13 relatively rotate with respect to each other when the friction engagement device 40 is in the disconnected state. In short, the friction engagement device 40 functions as a clutch for switching a connected/disconnected state of power transmission between the sun gear 11 and the carrier 13.

Each of the friction plates 65 has a female spline portion on the inner circumferential surface, and is supported to the sun gear 11 so that only displacement in the axial direction is possible by spline engagement of the female spline portion with the sun-side male spline portion 18 of the sun gear 11.

Each of the separation plates 66 has a male spline portion on the outer circumferential surface, and is supported to the carrier 13 so that only displacement in the axial direction is possible by spline engagement of the male spline portion with the carrier-side female spline portion 29 of the carrier 13.

A separation plate 66 of the separation plates 66 that exists most on the other side in the axial direction is prevented from displacing toward the other side in the axial direction by a retaining ring 67 locked to the end portion on the other side in the axial direction of the cylindrical portion 27 of the carrier 13.

An elastic member 68 and a thrust rolling bearing 69 are sandwiched and held between a separation plate 66 of the separation plates 66 that exists most on one side in the axial direction and the driven cam 51 in order from one side in the axial direction. The elastic member 68 elastically biases the friction engagement device 40 and the driven cam 51 in directions away from each other with respect to the axial direction. Note that, in this example, the elastic member 68 is configured by a disc spring. However, the elastic member 68 may be configured by a torsion coil spring or the like.

As illustrated in FIG. 8, the friction engagement device 40 further includes a return spring 70 that elastically biases the friction plates 65 and the separation plates 66 in directions separating from each other so as to release a force that presses the friction plates 65 and the separation plates 66 against each other. In this example, the return spring 70 spans between the separation plate 66 existing most on one side in the axial direction and the separation plate 66 existing most on the other side in the axial direction, and elastically biases the separation plate 66 existing most on one side in the axial direction and the separation plate 66 existing most on the other side in the axial direction in directions away from each other.

As illustrated in FIGS. 9 to 12, the rotation transmission state switching device 41 includes a first member 71 and a second member 72, which are arranged coaxially with each other, first claw members 73 and second claw members 74, first claw biasing members 75 and second claw biasing members 76, and a select plate 77.

The first member 71 has engaging recess portions 78 at a plurality of positions in the circumferential direction of the outer circumferential surface. That is, the first member 71 has an uneven portion 80 having a gear shape which is constituted by alternately arranging the engaging recess portions 78 and convex portions 79 with respect to the circumferential direction on the outer circumferential surface. In addition, the first member 71 has a female spline portion 81 on the inner circumferential surface. The first member 71 is supported to the ring gear 12 so that relative rotation is not possible by spline engagement of the female spline portion 81 with the ring-side male spline portion 23 of the ring gear 12. That is, the first member 71 rotates integrally with the ring gear 12.

The second member 72 is supported in the vicinity of the first member 71 so as to be coaxial with the first member 71, and be able to relatively rotate with respect to the first member 71. That is, the inner circumferential surface of the second member 72 faces the outer circumferential surface of the first member 71 (tip-end surfaces of the convex portions 79) through a gap. The second member 72 has a male spline portion 82 on the outer circumferential surface. The second member 72 is supported to the housing 38 so that relative rotation is not possible by spline engagement of the male spline portion 82 with the fixed-side female spline portion 46 of the housing 38.

The second member 72 includes a base portion 83 having a rectangular cross-sectional shape, and a cylindrical portion 84 protruding from the end portion on the outer side in the radial direction of one side surface in the axial direction of the base portion 83 toward one side in the axial direction over the entire circumference.

The base portion 83 has a plurality of (six in the illustrated example) first holding recess portions 85 and a plurality of (six in the illustrated example) second holding recess portions 86 which are alternately arranged with respect to the circumferential direction.

Each of the first holding recess portions 85 is open to the inner circumferential surface and one side surface in the axial direction of the base portion 83. Each of the first holding recess portions 85 includes a spring holding portion 87a and a seat portion 88a. The spring holding portion 87a has a substantially rectangular opening shape, the major axis of which is arranged in a direction extending further outward in the radial direction as going toward one side in the circumferential direction (front side in the clockwise direction in FIG. 11), when viewed from one side in the axial direction. The seat portion 88a has a substantially circular opening shape, and is arranged adjacent to the other side in the circumferential direction (rear side in the clockwise direction in FIG. 11) of the spring holding portion 87a, when viewed from one side in the axial direction.

Each of the second holding recess portions 86 is open to the inner circumferential surface and one side surface in the axial direction of the base portion 83. Each of the second holding recess portions 86 has a symmetrical shape to the first holding recess portion 85 with respect to a virtual plane including the center axis of the second member 72 when viewed from one side in the axial direction. That is, each of the second holding recess portions 86 includes a spring holding portion 87b and a seat portion 88b. The spring holding portion 87b has a substantially rectangular opening shape, the major axis of which is arranged in a direction extending further outward in the radial direction as going toward the other side in the circumferential direction, when viewed from one side in the axial direction. The seat portion 88*b* has a substantially circular opening shape, and is arranged adjacent to one side in the circumferential direction of the spring holding portion 87*b*, when viewed from one side in the axial direction.

The first claw member 73 includes a first base portion 89 and a first engaging claw 90.

The first base portion 89 is configured by a substantially columnar shape, and is supported (pivotally supported) to the seat portion 88*a* of the first holding recess portion 85 so as to be able to swing about a pivotal axis parallel to the center axis of the second member 72.

The first engaging claw 90 is configured by a substantially flat plate shape, and extends from the first base portion 89 toward one side in the circumferential direction. One side portion in the axial direction of the first engaging claw 90 faces (engages with) the outer circumferential surface of the annular convex portion 91 of the select plate 77, and the other side portion in the axial direction of the first engaging claw 90 faces (engages, so as to be able to disengage from the engaging recess portion 78, with) the uneven portion 80 of the first member 71.

The second claw member 74 has a second base portion 92 and a second engaging claw 93.

The second base portion 92 is configured by a substantially columnar shape, and is supported to the seat portion 88*b* of the second holding recess portion 86 so as to be able to swing about a pivotal axis parallel to the center axis of the second member 72.

The second engaging claw 93 is configured by a substantially flat plate shape, and extends from the second base portion 92 toward the other side in the circumferential direction. One side portion in the axial direction of the second engaging claw 93 faces the outer circumferential surface of the annular convex portion 91 of the select plate 77, and the other side portion in the axial direction of the second engaging claw 93 faces the uneven portion 80 of the first member 71.

The first claw biasing member 75 elastically biases the first engaging claw 90 of the first claw member 73 in a direction so that the first engaging claw 90 engages with the engaging recess portion 78 of the first member 71. That is, the first claw biasing member 75 applies a biasing force to the first claw member 73 in a direction so that the first claw member 73 swings about the center axis (pivotal axis) of the first base portion 89 in a clockwise direction in FIG. 12. Specifically, the first claw biasing member 75 is configured by an elastic member such as a torsion coil spring, and is held between the bottom surface (surface facing the inner side in the radial direction) of the spring holding portion 87*a* of the first holding recess portion 85 and the outer side surface in the radial direction of the first engaging claw 90 in a state of being elastically compressed.

Each of the second claw biasing members 76 elastically biases the second engaging claw 93 of the second claw member 74 in a direction so that the second engaging claw 93 engages with the engaging recess portion 78 of the first member 71. That is, the second claw biasing member 76 applies a biasing force to the second claw member 74 in a direction so that the second claw member 74 swings about the center axis of the second base portion 92 in a counter-clockwise direction in FIG. 12. Specifically, the second claw biasing member 76 is configured by an elastic member such as a torsion coil spring, and is held between the bottom surface (surface facing the inner side in the radial direction) of the spring holding portion 87*b* of the second holding recess portion 86 and the outer side surface in the radial direction of the second engaging claw 93 in a state of being elastically compressed.

As illustrated in FIG. 10, the select plate 77 includes a base plate portion 94 having a substantially circular ring plate shape, and an annular convex portion 91 protruding from the intermediate portion in the radial direction of the other side surface in the axial direction of the base plate portion 94 toward the other side in the axial direction over the entire circumference.

The base plate portion 94 has plate-side engaging holes 95 in a plurality of positions (five positions in the illustrated example) at equal intervals in the circumferential direction of the intermediate portion in the radial direction, the plate-side engaging holes 95 being open to one side surface in the axial direction. The end portion on the other side in the axial direction of each of the engaging pins 52 is internally fitted in (engages with) each of the plate-side engaging holes 95 without looseness. That is, the select plate 77 rotates integrally with (in the same direction and at the same speed as) the drive cam 50.

The annular convex portion 91 has protruding portions 96 on a plurality of positions in the circumferential direction of the outer circumferential surface, the protruding portions 96 protruding outward in the radial direction. That is, the annular convex portion 91 has an uneven portion 97 constituted by alternately arranging the protruding portions 96 and recess portions with respect to the circumferential direction on the outer circumferential surface. In this example, a mode selecting part is configured by the uneven portion 97.

The first member 71, the second member 72, and the select plate 77 are combined by a lid body 98 and a retaining ring 99 so that relative rotation is possible and relative displacement in the axial direction is not possible (unintended separation in the axial direction is prevented), to constitute the rotation transmission state switching device 41.

That is, in a state where the first member 71 is arranged on the inner side in the radial direction of the other side portion in the axial direction of the base portion 83 of the second member 72, the lid body 98 having a circular ring shape is supported by and fixed to the other side surface in the axial direction of the second member 72 by screwing, so that one side surface in the axial direction of the inner side portion in the radial direction of the lid body 98 faces the other side surface in the axial direction of the first member 71. Due to this, displacement of the first member 71 with respect to the second member 72 toward the other side in the axial direction is prevented.

In addition, in a state where the annular convex portion 91 of the select plate 77 is arranged on the inner side in the radial direction of one side portion in the axial direction of the base portion 83 of the second member 72, the tip-end surface (the other side surface in the axial direction) of the annular convex portion 91 faces and is in slidable or close contact with one side surface in the axial direction of the first member 71, and the other side surface in the axial direction of the outer side portion in the radial direction of the base plate portion 94 faces and is in slidable or close contact with one side surface in the axial direction of the base portion 83 and the second member 72, the retaining ring 99 is locked on the end portion on the one side in the axial direction of the inner circumferential surface of the cylindrical portion 84 of the second member 72. Due to this, displacement of the first member 71 and the select plate 77 with respect to the second member 72 toward one side in the axial direction is prevented.

The second member 72 of the rotation transmission state switching device 41 is supported by and fixed to the housing 38 so that relative rotation and displacement in the axial direction are not possible. Specifically, the male spline portion 82 provided on the outer circumferential surface of the second member 72 (outer circumferential surfaces of the base portion 83 and the cylindrical portion 84) is connected to the fixed-side female spline portion 46 of the housing 38 by spline engagement, and the second member 72 and the lid body 98 are sandwiched and held by a pair of retaining rings 101a, 101b, which are locked on the inner circumferential surface of the outer-diameter-side cylinder portion 43 of the housing 38, from both sides in the axial direction.

The rotation transmission state switching device 41 of this example has a free mode in which relative rotation between the first member 71 and the second member 72 is possible in both directions, a lock mode in which relative rotation between the first member 71 and the second member 72 are not possible, and a one-way clutch mode in which only rotation in a specified direction of the first member 71 with respect to the second member 72 is allowed. The rotation transmission state switching device 41 is configured so as to be able to switch between the free mode, the lock mode, and the one-way clutch mode by switching an engagement state between the first engaging claws 90 of the first claw members 73 and the engaging recess portions 78 of the first member 71, and an engagement state between the second engaging claws 93 of the second claw members 74 and the engaging recess portions 78, on the basis of rotation of the select plate 77.

<Free Mode>

In the free mode, by adjusting a phase in the circumferential direction of the select plate 77 with respect to the second member 72, as illustrated in FIG. 13(A), the first engaging claw 90 is pushed up outward in the radial direction against the elastic force of the first claw biasing member 75, and the second engaging claw 93 is pushed up outward in the radial direction against the elastic force of the second claw biasing member 76, by the protruding portions 96. Due to this, engagement of the first engaging claw 90 and the second engaging claw 93 with the engaging recess portions 78 of the first member 71 is released. In this state, regardless of a direction of relative rotation between the first member 71 and the second member 72, rotation of the first member 71 with respect to the second member 72 is allowed. That is, regardless of a direction of rotation of the first member 71, rotation of the first member 71 with respect to the housing 38 is allowed. In other words, regardless of a direction of rotation of the ring gear 12, rotation of the ring gear 12 with respect to the housing 38 is allowed.

<Lock Mode>

In the lock mode, by adjusting a phase in the circumferential direction of the select plate 77 with respect to the second member 72, as illustrated in FIG. 13(B), the protruding portions 96 are positioned in regions deviated in the circumferential direction from the first engaging claw 90 of the first claw member 73 and the second engaging claw 93 of the second claw member 74. In other words, the phase of recess portions of the uneven portion 97 is matched to the phase of the first engaging claw 90 and the second engaging claw 93 with respect to the circumferential direction. Due to this, the first engaging claw 90 and the second engaging claw 93 engage with the engaging recess portions 78 of the first member 71. In this state, regardless of a direction of relative rotation between the first member 71 and the second member 72, rotation of the first member 71 with respect to the second member 72 is prevented. That is, regardless of a direction of rotation of the first member 71, rotation of the first member 71 with respect to the housing 38 is prevented.

<One-Way Clutch Mode>

In the one-way clutch mode, by adjusting a phase in the circumferential direction of the select plate 77 with respect to the second member 72, as illustrated in FIG. 13(C), only the second engaging claw 93 is pushed up outward in the radial direction by the protruding portion 96 against the elastic force of the second claw biasing member 76. Due to this, the first engaging claw 90 engages with the engaging recess portion 78 of the first member 71, and engagement of the second engaging claw 93 with the engaging recess portion 78 is released. In this state, only rotation of the first member 71 with respect to the second member 72 in the specified direction (clockwise direction in FIG. 13(C)) is allowed, and the rotation in the opposite direction to the specified direction (counterclockwise direction in FIG. 13(C)) is prevented.

That is, when the first member 71 tends to rotate in the specified direction with respect to the second member 72, the first engaging claw 90 is pushed up outward in the radial direction by the convex portion 79 of the uneven portion 80 against the elastic force of the first claw biasing member 75. As a result, rotation of the first member 71 in the specified direction is allowed. To the contrary, when the first member 71 tends to rotate in the opposite direction to the specified direction with respect to the second member 72, the rotation in the opposite direction to the specified direction of the first member 71 is prevented by engagement between the engaging recess portions 78 and the first engaging claws 90. In short, the rotation transmission state switching device 41 functions as a ratchet type one-way clutch.

Note that the specified direction coincides with a forward direction of the input member 2. The forward direction of the input member 2 is referred to as a direction of rotation of the input member 2 when moving an automobile forward.

The power transmission path switching device 5 of this example switches an operation mode by switching the connected/disconnected state of the friction engagement device 40 by displacing the driven cam 51 in the axial direction, and at the same time switching the mode of the rotation transmission state switching device 41 by adjusting a phase in the circumferential direction of the select plate 77 with respect to the second member 72, on the basis that the drive cam 50 is rotated and driven by the electric actuator 58. The power transmission path switching device 5 includes a first mode in which the friction engagement device 40 is in the connected state and the rotation transmission state switching device 41 is in the free mode, a second mode in which the friction engagement device 40 is in the disconnected state and the rotation transmission state switching device 41 is in the lock mode, a third mode which is established during switching of the friction engagement device 40 from the disconnected state to the connected state and in which the rotation transmission state switching device 41 is in the one-way clutch mode, and a fourth mode in which the friction engagement device 40 is in the disconnected state and the rotation transmission state switching device 41 is in the free mode. Each mode will be described below.

<First Mode>

In order to switch the power transmission path switching device 5 to the first mode, the friction engagement device 40 is put into the connected state, and the rotation transmission state switching device 41 is put into the free mode, on the basis that the drive cam 50 is rotated and driven by the electric actuator 58.

That is, by increasing the amount by which the rolling bodies 64 ride up from the bottom portions of the recess portions of the drive cam surface 54 and the amount by which the rolling bodies 64 ride up from the bottom portions of the recess portions of the driven cam surface 62 on the basis of rotation of the drive cam 50, the driven cam 51 is displaced in a direction so that the interval in the axial direction between the driven cam 51 and the drive cam 50 increases (toward the other side in the axial direction). Due to this, the separation plate 66 existing most on one side in the axial direction is pressed toward the other side in the axial direction through the elastic member 68 and the thrust rolling bearing 69. As a result, by pressing the friction plates 65 and the separation plates 66 against each other, the friction engagement device 40 is put into the connected (fastened) state (the fastening force of the friction engagement device 40 is increased), so that the sun gear 11 and the carrier 13 integrally rotate.

On the basis of putting the friction engagement device 40 into the connected state as described above, and at the same time adjusting a phase in the circumferential direction of the select plate 77 with respect to the second member 72, as illustrated in FIG. 13(A), the first engaging claw 90 is pushed up outward in the radial direction, and the second engaging claw 93 is pushed up outward in the radial direction, by the protruding portions 96. Due to this, engagement of the first engaging claw 90 and the second engaging claw 93 with the engaging recess portions 78 of the first member 71 is released, and thus the rotation transmission state switching device 41 is switched to the free mode in which rotation of the first member 71 with respect to the second member 72 is allowed regardless of a direction of relative rotation between the first member 71 and the second member 72.

<Second Mode>

In order to switch the power transmission path switching device 5 to the second mode, the friction engagement device 40 is put into the disconnected state, and the rotation transmission state switching device 41 is put into the lock mode, on the basis that the drive cam 50 is rotated and driven by the electric actuator 58.

That is, by decreasing the amount by which the rolling bodies 64 ride up from the bottom portions of the recess portions of the drive cam surface 54 and the amount by which the rolling bodies 64 ride up from the bottom portions of the recess portions of the driven cam surface 62 on the basis of rotation of the drive cam 50, the driven cam 51 is displaced in a direction so that the interval in the axial direction between the driven cam 51 and the drive cam 50 decreases (toward one side in the axial direction). Due to this, a force that presses the friction plates 65 and the separation plates 66 against each other is released. As a result, due to an effect of the return spring 70, an interval between the separation plate 66 existing most on one side in the axial direction and the separation plate 66 existing most on the other side in the axial direction increases, so that the friction engagement device 40 is put into the disconnected state (the fastening force of the friction engagement device 40 is lost).

On the basis of putting the friction engagement device 40 into the disconnected state as described above, and at the same time adjusting a phase in the circumferential direction of the select plate 77 with respect to the second member 72, as illustrated in FIG. 13(B), the protruding portions 96 are positioned in portions deviated in the circumferential direction from the first engaging claw 90 of the first claw member 73 and the second engaging claw 93 of the second claw member 74. Due to this, the first engaging claw 90 and the second engaging claw 93 engage with the engaging recess portions 78 of the first member 71, and thus the rotation transmission state switching device 41 is switched to the lock mode in which rotation of the first member 71 with respect to the second member 72 is prevented regardless of a direction of relative rotation between the first member 71 and the second member 72.

<Third Mode>

The power transmission path switching device 5 of this example is configured so as to be switched to the third mode during switching of the friction engagement device 40 from the disconnected state to the connected state, that is, during switching from the second mode to the first mode.

During switching of the friction engagement device 40 from the disconnected state to the connected state, as the amount by which the rolling bodies 64 ride up from the bottom portions of the recess portions of the drive cam surface 54 and the amount by which the rolling bodies 64 ride up from the bottom portions of the recess portions of the driven cam surface 62 gradually increase on the basis of rotation of the drive cam 50, a force that presses the friction plates 65 and the separation plates 66 against each other gradually increases (the fastening force of the friction engagement device 40 gradually increases). At this time, while both side surfaces in the axial direction of the friction plates 65 and both side surfaces in the axial direction of the separation plates 66 are sliding (in slidable contact) with each other, the friction plates 65 and the separation plates 66 rotate in the same direction, and are gradually synchronizing with each other (the rotation speeds are gradually matching each other).

In the power transmission path switching device 5 of this example, the rotation transmission state switching device 41 is switched to the one-way clutch mode before starting to switch the friction engagement device 40 from the disconnected state to the connected state, that is, before starting to increase a force that presses the friction plates 65 and the separation plates 66 against each other, on the basis of rotation of the drive cam 50. In order to switch the rotation transmission state switching device 41 to the one-way clutch mode, as illustrated in FIG. 13(C), only the second engaging claw 93 is pushed up outward in the radial direction by the protruding portion 96 against the elastic force of the second claw biasing member 76. Due to this, only the first engaging claw 90 engages with the engaging recess portion 78 of the first member 71, and thus, in the rotation transmission state switching device 41, only rotation of the first member 71 with respect to the second member 72 in the specified direction is allowed, and the rotation in the opposite direction to the specified direction is prevented.

In this example, the power transmission path switching device 5 is switched to the third mode by completing switching of the rotation transmission state switching device 41 to the one-way clutch mode, and at the same time starting to switch the friction engagement device 40 from the disconnected state to the connected state, on the basis of rotation of the drive cam 50.

Note that, in this example, in a state where the power transmission path switching device 5 is in the third mode, switching of the friction engagement device 40 to the connected state is completed, and at the same time switching of the tation transmission state switching device 41 from the one-way clutch mode to the free mode starts, on the basis of rotation of the drive cam 50.

<Fourth Mode>

In order to switch the power transmission path switching device 5 to the fourth mode, the friction engagement device 40 is put into the disconnected state, and the rotation transmission state switching device 41 is put into the free mode, on the basis that the drive cam 50 is rotated and driven by the electric actuator 58.

That is, by displacing the driven cam 51 in a direction so that the interval in the axial direction between the driven cam 51 and the drive cam 50 decreases (toward one side in the axial direction) on the basis of rotation of the drive cam 50, a force that presses the friction plates 65 and the separation plates 66 against each other is released. Then, due to an effect of the return spring 70, the interval between the separation plate 66 existing most on one side in the axial direction and the separation plate 66 existing most on the other side in the axial direction increases, so that the friction engagement device 40 is put into the disconnected state.

On the basis of putting the friction engagement device 40 into the disconnected state as described above, and at the same time adjusting a phase in the circumferential direction of the select plate 77 with respect to the second member 72, as illustrated in FIG. 13(A), the first engaging claw 90 is pushed up outward in the radial direction against the elastic force of the first claw biasing member 75, and the second engaging claw 93 is pushed up outward in the radial direction against the elastic force of the second claw biasing member 76, by the protruding portions 96. Due to this, engagement of the first engaging claw 90 and the second engaging claw 93 with the engaging recess portions 78 of the first member 71 is released, so that rotation of the first member 71 with respect to the housing 38 is allowed regardless of a direction of rotation of the first member 71.

By switching the operation mode of the power transmission path switching device 5, as illustrated in FIG. 14, the two-speed transmission 1 of this example is able to switch between a low reduction ratio mode in which a reduction ratio between the input member 2 and the output member 3 is small (the reduction ratio is one), and a high reduction ratio mode in which the reduction ratio is large as compared with the low reduction ratio mode. In addition, the two-speed transmission 1 of this example passes through a reduction ratio switching mode during switching from the high reduction ratio mode to the low reduction ratio mode. Furthermore, the two-speed transmission 1 of this example is able to be switched to a neutral mode in which a power is not transmitted between the input member 2 and the output member 3. Each case will be described below.

<Low Reduction Ratio Mode>

In order to switch the two-speed transmission 1 to the low reduction ratio mode, the power transmission path switching device 5 is switched to the first mode in which the friction engagement device 40 is in the connected state, and the rotation transmission state switching device 41 is in the free mode, on the basis that the drive cam 50 is rotated and driven by the electric actuator 58. When the power transmission path switching device 5 is switched to the first mode, as illustrated in FIG. 4(A), the sun gear 11 and the carrier 13 integrally rotate on the basis of putting the friction engagement device 40 into the connected state, and rotation of the ring gear 12 with respect to the housing 38 is allowed on the basis of switching the rotation transmission state switching device 41 to the free mode. In such a low reduction ratio mode, a so-called pasting state where the sun gear 11, the ring gear 12, and the carrier 13 have the same direction of rotation and rotation speed, and thus the entire planetary gear mechanism 4 rotates as one body, is established. Accordingly, a power of the input member 2 is transmitted to the output member 3 through a path illustrated in (A) below:

(A) the input member 2→the carrier 13→the output member 3

In this way, in the low reduction ratio mode, a power of the input member 2 is transmitted to the output member 3 at it is without reducing the speed. In other words, in the low reduction ratio mode, the reduction ratio between the input member 2 and the output member 3 is one.

<High Reduction Ratio Mode>

In order to switch the two-speed transmission 1 to the high reduction ratio mode, the power transmission path switching device 5 is switched to the second mode in which the friction engagement device 40 is in the disconnected state, and the rotation transmission state switching device 41 is in the lock mode, on the basis that the drive cam 50 is rotated and driven by the electric actuator 58. When the power transmission path switching device 5 is switched to the second mode, as illustrated in FIG. 4(B), the sun gear 11 and the carrier 13 become able to relatively rotate on the basis of putting the friction engagement device 40 into the disconnected state, and rotation of the ring gear 12 with respect to the housing 38 is prevented on the basis of switching the rotation transmission state switching device 41 to the lock mode. In such a high reduction ratio mode, a power of the input member 2 is transmitted to the output member 3 through a path illustrated in (B) below:

(B) the input member 2→the sun gear 11→rotation movement of the pinion gear 14→revolution movement of the pinion gear 14 on the basis of meshing with the ring gear 12→the carrier 13→the output member 3

In this way, in the high reduction ratio mode, a power of the input member 2 is transmitted to the output member 3 with the speed reduced by the planetary gear mechanism 4. Note that, in the high reduction ratio mode, the reduction ratio between the input member 2 and the output member 3 is determined by a gear ratio between the ring gear 12 and the sun gear 11 (a number of teeth of the gear portion 24 of the ring gear 12/a number of teeth of the gear portion 19 of the sun gear 11).

As described above, in the two-speed transmission 1 of this example, the reduction ratio between the input member 2 and the output member 3 is able to be switched in high and low two speeds by switching the operation mode of the power transmission path switching device 5, that is, by switching the connected/disconnected state of the friction engagement device 40 and the mode of the rotation transmission state switching device 41, on the basis that one drive cam 50 is rotated and driven by one electric actuator 58. Specifically, for example, the two-speed transmission 1 is switched to the high reduction ratio mode in a range where a power inputted to the input member 2 has a low speed and high torque, and the two-speed transmission 1 is switched to the low reduction ratio mode in a range where the power has a high speed and low torque. Due to this, acceleration performance and high-speed performance of electric automobiles and hybrid automobiles when traveling with only an electric motor employed as a drive source are able to have characteristics such that a section of the solid line a on the left side of a point P and a section of the chain line b on the right side of a point P are continuously connected to each other in FIG. 39 described above, which is close to characteristics of gasoline engine automobiles indicated by the broken line c in FIG. 39.

Particularly, in the power transmission path switching device 5 of this example, the connected/disconnected state of the friction engagement device 40 and the mode of the rotation transmission state switching device 41 are switched on the basis of rotating the drive cam 50 by energizing the transmission motor 60 of the electric actuator 58 through the worm 59. That is, in the power transmission path switching device 5 of this example, a hydraulic pressure system for controlling a friction engagement device such as a clutch and a brake is not necessary. Due to this, in electric automobiles and hybrid automobiles, the cost can be reduced due to simplification of the system and electricity cost performance can be enhanced.

<Reduction Ratio Switching Mode>

The two-speed transmission 1 of this example is switched to the reduction ratio switching mode, when the input member 2 rotates in the forward direction, by putting the power transmission path switching device 5 into the third mode during switching from the high reduction ratio mode to the low reduction ratio mode.

In the reduction ratio switching mode, only rotation of the ring gear 12 with respect to the housing 38 in the specified direction is allowed, and the rotation in the opposite direction to the specified direction is prevented, on the basis that the rotation transmission state switching device 41 is switched to the one-way clutch mode.

In addition, in the reduction ratio switching mode, on the basis that the fastening force of the friction engagement device 40 gradually increases, rotation of the sun gear 11 and rotation of the carrier 13 are gradually synchronizing with each other. During rotation in the forward direction of the input member 2, when the fastening force of the friction engagement device 40 gradually increases, and thus rotation of the sun gear 11 and rotation of the carrier 13 are gradually synchronizing with each other, torque applied to the first member 71 of the rotation transmission state switching device 41 in the opposite direction to the specified direction gradually decreases. Note that, in the reduction ratio switching mode, because the rotation transmission state switching device 41 has been switched to the one-way clutch mode, even when torque is applied to the first member 71 in the opposite direction to the specified direction, the first member 71 does not rotate.

After torque applied to the first member 71 in the opposite direction to the specified direction gradually decreases to zero, and at the moment when the direction of torque applied to the first member 71 is reversed (torque is applied to the first member 71 in the specified direction), rotation of the first member 71 in the specified direction is allowed. Therefore, with the two-speed transmission 1 of this example, it is possible to suppress a torque loss in the two-speed transmission 1, as well as to suppress a transmission shock based on the mode switching. This reason will be described with reference to FIGS. 15 and 16.

FIG. 15 illustrates a power transmission path switching device 5z of a comparative example. The power transmission path switching device 5z includes a first friction engagement device 40a for switching between a state where relative rotation between the sun gear 11 and the carrier 13 is possible and a state where the relative rotation is not possible, and a second friction engagement device 40b for switching between a state where rotation of the ring gear 12 is possible and a state where the rotation is not possible. That is, the power transmission path switching device 5z of the comparative example adopts the second friction engagement device 40b configured to switch a connected/disconnected state by pressing friction plates 65a and separation plates 66a against each other or separating them from each other, in place of the rotation transmission state switching device 41 of the power transmission path switching device 5 of this example.

The power transmission path switching device 5z of the comparative example switches the connected/disconnected states of the first friction engagement device 40a and the second friction engagement device 40b on the basis of displacing a first driven cam 51a and a second driven cam 51b in the axial direction by rotating and driving a drive cam 50z of a cam device 39z by an electric actuator. The first driven cam 51a and the second driven cam 51b displace in mutually different phases (displace or move forward and backward in opposite directions to each other with respect to the axial direction) according to rotation of the drive cam 50z.

In a two-speed transmission incorporating the power transmission path switching device 5z of the comparative example, during switching from the high reduction ratio mode having a large reduction ratio to the low reduction ratio mode having a small reduction ratio, as illustrated in FIG. 16, the fastening force of the first friction engagement device 40a gradually increases, and the fastening force of the second friction engagement device 40b gradually decreases. Due to this, during switching from the high reduction ratio mode to the low reduction ratio mode, when the fastening force of the second friction engagement device 40b gradually decreases to be insufficient, the ring gear 12 is dragged by revolution of the pinion gear 14, resulting in occurrence of a torque loss.

In addition, also in the two-speed transmission incorporating the power transmission path switching device 5z of the comparative example, rotation of the sun gear 11 and rotation of the carrier 13 are synchronizing as the fastening force of the first friction engagement device 40a gradually increases, and the direction of torque applied to the ring gear 12 is reversed after torque applied to the ring gear 12 in the opposite direction to the specified direction gradually decreases to zero. However, in the power transmission path switching device 5z of the comparative example, at the moment when the direction of torque applied to the ring gear 12 is reversed, and a direction of revolution of the pinion gear 14 and a direction of rotation of the ring gear 12 coincide with each other, the second friction engagement device 40b is not able to have a sufficiently large fastening force. Due to this, the ring gear 12 is dragged with respect to the housing 38, resulting in occurrence of a torque loss.

To the contrary, in the two-speed transmission 1 of this example, in order to switch from the high reduction ratio mode to the low reduction ratio mode, before starting to switch the friction engagement device 40 from the disconnected state to the connected state, the rotation transmission state switching device 41 is put into the one-way clutch mode, on the basis of rotation of the drive cam 50. Therefore, in order to switch the friction engagement device 40 from the disconnected state to the connected state, rotation of the ring gear 12 in the specified direction is to be allowed at the moment when the direction of torque applied to the ring gear 12 is reversed by gradually synchronizing rotation of the sun gear 11 and rotation of the carrier 13 with each other on the basis of gradually increasing the fastening force of the friction engagement device 40. Due to this, it is possible to suppress a torque loss in the two-speed transmission 1, as well as to suppress a transmission shock based on the mode switching.

Note that, in a state where the fastening force of the friction engagement device 40 has a magnitude such that a torque loss does not occur in engaging parts between the friction plates 65 and the separation plates 66, a reduction ratio between the input member 2 and the output member 3 in the reduction ratio switching mode is the same as that in the high reduction ratio mode. To the contrary, in a state where the fastening force of the friction engagement device 40 has increased to the extent that torque is able to transmitted without sliding occurring in contacting parts between the friction plates 65 and the separation plates 66, the reduction ratio in the reduction ratio switching mode is the same as that in the low reduction ratio mode, that is, one. On the other hand, in a state where the fastening force of the friction engagement device 40 has a magnitude such that sliding occurs in the contacting parts between the friction plates 65 and the separation plates 66, the reduction ratio between the input member 2 and the output member 3 is a value corresponding to a magnitude, a rotation speed and the like of the inputted torque.

In addition, while the input member 2 rotates in the reverse direction in the two-speed transmission 1 of this example, that is, while an automobile moves backward, a vehicle seldom travels in a high speed. Therefore, in a case where the input member 2 rotates in the reverse direction, there is little necessity for the power transmission path switching device 5 to make it possible to select the reduction ratio switching mode when switching from the high reduction ratio mode to the low reduction ratio mode. In addition, when switching from the low reduction ratio mode to the high reduction ratio mode, a vehicle is mostly in a speed reduction state. In this state, because power transmission from the input member 2 to the output member 3 is not performed, there is little necessity for the power transmission path switching device 5 to select the reduction ratio switching mode.

<Neutral Mode>

Furthermore, the two-speed transmission 1 of this example includes the neutral mode in which a power is not transmitted between the input member 2 and the output member 3. In order to switch the two-speed transmission 1 to the neutral mode, the power transmission path switching device 5 is switched to the fourth mode in which the friction engagement device 40 is in the disconnected state, and the rotation transmission state switching device 41 is in the free mode, on the basis that the drive cam 50 is rotated and driven by the electric actuator 58. When the power transmission path switching device 5 is switched to the fourth mode, the sun gear 11 and the carrier 13 relatively rotate on the basis of putting the friction engagement device 40 into the disconnected state, and the ring gear 12 rotates with respect to the housing 38 on the basis of switching the rotation transmission state switching device 41 to the free mode.

Note that, while the fastening force of the friction engagement device 40 has a magnitude such that torque is able to be transmitted without sliding occuring in the contacting parts between the friction plates 65 and the separation plates 66, the reduction ratio between the input member 2 and the output member 3 during switching from the low reduction ratio mode to the neutral mode is the same as that in the low reduction ratio mode, that is, one. On the other hand, in a state where the fastening force of the friction engagement device 40 has decreased to a magnitude such that a torque loss does not occur in the engaging parts between the friction plates 65 and the separation plates 66, a power is not transmitted between the input member 2 and the output member 3. In a state where the fastening force of the friction engagement device 40 has a magnitude such that sliding occurs in the contacting parts between the friction plates 65 and the separation plates 66, the reduction ratio between the input member 2 and the output member 3 is a value corresponding to a magnitude, a rotation speed and the like of the inputted torque.

In addition, in a state where the input member 2 rotates in the forward direction, during switching from the high reduction ratio mode to the reduction ratio switching mode, torque is applied to the first member 71 of the rotation transmission state switching device 41 in the opposite direction to the specified direction. In this case, in the rotation transmission state switching device 41, rotation of the first member 71 in the opposite direction to the specified direction is prevented also during switching from the lock mode to the one-way clutch mode. That is, the reduction ratio between the input member 2 and the output member 3 during switching from the high reduction ratio mode to the reduction ratio switching mode is the same as that in the high reduction ratio mode.

In a state where the input member 2 rotates in the forward direction, during switching from the reduction ratio switching mode to the low reduction ratio mode, torque is applied to the first member 71 of the rotation transmission state switching device 41 in the specified direction. In this case, in the rotation transmission state switching device 41, rotation of the first member 71 in the specified direction is allowed also during switching from the one-way clutch mode to the free mode. That is, the reduction ratio between the input member 2 and the output member 3 during switching from the reduction ratio switching mode to the low reduction ratio mode is the same as that in the low reduction ratio mode.

In the power transmission path switching device 5 of this example, the elastic member 68 is arranged between the separation plate 66 existing most on the one side in the axial direction and the driven cam 51. Therefore, the elastic member 68 is able to absorb an assembly error of the power transmission path switching device 5 and a gap due to the wear of the friction plates 65 and the separation plates 66. Due to this, by controlling a force that presses the driven cam 51 (a force by which the driven cam 51 presses the separation plates 66 existing most on the one side in the axial direction toward the other side in the axial direction), the fastening force of the friction engagement device 40 is able to be controlled. As a result, in the low reduction ratio mode, it is possible to sufficiently secure the fastening force of the friction engagement device 40.

In this example, in a state where the power transmission path switching device 5 has been switched to the first mode, and the friction engagement device 40 is in the connected state, the rolling bodies 64 have ridden up on the flat surface portions provided on the tip-end surfaces of the convex portions of the drive cam surface 54. Due to this, with the power transmission path switching device 5 of this example, even when energization to the transmission motor 60 is stopped after the mode switching is completed, it is possible to maintain the connected state of the friction engagement device 40, thereby enhancing electricity cost performance from this aspect as well.

Note that, in place of or in addition to providing the flat surface portions on the tip-end surfaces of the convex portions of the drive cam surface 54, by providing the worm speed reducer composed of the wheel gear portion 57 of the drive cam 50 and the worm gear portion 61 of the worm 59 with a self-lock function, it is possible to maintain the connected state of the friction engagement device 40 after energization to the transmission motor 60 is stopped.

Note that, although the two-speed transmission 1 of this example has a configuration such that the planetary gear mechanism 4 is arranged around the output member 3, and the power transmission path switching device 5 is arranged around the input member 2, when embodying the two-speed transmission of the first embodiment of the present invention, without being not limited thereto, the two-speed transmission is able to adopt various configurations. For example, it is possible that the planetary gear mechanism is arranged around the input member, and the power transmission path switching device is arranged around the output member. Alternatively, it is possible that the planetary gear mechanism and/or the power transmission path switching device is arranged so as not to overlap the input member or the output member in the radial direction. In any case, the shape of each component is appropriately modified according to the respective configurations.

In addition, in the cam device 39 of the power transmission path switching device 5 of this example, the rolling bodies 64 are sandwiched and held between the drive cam 50 and the driven cam 51. However, when embodying the power transmission path switching device of the present invention, without being limited to the configuration of this example, the cam device is able to adopt various configurations as long as the driven cam is able to be displaced in the axial direction on the basis of rotation of the drive cam. For example, the drive cam surface provided on the drive cam may be directly in slidable contact with the driven cam surface provided on the driven cam.

In addition, in this example, in the rotation transmission state switching device 41, the second member 72 is arranged around the first member 71, and the first claw members 73 and the second claw members 74 are supported to the second member 72 so as to be able to swing. However, when embodying the present invention, the structure of the rotation transmission state switching device is not particularly limited as long as it could switch the rotation transmission state between the first member and the second member. For example, the first claw members and the second claw members are supported to the first member, which is arranged on the inner side in the radial direction, so as to be able to swing, or the first claw members and the second claw members are arranged so as to face each other in the axial direction.

First and Second Variations of First Example

A first variation and a second variation of the first example of an embodiment of the present invention will be described with reference to FIGS. 17(A) and 17(B).

The rotation transmission state switching device 41 of the first variation (see FIGS. 9 to 12) does not have the free mode in which relative rotation between the first member 71 and the second member 72 is possible in both directions. That is, as illustrated in FIG. 17(A), the rotation transmission state switching device 41 has only the lock mode in which relative rotation between the first member 71 and the second member 72 is not possible, and the one-way clutch mode in which only rotation of the first member 71 with respect to the second member 72 in the specified direction is allowed. Specifically, the rotation transmission state switching device 41 is configured so as to be able to switch between two modes, the lock mode and the one-way clutch mode, by adjusting the installation positions in the circumferential direction and the lengths in the circumferential direction of the protruding portions 96 of the select plate 77.

Similar to the two-speed transmission of the first example, the two-speed transmission 1 of the first variation is also able to switch between the high reduction ratio mode, the reduction ratio switching mode, the low reduction ratio mode, and the neutral mode, on the basis that one drive cam 50 is rotated and driven by one electric actuator 58.

In this variation, the low reduction ratio mode is achieved by putting the friction engagement device 40 into the connected state, and putting the rotation transmission state switching device 41 into the one-way clutch mode. That is, after switching the friction engagement device 40 from the disconnected state to the connected state in the reduction ratio switching mode, the rotation transmission state switching device 41 is left in the one-way clutch mode. In this case, rotation of the first member 71 in the specified direction is allowed in a state where the rotation transmission state switching device 41 is in the one-way clutch mode. Therefore, when the input member 2 rotates in the forward direction, the sun gear 11, the ring gear 12, and the carrier 13 are the same direction of rotation and rotation speed as each other, and thus the entire planetary gear mechanism 4 rotates as one body, thereby transmitting a power of the input member 2 to the output member 3 as it is without reducing the speed.

In addition, when the two-speed transmission 1 is switched to the neutral mode by putting the friction engagement device 40 into the disconnected state, and putting the rotation transmission state switching device 41 into the one-way clutch mode, the rotation in the specified direction is not transmitted between the input member 2 and the output member 3.

On the other hand, the rotation transmission state switching device 41 of the second variation does not have the lock mode in which relative rotation between the first member 71 and the second member 72 is not possible. That is, the rotation transmission state switching device 41 has only the free mode in which relative rotation between the first member 71 and the second member 72 is possible in both directions, and the one-way clutch mode in which only rotation of the first member 71 with respect to the second member 72 in the specified direction is allowed. Specifically, the rotation transmission state switching device 41 is configured so as to be able to switch between two modes, the free mode and the one-way clutch mode, by adjusting the installation positions in the circumferential direction and the lengths in the circumferential direction of the protruding portions 96 of the select plate 77.

Similar to the two-speed transmission of the first example and the two-speed transmission of the first variation, the two-speed transmission of the second variation is also able to switch between the high reduction ratio mode, the reduction ratio switching mode, the low reduction ratio mode, and the neutral mode, on the basis that one drive cam 50 is rotated and driven by one electric actuator 58.

In this variation, the high reduction ratio mode is achieved by putting the friction engagement device 40 into the disconnected state, and putting the rotation transmission state switching device 41 into the one-way clutch mode. That is, in a state where the rotation transmission state switching device 41 is in the one-way clutch mode, rotation of the first member 71 in the opposite direction to the specified direction is prevented. Therefore, in a state where the input member 2 rotates in the forward direction, the sun gear 11 and the carrier 13 are able to relatively rotate, and rotation of the ring gear 12 with respect to the housing 38 is prevented, so that a power of the input member 2 is transmitted to the output member 3 with the speed reduced by the planetary gear mechanism 4.

When switching the two-speed transmission 1 from the high reduction ratio mode to the low reduction ratio mode, switching to the reduction ratio switching mode is able to be performed by starting to increase the fastening force of the friction engagement device 40 while the rotation transmission state switching device 41 is left in the one-way clutch mode. Then, the two-speed transmission 1 is able to be switched to the low reduction ratio mode by completing putting the friction engagement device 40 into the connected state, and at the same time putting the rotation transmission state switching device 41 into the free mode.

In addition, when the two-speed transmission 1 is switched to the neutral mode by putting the friction engagement device 40 into the disconnected state, and putting the rotation transmission state switching device 41 into the one-way clutch mode, the rotation in the specified direction is not transmitted between the input member 2 and the output member 3.

The first variation and the second variation of the first example as described above are able to switch the two-speed transmission 1 between the high reduction ratio mode, the reduction ratio switching mode, the low reduction ratio mode, and the neutral mode by switching the friction engagement device 40 between the connected state and the disconnected state, and switching the rotation transmission state switching device 41 between two modes. Therefore, with the two-speed transmission 1 of the first variation and the second variation, controlling can be simplified as compared with the two-speed transmission 1 of the first example. The configurations and operational effects of other parts thereof are the same as those of the first example.

Second Example

A second example of an embodiment of the present invention will be described with reference to FIGS. 18 to 20. A power transmission path switching device 5a of this example includes a speed reducer 102 between a drive cam 50a and a select plate 77a, the speed reducer 102 being configured to reduce a rotation speed of the drive cam 50a and then transmit it to the select plate 77a. That is, the power transmission path switching device 5a of this example does not include the engaging pins 52 spanning between the drive cam 50 and the select plate 77 as in the first example, and is configured to transmit rotation of the drive cam 50a to the select plate 77a through the speed reducer 102.

The speed reducer 102 includes a cam-side gear portion 103 provided in the drive cam 50a, a plate-side gear portion 104 provided in the select plate 77a, and a two-stage gear 105.

The drive cam 50a is configured in a substantially circular ring plate shape, and includes a base portion 106 having the drive cam surface 54 on the inner side portion in the radial direction of the other side surface in the axial direction, and a cylindrical portion 107 protruding from the intermediate portion in the radial direction of the other side surface in the axial direction of the base portion 106 toward the other side in the axial direction over the entire circumference. Furthermore, the drive cam 50a has the cam-side gear portion 103 on the outer circumferential surface of the cylindrical portion 107 over the entire circumference.

The select plate 77a includes a base portion 127 having a stepped cylindrical shape, and an annular convex portion 91 protruding from the intermediate portion in the radial direction of the other side surface in the axial direction of the base portion 127 toward the other side in the axial direction over the entire circumference. The base portion 127 has a small-diameter portion 128 formed on one side in the axial direction, and a large-diameter portion 129 formed on the other side in the axial direction. In this example, the select plate 77a has a plate-side gear portion 104 on the outer circumferential surface of the small-diameter portion 128 over the entire circumference. In this example, the plate-side gear portion 104 has a pitch circle diameter larger than that of the cam-side gear portion 103, and has a number of teeth larger than that of the cam-side gear portion 103.

The two-stage gear 105 has a first gear portion 108 meshing with the cam-side gear portion 103, and a second gear portion 109 meshing with the plate-side gear portion 104. The first gear portion 108 has a pitch circle diameter larger than that of the second gear portion 109, and has a number of teeth larger than that of the second gear portion 109. The two-stage gear 105 of this example includes a center axis 110 supported to the housing 38a, and a main body portion 111 having the first gear portion 108 on the outer circumferential surface of one side portion in the axial direction over the entire circumference, having the second gear portion 109 on the outer circumferential surface on the other side portion in the axial direction over the entire circumference, and being supported around the center axis 110 so as to be able to rotate freely.

With the power transmission path switching device 5a of this example, even when the transmission motor 60 is not particularly the one with a high output, it is possible to sufficiently secure the allowable load torque of the rotation transmission state switching device 41a. This reason will be described in comparison with the power transmission path switching device 5 of the first example.

In the power transmission path switching device 5 of the first example, in order to sufficiently secure the allowable load torque of the rotation transmission state switching device 41, it is effective to increase the numbers of the first claw members 73 and the second claw members 74. However, when increasing the numbers of the first claw members 73 and the second claw members 74, a rotation angle of the drive cam 50 for switching between the first mode and the second mode is small. Even when the rotation angle of the drive cam 50 during the mode switching is small, in order to sufficiently secure the fastening force of the friction engagement device 40 by sufficiently securing the displacement amount (stroke) in the axial direction of the driven cam 51, it is necessary to increase an inclination angle (lead angle) of the drive cam surface 54 and/or the driven cam surface 62 with respect to the virtual plane orthogonal to the center axis of the cam device 39. However, when the inclination angle of the drive cam surface 54 and/or the driven cam surface 62 is increased, in order to make the rolling bodies 64 smoothly roll between the drive cam surface 54 and the driven cam surface 62, the transmission motor 60 is required to be the one with a high output.

To the contrary, the power transmission path switching device 5a of this example includes the speed reducer 102 between the drive cam 50a and the select plate 77a. Due to this, the rotation angle of the select plate 77a per rotation of the drive cam 50a is able to be smaller than the rotation angle of the driven cam 51 per rotation of the drive cam 50a. Therefore, even when the numbers of the first claw members 73 and the second claw members 74 are increased in order to sufficiently secure the allowable load torque of the rotation transmission state switching device 41a, it is not necessary to increase the inclination angle of the drive cam surface 54 and/or the driven cam surface 62 in order to sufficiently secure the displacement amount in the axial direction of the driven cam 51. In short, the transmission motor 60 is not required to be the one with a high output. The configurations and operational effects of other parts thereof are the same as those of the first example.

Third Example of Embodiment

A third example of an embodiment of the present invention will be described with reference to FIGS. 21 and 22. Similar to the power transmission path switching device 5a of the second example, a power transmission path switching device 5d of this example includes a speed reducer 102b between a drive cam 50d and a select plate 77d, the speed reducer 102b being configured to reduce a rotation speed of the drive cam 50d and then transmit it to the select plate 77d.

The speed reducer 102b includes a cam-side gear portion 103a provided in the drive cam 50d, a plate-side gear portion 104a provided in the select plate 77d, and the two-stage gear 105.

The drive cam 50d is configured in a substantially circular ring plate shape, and has a cam-side gear portion 103a on a portion of the outer circumferential surface. Specifically, the device cam 50d has a small-diameter portion 130 on a portion in the circumferential direction (in a range of about ⅔ of the entire circumference) thereof, the small-diameter portion 130 having a smaller outer-diameter dimension than the remaining portion, and has a cam-side gear portion 103a on a portion (in a range of about ½ of the length dimension with respect to the circumferential direction) of the outer circumferential surface of the small-diameter portion 130.

The select plate 77d has a base plate portion 94a having a circular ring plate shape, and the annular convex portion 91 protruding from the intermediate portion in the radial direction of the other side surface in the axial direction of the base plate portion 94a toward the other side in the axial direction over the entire circumference. Furthermore, the select plate 77d has a partially cylindrical portion 131 protruding from a portion in the circumferential direction (a range of about ⅓ of the entire circumference) of the intermediate portion in the radial direction of one side surface in the axial direction of the base plate portion 94a toward the one side in the axial direction, and has the plate-side gear portion 104a on the outer side surface in the radial direction (outer circumferential surface) of the partially cylindrical portion 131.

The two-stage gear 105 has the first gear portion 108 meshing with the cam-side gear portion 103a, and the second gear portion 109 meshing with the plate-side gear portion 104a.

Similar to the power transmission path switching device 5a of the second example, with the power transmission path switching device 5d of this example, the rotation angle of the select plate 77d per rotation of the drive cam 50d is able to be smaller than the rotation angle of the driven cam 51 per rotation of the drive cam 50d. Note that, in the power transmission path switching device 5d of this example, the mode switching is performed by reciprocating the drive cam 50d by the electric actuator 58.

In addition, in this example, the second member 72 and the select plate 77d are sandwiched and held by the pair of retaining rings 101a, 101b, which are locked on the inner circumferential surface of the outer-diameter-side cylinder portion 43 of the housing 38, from both sides in the axial direction. That is, the outer circumferential surface of the select plate 77d is internally fitted to the inner circumferential surface of the outer-diameter-side cylinder portion 43 so as to be able to relatively rotate, and the outer side portion in the radial direction of one side surface in the axial direction of the select plate 77d abuts against the retaining ring 101b, which is provided on the one side in the axial direction, so as to be able to slide. In regard to the second member 72, the male spline portion 82 provided on the outer circumferential surface thereof is connected to the fixed-side female spline portion 46 of the housing 38 by spline engagement, and one side surface in the axial direction of the base portion 83 is slidably contacted with or is closely opposed to the outer side portion in the radial direction of the base plate portion 94a of the select plate 77d. In this state, the outer side portion in the radial direction of the other side surface in the axial direction of the second member 72 abuts against the retaining ring 101a, which is provided on the other side in the axial direction.

In short, in this example, the rotation transmission state switching device 41d does not include the lid body 98 and the retaining ring 99, which are provided in the rotation transmission state switching device 41a of the second example. Therefore, the number of parts can be reduced as compared with the structure of the second example. The configurations and operational effects of other parts thereof are the same as those of the first example and the second example.

Fourth Example

A fourth example of an embodiment of the present invention will be described with reference to FIGS. 23 to 27. A power transmission path switching device 5b of this example includes a speed reducer 102a between a drive cam 50b and a select plate 77b. The speed reducer 102a includes cam-side grooves 112 provided in the drive cam 50b, plate-side grooves 113 provided in the select plate 77b, a guide plate 114, and a plurality of (three in the illustrated example) engaging pins 115.

The cam-side grooves 112 are formed on a plurality of positions (three positions in the illustrated example) in the circumferential direction of the other side surface in the axial direction of the outer side portion in the radial direction of the drive cam 50b so as to extend in a direction further outward in the radial direction as going toward one side in the circumferential direction when viewed from the other side in the axial direction. On the other hand, the plate-side grooves 113 are formed on a plurality of positions (three positions in the illustrated example) in the circumferential direction of one side surface in the axial direction of the select plate 77b so as to extend in a direction further outward in the radial direction as going toward one side in the circumferential direction when viewed from the one side in the axial direction. In other words, whereas the cam-side grooves 112 extend in a direction further outward in the radial direction as going toward one side with respect to the direction of rotation of the drive cam 50b and the select plate 77b, the plate-side grooves 113 extend in a direction further inward in the radial direction as going toward one side with respect to the direction of rotation of the drive cam 50b and the select plate 77b.

The cam-side grooves 112 have the same length in the radial direction (extension amount in the radial direction) as that of the plate-side grooves 113, and have a longer length in the circumferential direction (extension amount in the circumferential direction) than that of the plate-side grooves 113.

The guide plate 114 has guide grooves 116 extending in the radial direction at a plurality of positions (three positions in the illustrated example) in the circumferential direction thereof. Specifically, the guide plate 114 is configured in a substantially circular ring shape, has a male spline portion 117 on the outer circumferential surface over the entire circumference, and has convex portions 118 protruding inward in the radial direction in a plurality of positions in the circumferential direction of the inner circumferential surface. Furthermore, each of the guide grooves 116 of the guide plate 114 is provided in the center position in the circumferential direction of each of the convex portions 118, is open to the inside surface in the radial direction and both side surfaces in the axial direction, and extends in the radial direction. The guide grooves 116 have the same length in the radial direction as that of the cam-side grooves 112 and that of the plate-side grooves 113.

The guide plate 114 is arranged (sandwiched and held) between the drive cam 50b and the select plate 77b with respect to the axial direction, and is supported to the housing 38 so as not to be able to rotate by spline engagement of the male spline portion 117 with the fixed-side female spline portion 46 of the housing 38.

As illustrated in FIG. 27, each of the engaging pins 115 has a first engagement portion 119 in the end portion on the one side in the axial direction, a second engagement portion 120 in the end portion on the other side in the axial direction, and a third engagement portion 121 in the intermediate portion in the axial direction.

The first engagement portion 119 engages with each cam-side groove 112 of the drive cam 50b so as to be able to displace along the cam-side groove 112.

The second engagement portion 120 engages with each plate-side groove 113 of the select plate 77b so as to be able to displace along the plate-side groove 113.

The third engagement portion 121 engages with each guide groove 116 of the guide plate 114 so as to be able to displace along the guide groove 116.

In order to switch the power transmission path switching device 5b to the first mode, the friction engagement device 40 is put into the connected state, and a rotation transmission state switching device 41b is switched to the free mode, on the basis that the drive cam 50b is rotated and driven by the electric actuator 58. In this example, as illustrated in FIG. 26(A), the rotation transmission state switching device 41b is switched to the free mode by engagement of the engaging pin 115 with the outer side portion in the radial direction of the cam-side groove 112, the outer side portion in the radial direction of the plate-side groove 113, and the outer side portion in the radial direction of the guide groove 116. In the state illustrated in FIG. 26(A), the first engaging claw 90 and the second engaging claw 93 are pushed up outward in the radial direction by the protruding portions 96 of the select plate 77b, so as not to engage with the engaging recess portions 78 of the first member 71.

In order to switch the power transmission path switching device 5b to the second mode, the friction engagement device 40 is put into the disconnected state, and the rotation transmission state switching device 41b is switched to the lock mode, on the basis that the drive cam 50b is rotated and driven by the electric actuator 58. In this example, as illustrated in FIG. 26(B), the rotation transmission state switching device 41b is switched to the lock mode by engagement of the engaging pin 115 with the inner side portion in the radial direction (the other side portion with respect to the direction of rotation) of the cam-side groove 112, the end portion on the inner side in the radial direction (one side portion with respect to the direction of rotation) of the plate-side groove 113, and the end portion on the inner side in the radial direction of the guide groove 116. In the state illustrated in FIG. 26(B), the protruding portions 96 of the select plate 77b are positioned in regions deviated in the circumferential direction from the first engaging claw 90 and the second engaging claw 93, so that the first engaging claw 90 and the second engaging claw 93 engage with the engaging recess portions 78 of the first member 71.

In an intermediate mode of the power transmission path switching device 5b which is established during switching from the second mode to the first mode, the rotation transmission state switching device 41b is switched to the one-way clutch mode. In this example, as illustrated in FIG. 26(C), the rotation transmission state switching device 41b is switched to the one-way clutch mode by engagement of the engaging pin 115 with the intermediate portion in the radial direction (the intermediate portion with respect to the direction of rotation) of the cam-side groove 112, the intermediate portion in the radial direction (the intermediate portion with respect to the direction of rotation) of the plate-side groove 113, and the intermediate portion in the radial direction of the guide groove 116. In the state illustrated in FIG. 26(C), only the second engaging claw 93 is pushed up outward in the radial direction by the protruding portion 96 of the select plate 77b, so that only the first engaging claw 90 engages with the engaging recess portion 78 of the first member 71, and the second engaging claw 93 does not engages with the engaging recess portion 78.

That is, in the power transmission path switching device 5b of this example, when the drive cam 50b is rotated and driven by the electric actuator 58, the engaging pin 115 moves in the radial direction on the basis of engagement between the first engagement portion 119 and the cam-side groove 112 of the drive cam 50b, and engagement between the third engagement portion 121 and the guide groove 116 of the guide plate 114. When the engaging pin 115 moves in the radial direction, the select plate 77b is rotated and driven by engagement between the second engagement portion 120 and the plate-side groove 113 of the select plate 77b. Then, the mode switching of the rotation transmission state switching device 41b is performed by pushing up the first engaging claw 90 and the second engaging claw 93 outward in the radial direction, or releasing the force for pushing-up, by the protruding portions 96, on the basis of adjusting the phase in the circumferential direction of the select plate 77b.

In this example, because the length in the circumferential direction of the cam-side grooves 112 is longer than that of the plate-side grooves 113, rotation of the drive cam 50b is transmitted to the select plate 77b with the speed reduced. Therefore, with the power transmission path switching device 5b of this example, even when the transmission motor 60 is not particularly the one with a high output, it is possible to sufficiently secure the allowable load torque of the rotation transmission state switching device 41b.

In addition, the power transmission path switching device 5b of this example does not have a configuration such that the two-stage gear 105 is arranged on the outer side in the radial direction between the drive cam 50a and the select plate 77a as in the power transmission path switching device 5a of the second example. Due to this, the power transmission path switching device 5b of this example is easy to reduce the outer-diameter dimension as compared with the power transmission path switching device 5a of the second example. The configurations and operational effects of other parts thereof are the same as those of the first example and the second example.

Fifth Example

A fifth example of an embodiment of the present invention will be described with reference to FIGS. 28 to 32. The power transmission path switching device 5c of this example is configured so as to switch the mode of the rotation transmission state switching device 41c by displacing the select plate 77c in the axial direction on the basis that a drive cam 50c is rotated and driven by the electric actuator 58.

The select plate 77c includes a base plate portion 94a having a substantially circular ring plate shape, and a cylindrical portion 122 protruding from an end portion on the inner side in the radial direction of one side surface in the axial direction of the base plate portion 94a toward one side in the axial direction over the entire circumference. Furthermore, the select plate 77c has an engaging groove 123 on the outer circumferential surface of the cylindrical portion 122 over the entire circumference, the engaging groove 123 including an inclined portion which is inclined with respect to the circumferential direction.

In addition, a plurality of protruding portions 96a having a large length in the axial direction and a plurality of protruding portions 96b having a small length in the axial direction are alternately arranged in the intermediate portion in the radial direction of the other side surface in the axial direction of the base plate portion 94a with respect to the circumferential direction. The tip-end portion of each protruding portion 96a having a large length in the axial direction faces the second engaging claw 93 of the second claw member 74, and the tip-end portion of each protruding portion 96b having a small length in the axial direction faces the first engaging claw 90 of the first claw member 73. In this example, the mode selecting part is configured by a plurality of the protruding portions 96a, 96b.

The drive cam 50c is configured in a substantially circular ring plate shape, and includes a base portion 106a having the drive cam surface 54 on the inner side portion in the radial direction of the other side surface in the axial direction, and a cylindrical portion 124 protruding from the outer side portion in the radial direction of the other side surface in the axial direction of the base portion 106a toward the other side in the axial direction over the entire circumference. Furthermore, the drive cam 50c has an engaging hole 125 penetrating in the radial direction through the cylindrical portion 124.

In the power transmission path switching device 5c of this example, the intermediate portion in the radial direction of an engaging pin 126 having a columnar shape is internally fitted to the engaging hole 125 of the drive cam 50c without looseness, and the end portion on the inner side in the radial direction of the engaging pin 126 engages with the engaging groove 123 of the select plate 77c so as to be able to displace along the engaging groove 123. Due to this, in the power transmission path switching device 5c of this example, when the drive cam 50c is rotated and driven by the electric actuator 58, the select plate 77c moves in the axial direction on the basis of engagement between the end portion on the inner side in the radial direction of the engaging pin 126 and the engaging groove 123.

In this example, in order to switch the rotation transmission state switching device 41c to the free mode for switching the power transmission path switching device 5c to the first mode, the select plate 77c is moved toward the other side in the axial direction. Due to this, the second engaging claw 93 is pushed up outward in the radial direction by the protruding portion 96a having a large length in the axial direction against the elastic force of the second claw biasing member 76, and the first engaging claw 90 is pushed up outward in the radial direction by the protruding portion 96b having a small length in the axial direction against the elastic force of the first claw biasing member 75. As a result, engagement of the first engaging claw 90 and the second engaging claw 93 with the engaging recess portions 78 of the first member 71 is released, so that rotation of the first member 71 with respect to the second member 72 is allowed regardless of a direction of relative rotation between the first member 71 and the second member 72.

In order to switch the rotation transmission state switching device 41c to the lock mode for switching the power transmission path switching device 5c to the second mode, the select plate 77c is moved toward the one side in the axial direction. Due to this, the protruding portion 96a having a large length in the axial direction is retracted to a region shifted in the axial direction from the second engaging claw 93, and the protruding portion 96b having a small length in the axial direction is retracted to a region shifted in the axial direction from the first engaging claw 90. As a result, the first engaging claw 90 and the second engaging claw 93 engage with the engaging recess portions 78 of the first member 71 (see FIG. 12), so that rotation of the first member 71 with respect to the second member 72 is prevented regardless of a direction of relative rotation between the first member 71 and the second member 72.

In an intermediate mode of the power transmission path switching device 5c which is established during switching from the second mode to the first mode, only the second engaging claw 93 is pushed up outward in the radial direction by the protruding portion 96a having a large length in the axial direction against the elastic force of the second claw biasing member 76. Due to this, the first engaging claw 90 engages with the engaging recess portion 78 of the first member 71, and engagement of the second engaging claw 93 with the engaging recess portion 78 is released. As a result, only rotation of the first member 71 with respect to the second member 72 in the specified direction is allowed, and the rotation in the opposite direction to the specified direction is prevented. The configurations and operational effects of other parts thereof are the same as those of the first example.

Sixth Example

A sixth example of an embodiment of the present invention will be described with reference to FIGS. 33 to 35. In the power transmission path switching device 5e of this example, the structure of a cam device 39e is changed from that of the cam device 39 of the first example. The cam device 39e includes a drive cam 50e, a driven cam 51c, a plurality of (five in the illustrated example) engaging pins 52, and a plurality of (three in the illustrated example) rolling bodies 64a. Particularly in this example, a roller is used as each rolling body 64a of the cam device 39e. Each rolling body 64a has a rotation axis C in the radiation direction centered on the center axis of the driven cam 51c, and is supported by the driven cam 51c so as to be able to rotate freely centered on the rotation axis C.

The drive cam 50e is configured in a hollow circular plate shape, and has a drive cam surface 54a constituted by alternately arranging recess portions and convex portions of the same number as each other with respect to the circumferential direction on the inner side portion in the radial direction of the other side surface in the axial direction. In addition, the drive cam 50e has the cam-side engaging holes 56 in a plurality of positions at equal intervals in the circumferential direction of the outer side portion in the radial direction, the cam-side engaging holes 56 being open to the other side surface in the axial direction, and has the wheel gear portion 57 on the outer circumferential surface. The drive cam 50e is supported on the outer circumferential surface of the end portion on one side in the axial direction of the inner-diameter-side cylinder portion 42 of the housing 38 through the angular ball bearing 53 so that free rotation is possible and displacement in the axial direction is not possible.

The driven cam 51c is configured in a hollow circular plate shape, has rectangular holes 132 penetrating in the axial direction in a plurality of positions in the circumferential direction (three positions at equal intervals in the circumferential direction in the illustrated example) of the outer side portion in the radial direction, and has support plate portions 133a, 133b having a substantially semicircular plate shape and protruding from both side portions in the radial direction of the respective rectangular holes 132 toward the one side in the axial direction. The support plate portion 133a of the support plate portions 133a, 133b which is arranged on the outer side in the radial direction includes a support hole 134 which is a circular hole penetrating in the radial direction, and the support plate portion 133b arranged on the inner side in the radial direction includes a support recess portion 135 having a circular opening on the outer side surface in the radial direction.

The driven cam 51c is supported to the housing 38 so that only displacement in the axial direction is possible by spline engagement of the driven-side female spline portion 63, which is provided in the inner circumferential surface, with the fixed-side male spline portion 45 of the housing 38.

In regard to each of the engaging pins 52, by internally fitting the end portion on the one side in the axial direction to the cam-side engaging hole 56 of the drive cam 50e without looseness, the other side portion in the axial direction protrudes from the other side surface in the axial direction of the drive cam 50e toward the other side in the axial direction. The end portion on the other side in the axial direction of each of the engaging pins 52 is internally fitted to the plate-side engaging hole 95 provided on one side surface in the axial direction of the base plate portion 94 of the select plate 77.

Each of the rolling bodies 64a has a cylindrical shape, and is supported to the support plate portions 133a, 133b of the driven cam 51c so as to be able to rotate freely through a supporting shaft 136 having a columnar shape and a plurality of rollers 137. That is, the end portion on one side in a direction of the axis of the supporting shaft 136 (the end portion on the outer side in the radial direction centered on the center axis of the driven cam 51c) of the supporting shaft 136 is internally fitted and fixed in the support hole 134 of the support plate portion 133a, which is formed on the outer side in the radial direction, and the end portion on the other side in a direction of the axis of the supporting shaft 136 (the end portion on the inner side in the radial direction centered on the center axis of the driven cam 51c) of the supporting shaft 136 is internally fitted and fixed in the support recess portion 135 of the support plate portion 133b, which is formed on the inner side in the radial direction. A plurality of the rollers 137 are sandwiched and held between the inner circumferential surface of each rolling body 64a and the outer circumferential surface of the intermediate portion in the axial direction of the supporting shaft 136 so as to be able to roll freely. Due to this, the rolling bodies 64a are supported by the driven cam 51c so as to be able to rotate freely centered on the rotation axis C in the radiation direction centered on the center axis of the driven cam 51c.

Note that, in a state where the rolling bodies 64a are supported by the driven cam 51c, the other side portion in the axial direction of each rolling body 64a is arranged inside the rectangular hole 132. In addition, the outer circumferential surface of each of the rolling bodies 64a is in rolling contact with the drive cam surface 54a provided on the other side surface in the axial direction of the drive cam 50e.

According to this example as described above, on the basis of rotation of the drive cam 50e, it is possible to reliably displace the driven cam 51c in the axial direction. That is, because the cam device 39 of the first example of an embodiment employs a ball as the rolling body 64, there is a possibility that when the drive cam 50 rotates, sliding occurs on a rolling contact part between the surface of the rolling body 64 and the drive cam surface 54 and/or the driven cam surface 62. When sliding occurs on the rolling contact part between the surface of the rolling body 64 and the drive cam surface 54 and/or the driven cam surface 62, there is a possibility that displacement of the driven cam 51 in the axial direction is not possible, and that an amount of displacement in the axial direction of the driven cam 51 with respect to an amount of rotation of the drive cam 50 is not sufficiently secured.

To the contrary, in this example, a roller having a cylindrical shape is used as the rolling body 64a, and the rolling body 64a is supported by the driven cam 51c, which does not rotate in use, so as to be able to rotate freely. Due to this, it is possible to reliably prevent sliding from occurring in the rolling contact part between the outer circumferential surface of the rolling body 64a and the drive cam surface 54a when the drive cam 50e rotates, and thus displacement in the axial direction of the driven cam 51c is able to be reliably performed on the basis of rotation of the drive cam 50e. As a result, because switching of the connected/disconnected state of the friction engagement device 40 is able to be reliably performed, the mode switching of the power transmission path switching device 5e is able to be reliably performed. The configurations and operational effects of other parts thereof are the same as those of the first example.

Seventh Example

A seventh example of an embodiment of the present invention will be described with reference to FIGS. 36 to 38. In the power transmission path switching device 5f of this example, an uneven portion 97a constituting the mode selecting part for switching the mode of a rotation transmission state switching device 41e is provided in a drive cam 50f. That is, the drive cam 50f has such a structure that is formed by integrating the drive cam 50 of the cam device 39 and the select plate 77 of the rotation transmission state switching device 41 in the first example.

The drive cam 50f is configured in a hollow circular plate shape, has the drive cam surface 54a constituted by alternately arranging recess portions and convex portions of the same number as each other with respect to the circumferential direction on the inner side portion on the radial direction of the other side surface in the axial direction, and has the wheel gear portion 57 on the outer circumferential surface. In addition, the drive cam 50f has an annular convex portion 91a protruding toward the other side in the axial direction on the outer side portion in the radial direction of the other side surface in the axial direction over the entire circumference.

The annular convex portion 91a has recess portions 138 recessed inward in the radial direction at a plurality of positions in the circumferential direction of the other side portion in the axial direction of the outer circumferential surface, and has protruding portions 96c on portions between the adjacent recess portions 138 in the circumferential direction, the protruding portions 96c protruding further outward in the radial direction than the adjacent portions on both sides in the circumferential direction. That is, the annular convex portion 91a has the uneven portion 97a constituted by alternately arranging the recess portions 138 and the protruding portions 96c with respect to the circumferential direction on the outer circumferential surface of the other side portion in the axial direction. Similar to the uneven portion 97 of the first example, the uneven portion 97a constitutes the mode selecting part for switching the mode of the rotation transmission state switching device 41e.

In addition, in this example, the second member 72a of the rotation transmission state switching device 41e does not include the cylindrical portion 84 as in the second member 72 of the first example. That is, in this example, the second member 72a is configured only by the base portion 83 having a rectangular cross-sectional shape. The base portion 83 has a plurality of the first holding recess portions 85 and a plurality of the second holding recess portions 86 which are alternately arranged with respect to the circumferential direction.

The drive cam 50f is supported on the outer circumferential surface of the end portion on the one side in the axial direction of the inner-diameter-side cylinder portion 42 of the housing 38 through the angular ball bearing 53 so that free rotation is possible and displacement in the axial direction is not possible. In a state where the drive cam 50f is supported to the housing 38, the annular convex portion 91a provided in the drive cam 50f is arranged on the inner side in the radial direction of one side portion in the axial direction of the base portion 83 of the second member 72a, and the tip-end surface (the other side surface in the axial direction) of the annular convex portion 91a is slidably contacted with or closely opposed to the one side surface in the axial direction of the first member 71 of the rotation transmission state switching device 41e.

The second member 72a is supported by and fixed to the housing 38 so that rotation and relative displacement in the axial direction are not possible. Specifically, the male spline portion 82 provided on the outer circumferential surface of the second member 72a is connected to the fixed-side female spline portion 46 provided on the inner circumferential surface of the outer-diameter-side cylinder portion 43 of the housing 38 by spline engagement, and the second member 72a, and the lid body 98 supported by and fixed to the other side surface in the axial direction of the second member 72a are sandwiched and held from both sides in the axial direction by a pair of retaining rings 101a, 101c locked on the inner circumferential surface of the outer-diameter-side cylinder portion 43 of the housing 38.

In this example, as the retaining ring 101c of the pair of retaining rings 101a, 101c which is provided on the one side in the axial direction, a retaining ring having an inner diameter that is smaller than the circumscribed circle diameter of the inner end portions (end portions on the outer side in the radial direction) of the first holding recess portion 85 and the second holding recess portion 86 provided in the second member 72a (see FIGS. 11 and 12), and larger than the inner diameter of the second member 72a, is used. Therefore, the outer side portions in the radial direction of the opening portions on the other side in the axial direction of the first holding recess portion 85 and the second holding recess portion 86 are covered by the inner side portion in the radial direction of the retaining ring 101c, which is provided on the one side in the axial direction. Due to this, the first claw member 73 and the first claw biasing member 75 held in the first holding recess portion 85, and the second claw member 74 and the second claw biasing member 76 held in the second holding recess portion 86 are prevented from falling off from the opening portions on the other side in the axial direction of the first holding recess portion 85 and the second holding recess portion 86.

Note that it is possible that a retaining ring having an inner diameter that is larger than the circumscribed circle diameter of the inner end portions of the first holding recess portion 85 and the second holding recess portion 86 provided in the second member 72a is used as the retaining ring 101c, which is provided on the one side in the axial direction, and a washer having an inner diameter that is smaller than the circumscribed circle diameter of the inner end portions of the first holding recess portion 85 and the second holding recess portion 86, and larger than the inner diameter of the second member 72a, is sandwiched and held between the retaining ring 101c, which is provided on the one side in the axial direction, and the second member 72a.

In the power transmission path switching device 5f of this example, the uneven portion 97a constituting the mode selecting part for switching the mode of the rotation transmission state switching device 41e is provided in the drive cam 50f. Due to this, the number of parts can be reduced as compared to the structure of the first example in which the uneven portion 97 constituting the mode selecting part is provided in the select plate 77 which is disposed separately from the drive cam 50, thereby easily reducing the manufacture cost. The configurations and operational effects of other parts thereof are the same as those of the first example and the sixth example.

The configuration of each of the first example to the seventh example of the embodiment described above may be implemented in appropriate combination as long as no contradiction occurs.

REFERENCE SIGNS LIST

1 Two-speed transmission
2 Input member
3 Output member
4 Planetary gear mechanism
5, 5a, 5b, 5c, 5d, 5e, 5f, 5z Power transmission path switching device
6 Input cylindrical portion
7 Input flange portion
8 Female spline portion
9 Output cylindrical portion
10 Output flange portion
11 Sun gear
12 Ring gear
13 Carrier
14 Pinion gear
15 Small-diameter cylindrical portion
16 Large-diameter cylindrical portion
17 Flange portion
18 Sun-side male spline portion
19 Gear portion
20 Small-diameter cylindrical portion
21 Large-diameter cylindrical portion
22 Circular ring portion 23 Ring-side male spline portion
24 Gear portion
25a, 25b Rim portion
26 Columnar portion
27 Cylindrical portion
28a, 28b Circular hole
29 Carrier-side female spline portion
30 Supporting shaft
31 Main body portion
32 Radial needle bearing
33 Gear portion
34a, 34b Retaining ring
35 Spacer
36a, 36b Thrust bearing
37 Pressing plate
38 Housing
39, 39a, 39z Cam device
40 Friction engagement device
40a First friction engagement device
40b Second friction engagement device
41, 41a, 41b, 41c, 41d, 41e Rotation transmission state switching device
42 Inner-diameter-side cylinder portion
43 Outer-diameter-side cylinder portion
44 Side plate portion
45 Fixed-side male spline portion
46 Fixed-side female spline portion
47 Through hole
48 Radial needle bearing
49 Thrust needle bearing
50, 50a, 50b, 50c, 50d, 50e, 50f, 50z Drive cam
51, 51c Driven cam
51a First driven cam
51b Second driven cam
52 Engaging pin
53 Angular ball bearing
54, 54a Drive cam surface
56 Cam-side engaging hole
57 Wheel gear portion
58 Electric actuator
59 Worm
60 Transmission motor
61 Worm gear portion
62 Driven cam surface
63 Driven-side female spline portion
64, 64a Rolling body
65, 65a Friction plate
66, 66a Separation plate
67 Retaining ring
68 Elastic member
69 Thrust rolling bearing
70 Return spring
71 First member
72, 72a Second member
73 First claw member
74 Second claw member
75 First claw biasing member
76 Second claw biasing member
77, 77a, 77b, 77c, 77d Select plate
78 Engaging recess portion
79 Convex portion
80 Uneven portion
81 Female spline portion
82 Male spline portion
83 Base portion
84 Cylindrical portion
85 First holding recess portion
86 Second holding recess portion
87a, 87b Spring holding portion
88a, 88b Seat portion
89 First base portion
90 First engaging claw
91, 91a Annular convex portion
92 Second base portion
93 Second engaging claw
94, 94a Base plate portion
95 Plate-side engaging hole
96, 96a, 96b, 96c Protruding portion
97, 97a Uneven portion
98 Lid body
99 Retaining ring
101a, 101b, 101c Retaining ring
102, 102a, 102b Speed reducer
103, 103a Cam-side gear portion
104, 104a Plate-side gear portion
105 Two-stage gear
106, 106a Base portion
107 Cylindrical portion
108 First gear portion
109 Second gear portion
110 Center axis
111 Main body portion
112 Cam-side groove
113 Plate-side groove
114 Guide plate
115 Engaging pin
116 Guide groove
117 Male spline portion
118 Convex portion
119 First engagement portion
120 Second engagement portion
121 Third engagement portion
122 Cylindrical portion
123 Engaging groove
124 Cylindrical portion
125 Engaging hole
126 Engaging pin
127 Base portion
128 Small-diameter portion
129 Large-diameter portion
130 Small-diameter portion
131 Partially cylindrical portion
132 Rectangular hole
133a, 133b Support plate portion
134 Support hole
135 Support recess portion
136 Supporting shaft
137 Roller
138 Recess portion

The invention claimed is:

1. A power transmission path switching device comprising:
 a cam device having a drive cam supported so that rotation is possible and displacement in an axial direction is not possible, and a driven cam that is supported so that relative rotation with respect to the drive cam and displacement in the axial direction are possible, and is configured to displace in the axial direction according to rotation of the drive cam; and
 a friction engagement device having at least one friction plate and at least one separation plate that are supported so that relative displacement in the axial direction with respect to each other is possible;
 wherein the friction engagement device is configured so as to be put into a connected state by pressing the friction plate and the separation plate against each other on the basis of displacement of the driven cam in a direction so that an interval in the axial direction between the driven cam and the drive cam increases, and be put into a disconnected state by releasing a force that presses the friction plate and the separation plate against each other on the basis of displacement of the driven cam in a direction so that the interval in the axial direction between the driven cam and the drive cam decreases;

the power transmission path switching device further includes a rotation transmission state switching device having a first member and a second member that are arranged coaxially with each other, and a mode selecting part configured to rotate or displace in the axial direction according to rotation of the drive cam;

the rotation transmission state switching device has at least one mode of a free mode in which rotation of the first member with respect to the second member is allowed regardless of a direction of relative rotation between the first member and the second member, and a lock mode in which rotation of the first member with respect to the second member is prevented regardless of a direction of relative rotation between the first member and the second member, and a one-way clutch mode in which only rotation of the first member with respect to the second member in a specified direction is allowed, and rotation of the first member with respect to the second member in a direction opposite to the specified direction is prevented;

the rotation transmission state switching device is configured so as to be able to switch between the at least one mode of the free mode and the lock mode, and the one-way clutch mode, on the basis of rotation or displacement in the axial direction of the mode selecting part, and in a state that the rotation transmission state switching device is put into the one-way clutch mode, the friction engagement device is switched from the disconnected state to the connected state.

2. The power transmission path switching device according to claim 1, comprising a first mode in which the friction engagement device is in the connected state, and the rotation transmission state switching device is in the free mode.

3. The power transmission path switching device according to claim 1, comprising a second mode in which the friction engagement device is in the disconnected state, and the rotation transmission state switching device is in the lock mode.

4. The power transmission path switching device according to claim 1, comprising a neutral mode in which the friction engagement device is in the disconnected state, and the rotation transmission state switching device is in the free mode.

5. The power transmission path switching device according to claim 1, wherein one member of the first member and the second member has engaging recess portions at a plurality of positions in a circumferential direction;

the mode selecting part has protruding portions at a plurality of positions in the circumferential direction, the protruding portions protruding in a radial direction or in the axial direction; and the rotation transmission state switching device further includes a first claw member having a first base portion that is pivotally supported by the other member of the first member and the second member, and a first engaging claw that extends from the first base portion toward one side in the circumferential direction, a second claw member having a second base portion that is pivotally supported by the other member of the first member and the second member, and a second engaging claw that extends from the second base portion toward the other side in the circumferential direction, a first claw biasing member configured to elastically bias the first engaging claw in a direction so that the first engaging claw engages with the engaging recess portion, and a second claw biasing member configured to elastically bias the second engaging claw in a direction so that the second engaging claw engages with the engaging recess portion.

6. The power transmission path switching device according to claim 1, further comprising a select plate that has the mode selecting part, and is configured to rotate or displace in the axial direction according to rotation of the drive cam.

7. The power transmission path switching device according to claim 6, further comprising a speed reducer between the drive cam and the select plate, the speed reducer being configured to transmit rotation of the drive cam to the select plate with reducing a speed of the rotation.

8. The power transmission path switching device according to claim 7, wherein the speed reducer includes a cam-side gear portion provided in the drive cam, a plate-side gear portion provided in the select plate, and a two-stage gear having a first gear portion that meshes with the cam-side gear portion, and a second gear portion that meshes with the plate-side gear portion.

9. The power transmission path switching device according to claim 7, wherein the speed reducer includes a cam-side groove that is provided in the drive cam, and extends in a direction further outward in the radial direction as going toward one side with respect to a direction of rotation, a plate-side groove that is provided in the select plate, and extends in a direction further inward in the radial direction as going toward one side with respect to a direction of rotation, and an engaging pin having a first engagement portion that engages with the cam-side groove so that displacement along the cam-side groove is possible, and a second engagement portion that engages with the plate-side groove so that displacement along the plate-side groove is possible; and a length in the circumferential direction of the cam-side groove is longer than a length in the circumferential direction of the plate-side groove.

10. The power transmission path switching device according to claim 9, wherein the speed reducer further includes a guide plate having a guide groove extending in the radial direction, and being supported so that rotation is not possible, and the engaging pin further has a third engagement portion engaging with the guide groove so that displacement along the guide groove is possible.

11. The power transmission path switching device according to claim 6, further comprising a select plate that has the mode selecting part, and is configured to rotate or displace in the axial direction according to rotation of the drive cam wherein the protruding portion protrudes in the axial direction, the select plate has an engaging groove that includes an inclined portion inclined with respect to the circumferential direction, and extends in the circumferential direction, and the drive cam has an engaging pin that protrudes in the radial direction, and engages with the engaging groove so that displacement along the engaging groove is possible.

12. The power transmission path switching device according to claim 1, wherein the drive cam has the mode selecting part.

13. The power transmission path switching device according to claim 1, further comprising an elastic member that is arranged between the driven cam and the friction engagement device, and is configured to elastically bias the driven cam and the friction engagement device in directions away from each other.

14. The power transmission path switching device according to claim 1, wherein the friction engagement device further has a return spring that is configured to elastically bias the friction plate and the separation plate in directions separating from each other.

15. The power transmission path switching device according to claim 1, wherein the cam device includes a plurality of rollers that have rotation axes directed in a radiation direction, and are sandwiched and held between the drive cam and the driven cam, and the rollers are supported by the driven cam so as to be able to freely rotate about the rotation axes.

16. A two-speed transmission comprising:

an input member;

an output member arranged coaxially with the input member;

a planetary gear mechanism arranged between the input member and the output member with respect to a direction of transmission of power; and a power transmission path switching device configured to switch a power transmission path between the input member and the output member;

the power transmission path switching device being the power transmission path switching device according to claim 1, and further including an electric actuator configured to rotate and drive the drive cam;

the planetary gear mechanism including a sun gear connected to the input member so as to rotate integrally with the input member, a ring gear arranged coaxially with the sun gear and around the sun gear;

a carrier that is arranged coaxially with the sun gear, and is connected to the output member so as to rotate integrally with the output member, and a plurality of pinion gears that mesh with the sun gear and the ring gear, and are supported by the carrier so as to be able to freely rotate about their own center axes;

one of the friction plate and the separation plate being supported to the sun gear or the input member so that relative displacement in the axial direction is possible and relative rotation is not possible;

the other of the friction plate and the separation plate being supported to the carrier or the output member so that relative displacement in the axial direction is possible and relative rotation is not possible;

one of the first member and the second member being supported to a portion that does not rotate even in use so that relative rotation is not possible; and the other of the first member and the second member is supported to the ring gear so that relative rotation is not possible.

17. The two-speed transmission according to claim 16, wherein the drive cam has a wheel gear portion on an outer circumferential surface thereof, and the electric actuator includes a worm meshing with the wheel gear portion, and a transmission motor configured to rotate and drive the worm.

* * * * *